(12) United States Patent
Jun et al.

(10) Patent No.: US 12,145,128 B2
(45) Date of Patent: Nov. 19, 2024

(54) ENGINEERED CALCIUM ALGINATE AND USES THEREOF

(71) Applicants: Young-Shin Jun, St. Louis, MO (US); Doyoon Kim, St. Louis, MO (US)

(72) Inventors: Young-Shin Jun, St. Louis, MO (US); Doyoon Kim, St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 16/397,898

(22) Filed: Apr. 29, 2019

(65) Prior Publication Data

US 2019/0329217 A1    Oct. 31, 2019

Related U.S. Application Data

(60) Provisional application No. 62/663,700, filed on Apr. 27, 2018.

(51) Int. Cl.

| | | |
|---|---|---|
| *B01J 20/24* | (2006.01) | |
| *B01J 20/28* | (2006.01) | |
| *B01J 20/32* | (2006.01) | |
| *C02F 1/28* | (2023.01) | |
| *C05B 3/00* | (2006.01) | |
| *C02F 101/10* | (2006.01) | |
| *C02F 103/00* | (2006.01) | |

(Continued)

(52) U.S. Cl.
CPC ......... *B01J 20/24* (2013.01); *B01J 20/28016* (2013.01); *B01J 20/3208* (2013.01); *B01J 20/3291* (2013.01); *C02F 1/286* (2013.01); *C05B 3/00* (2013.01); *C02F 2101/105* (2013.01); *C02F 2103/001* (2013.01); *C02F 2103/007* (2013.01); *C02F 2103/08* (2013.01); *C02F 2103/10* (2013.01)

(58) Field of Classification Search
CPC ..... B01J 8/009; B01J 8/02; B01J 20/24; B01J 20/267; B01J 20/28016; B01J 20/28026; B01J 20/28047; B01J 20/2805; B01J 20/3208; B01J 20/3291; C02F 1/285; C02F 1/286; C02F 1/288; C02F 2101/105; C02F 2101/20; C02F 2101/203; C02F 2101/206
See application file for complete search history.

(56) References Cited

U.S. PATENT DOCUMENTS

| 6,716,357 | B1 * | 4/2004 | Maekawa | C02F 1/5236 |
| | | | | 210/695 |
| 2007/0205157 | A1 * | 9/2007 | Jones | C02F 1/42 |
| | | | | 210/688 |
| 2016/0031766 | A1 * | 2/2016 | Bezbaruah | C05B 17/00 |
| | | | | 71/23 |

FOREIGN PATENT DOCUMENTS

CN    105921118 A  *  9/2016  ............. B01J 20/24

OTHER PUBLICATIONS

Mahmood et al ("Adsorption studies of phosphate ions on alginate-calcium carbonate composite beads", 2015, African Journal of Environmental Science and Technology, vol. 9(3), p. 274-281) (Year: 2015).*

(Continued)

*Primary Examiner* — Jennifer A Smith
(74) *Attorney, Agent, or Firm* — Polsinelli PC

(57) ABSTRACT

The present disclosure relates to biodegradable materials and methods of removing using the biodegradable materials to remove phosphorus from water. Additionally, the biodegradable materials may be used as a fertilizer.

7 Claims, 32 Drawing Sheets
(32 of 32 Drawing Sheet(s) Filed in Color)

(51) Int. Cl.
  *C02F 103/08*  (2006.01)
  *C02F 103/10*  (2006.01)

(56) References Cited

OTHER PUBLICATIONS

Ott, Elanor. "Discharge limits for domestic wastewater facilities". Department of Ecology State of Washington. <https://ecology.wa.gov/Water-Shorelines/Water-quality/Wastewater/Discharge-standards-limits> Sep. 20, 2020 (Year: 2020).*
Wang, Yun-yan, et al. "Synthesis of phosphate-embedded calcium alginate beads for Pb (II) and Cd (II) sorption and immobilization in aqueous solutions." Transactions of Nonferrous Metals Society of China 26.8 (2016): 2230-2237. (Year: 2016).*
Pravinata, Linda, et al. "Preparation of alginate microgels in a simple one step process via the Leeds Jet Homogenizer." Food Hydrocolloids 61 (2016): 77-84. (Year: 2016).*
da Silva, Thiago Lopes, et al. "Alginate and sericin: environmental and pharmaceutical applications." Biological activities and application of marine polysaccharides (2017): 57-86. (Year: 2017).*
Pasteris, J. et al., "Bone and Tooth Mineralization: Why Apatite?," Elements, Apr. 2008, pp. 97-104, vol. 4, No. 2.
Plummer, L. et al., "The solubilities of calcite, aragonite and vaterite in $CO_2$—$H_2O$ solutions between 0 and 90 degrees C, and an evaluation of the aqueous model for the system $CaCO_3$—$CO_2$—$H_2O$," Geochim. Cosmochim. Acta, Jun. 1982, pp. 1011-1040, vol. 46, No. 6.
Powers, S. et al., "Long-term accumulation and transport of anthropogenic phosphorus in three river basins," Nat. Geosci., 2016, pp. 353-356, vol. 9, No. 5.
Qiu, X. et al., "PDFgetX2: a GUI-driven program to obtain the pair distribution function from X-ray powder diffraction data," J. Appl. Cryst., 2004, pp. 678-678, vol. 37.
Rabalais, N. et al., "Sediments Tell the History of Eutrophication and Hypoxia in the Northern Gulf of Mexico," Ecol. Appl., 2007, pp. S129-S143, vol. 17, No. 5, Supplement.
Rabalais, N. et al., "Global change and eutrophication of coastal waters," ICES J. Mar. Sci., 2009, pp. 1528-1537, vol. 66.
Read, E. et al., "Phosphorus speciation in a eutrophic lake by 31P NMR spectroscopy," Water Res., 2014, pp. 229-240, vol. 62.
Russo, R. et al., "Effect of Cross-Linking with Calcium Ions on the Physical Properties of Alginate Films," Biomacromolecules, 2007, pp. 3193-3197, vol. 8, No. 10.
Schelske, C. et al., "Historic low-level phosphorus enrichment in the Great Lakes inferred from biogenic silica accumulation in sediments," Limnol. Oceanogr., 2006, pp. 728-748, vol. 51 (1, part 2).
Sengupta, S. et al., "Selective removal of phosphorus from wastewater combined with its recovery as a solid-phase fertilizer," Water Res., 2011, pp. 3318-3330, vol. 45, No. 11.
Shen, X. et al., "Hydrogels based on cellulose and chitin: fabrication, properties, and applications," Green Chem., 2016, pp. 53-75, vol. 18.
Skinner, H., "Biominerals," Mineral. Mag., Oct. 2005, pp. 621-641, vol. 69, No. 5.
Smolders, E. et al., "Internal Loading and Redox Cycling of Sediment Iron Explain Reactive Phosphorus Concentrations in Lowland Rivers," Environm. Sci. Technol., 2017, pp. 2584-2592, vol. 51, No. 5.
Stokke, B. et al., "Small-Angle X-ray Scattering and Rheological Characterization of Alginate Gels. 1. Ca-Alginate Gels," Macromolecules, 2000, pp. 1853-1863, vol. 33.
Su, Y. et al., "Strong adsorption of phosphate by amorphous zirconium oxide nanoparticles," Water Res., 2013, pp. 5018-5026, vol. 47, No. 14.
Thistleton, J. et al., "Mechanisms of Chemical Phosphorus Removal II: Iron (III) Salts," Process Saf. Environ. Prot., Trans. IChemE, Sep. 2002, pp. 265-269, vol. 80, No. 5, Part B.
Tsang, S. et al., "Determination of phosphate/arsenate by a modified molybdenum blue method and reduction of arsenate by $S2O42-$," Talanta, 2007, pp. 1560-1568, vol. 71.
Tung, M. et al., "Octacalcium Phosphate Solubility Product from 4 to 37 degrees C," J. Res. Nat. Bur. Stand., Sep.-Oct. 1988, pp. 613-624, vol. 93, No. 5.
Vijaya, Y. et al., "Synthesis and Characterization of Glutaraldehyde-Crosslinked Calcium Alginate for Fluoride Removal from Aqueous Solutions," J. Appl. Polym. Sci., 2011, pp. 3443-3452, vol. 120, No. 6.
Vohla, C. et al., "Filter materials for phosphorus removal from wastewater in treatment wetlands—A review," Ecol. Eng., Jan. 2011, pp. 70-89, vol. 37, No. 1.
Wang, L. et al., "Kinetics of Calcium Phosphate Nucleation and Growth on Calcite: Implications for Predicting the Fate of Dissolved Phosphate Species in Alkaline Soils," Environ. Sci. Technol., 2012, pp. 834-842, vol. 46.
Wang, Y. et al., "The predominant role of collagen in the nucleation, growth, structure and orientation of bone apatite," Nat. Mater., 2012, pp. 724-733, vol. 11.
Wang, L. et al., "Visualizing Organophosphate Precipitation at the Calcite-Water Interface by in Situ Atomic-Force Microscopy," Environ. Sci. Technol., 2016, pp. 259-268, vol. 50.
Wilfert, P. et al., "The Relevance of Phosphorus and Iron Chemistry to the Recovery of Phosphorus from Wastewater: A Review," Environ. Sci. Technol., 2015, pp. 9400-9414, vol. 49, No. 16.
Withers, P. et al., "Greening the global phosphorus cycle: how green chemistry can help achieve planetary P sustainability," Green Chem., 2015, pp. 2087-2099, vol. 17.
Xie, F. et al., "Removal of Phosphate from Eutrophic Lakes through Adsorption by in Situ Formation of Magnesium Hydroxide from Diatomite," Environ. Sci. Technol., 2014, pp. 582-590, vol. 48.
Yang, H. et al., "The preparation of a cross-linked cerium (III)-loaded alginate bead adsorbent for the removal of phosphate from wastewater," Desalin. Water Treat., 2015, pp. 18354-18365, vol. 57.
Yetilmezsoy, K. et al., "Recovery of ammonium nitrogen from the effluent of UASB treating poultry manure wastewater by MAP precipitation as a slow release fertilizer," J. Hazard. Mater., 2009, pp. 260-269, vol. 166.
Zhang, F. et al., "Glassy Carbon as an Absolute Intensity Calibration Standard for Small-Angle Scattering," Metall. Mater. Trans. A, May 2010, pp. 1151-1158, vol. 41A.
Zhang, Y. et al., "Enhanced Phosphate Removal by Nanosized Hydrated La(III) Oxide Confined in Cross-linked Polystyrene Networks," Environ. Sci. Technol., 2016, pp. 1447-1454, vol. 50, No. 3.
Zhao, K. et al., "Preparation, characterization and photocatalytic degradation properties of a $TiO_2$/calcium alginate composite film and the recovery of $TiO_2$ nanoparticles," RSC Adv., 2014, pp. 51321-51329, vol. 4.
Arellano-Jimenez, M. et al., "Synthesis and hydrolysis of octacalcium phosphate and its characterization by electron microscopy and X-ray diffraction," J. Physics Chem. Solids, Feb. 2009, pp. 390-395, vol. 70, No. 2.
Bajpai, S. et al., "Nano Zinc Oxide-Loaded Calcium Alginate Films with Potential Antibacterial Properties," Food Bioprocess Technol., Jul. 2012, pp. 1871-1881, vol. 5, No. 5.
Benicio, L. et al., "Layered Double Hydroxides: New Technology in Phosphate Fertilizers Based on Nanostructured Materials," ACS Sustain. Chem. Eng., 2017, pp. 399-409, vol. 5, No. 1.
Bhushan, B., "Biomimetics: lessons from nature—an overview," Phil. Trans. R. Soc. A, 2009, pp. 1445-1486, vol. 367.
Bjornoy, S. et al., "A correlative spatiotemporal microscale study of calcium phosphate formation and transformation within an alginate hydrogel matrix," Acta Biomaterialia, 2016, pp. 254-2, vol. 44.
Borkiewicz, O. et al., "Time-Resolved in SITU Studies of Apatite Formation Pathways in Aqueous Solutions," Am. Mineral., 2010, pp. 1224-1236, vol. 95, Chapter 2.
Bradford-Hartke, Z. et al., "Environmental Benefits and Burdens of Phosphorus Recovery from Municipal Wastewater," Environ. Sci. Technol., 2015, pp. 8611-8622, vol. 49, No. 14.
Brooks, A. et al., "Phosphorus removal by wollastonite: A constructed wetland substrate," Ecol. Eng., 2000, pp. 121-132, vol. 15.

(56) References Cited

OTHER PUBLICATIONS

Buda, A. et al., "Emerging Technologies for Removing Nonpoint Phosphorus from Surface Water and Groundwater: Introduction," J. Environ. Qual., May 2012, pp. 621-627, vol. 41.
Cao, X. et al., "Inhibition of calcium phosphate precipitation under environmentally-relevant conditions," Sci. Total Environ., 2007, pp. 205-215, vol. 383, Nos. 1-3.
Chapman, K. et al., "Applications of principal component analysis to pair distribution function data," J. Appl. Cryst., 2015, pp. 1619-1626, vol. 48, No. 6.
Chen, W. et al., "Microwave-Assisted Dried Volcanic Tephra/ Calcium Alginate Composite for Phosphate Removal from Micro-Polluted Wastewater," Clean Soil, Air, Water, 2014, pp. 561-570, vol. 42, No. 5.
Clark, J., "Green chemistry: challenges and opportunities," Green Chem., Feb. 1999, pp. 1-8, vol. 1.
Combes, C. et al., "Amorphous calcium phosphates: Synthesis, properties and uses in biomaterials," Acta Biomater., 2010, pp. 3362-3378, vol. 6, No. 9.
Cordell, D. et al., "The story of phosphorus: Global food security and food for thought," Global Environ. Change, 2009, pp. 292-305, vol. 19.
De Yoreo, J. et al., "In situ Investigations of Carbonate Nucleation on Mineral and Organic Surfaces," Rev. Mineral. Geochem., 2013, pp. 229-257, vol. 77.
Delgado-Lopez, J. et al., "Crystal Size, Morphology, and Growth Mechanism in Bio-Inspired Apatite Nanocrystals," Adv. Funct. Mater., 2013, pp. 1090-1099, vol. 24, No. 8.
Desimone, L. et al., "Quality of Water from Domestic Wells in Principal Aquifers of the United States, 1991-2004: Overview of Major Findings," US Department of the Interior, US Geological Survey, 2009, Circular 1332, 48 pgs.
Dey, A. et al., "The role of prenucleation clusters in surface-induced calcium phosphate crystallization," Nat. Mater., Dec. 2010, pp. 1010-1014, vol. 9.
Diaz, R. et al., "Spreading Dead Zones and Consequences for Marine Ecosystems," Sci., Aug. 15, 2008, pp. 926-929, vol. 321, No. 5891.
Dodson, J. et al., "Bio-derived Materials as a Green Route for Precious & Critical Metal Recovery and Re-use," Green Chem., 2015, pp. 1951-1965, vol. 17.
Elser, J. et al., "A broken biogeochemical cycle," Nature, Oct. 6, 2011, pp. 29-31, vol. 478.
Filippelli, G., "The Global Phosphorus Cycle," Rev. Mineral. Geochem., 2002, pp. 391-425, vol. 48, Chapter 10.
Glimcher, M., "Bone: Nature of the Calcium Phosphate Crystals and Cellular, Structural, and Physical Chemical Mechanisms in Their Formation," Rev. Mineral. Geochem., 2006, pp. 223-282, vol. 64, No. 1.
Gregory, T. et al., "Solubility of CaHPO4.2H2O in the System Ca(OH)2-H3PO4-H2O at 5, 15, 25, and 37.5 degrees C," J. Res. Nat. Bur. Stand. A, Jul.-Aug. 1970, pp. 461-475, vol. 74A, No. 4.
Gustafsson, J. et al., "Phosphate removal by mineral-based sorbents used in filters for small-scale wastewater treatment," Water Res., Jan. 2008, pp. 189-197, vol. 42, Nos. 1-2.
Habraken, W. et al., "Ion-association complexes unite classical and non-classical theories for the biomimetic nucleation of calcium phosphate," Nat. Commun., 2013, pp. 1-12, vol. 4.
Hagy, J. et al., "Hypoxia in Chesapeake Bay, 1950-2001: Long-term Change in Relation to Nutrient Loading and River Flow," Estuaries, Aug. 2004, pp. 634-658, vol. 27, No. 4.
Heistad, A. et al., "A high-performance compact filter system treating domestic wastewater," Ecol. Eng., Dec. 22, 2006, pp. 374-379, vol. 28, No. 4.
Ilavsky, J. et al., "Irena: tool suite for modeling and analysis of small-angle scattering," J. Appl. Cryst., 2009, pp. 347-353, vol. 42.
Ilavsky, J. et al., "Ultra-small-angle X-ray scattering at the Advanced Photon Source," J. Appl. Cryst., 2009, pp. 469-479, vol. 42.
Ilavsky, J. et al., "Ultra-Small-Angle X-Ray Scattering Instrument at the Advanced Photon Source: History, Recent Development, and Current Status," Metal. Mater. Trans. A, Jan. 2013, pp. 68-76, vol. 44A.
Johnston, A. et al., "Chapter Five—Phosphorus: Its Efficient Use in Agriculture," Adv. Agron., 2014, pp. 177-228, vol. 123.
Joshi, S. et al., "Organic Matter Remineralization Predominates Phosphorus Cycling in the Mid-Bay Sediments in the Chesapeake Bay," Environ. Sci. Technol., 2015, pp. 5887-5896, vol. 49.
Jun, Y-S. et al., "In Situ Observations of Nanoparticle Early Development Kinetics at Mineral-Water Interfaces," Environ. Sci. Technol., 2010, pp. 8182-8189, vol. 44.
Jun, Y-S. et al., "Heterogeneous Nucleation and Growth of Nanoparticles at Environmental Interfaces," Acc. Chem. Res., 2016, pp. 1681-1690, vol. 49.
Karaca, S. et al., "Kinetic modeling of liquid-phase adsorption of phosphate on dolomite," J. Colloid Interface Sci., 2004, p. 257-263, vol. 277, No. 2.
Kim, D. et al., "In Situ Evaluation of Calcium Phosphate Nucleation Kinetics and Pathways during Intra- and Extrafibrillar Mineralization of Collagen Matrices," HHS Public Access Author Manuscript, Jul. 25, 2017, pp. 1-20, published in final edited form as: Cryst. Growth Des., 2016, pp. 5359-5366, vol. 16, No. 9.
Kim, D. et al., "Designing the crystalline structure of calcium phosphate seed minerals in organic templates for sustainable phosphorus management," Green Chem., 2018, pp. 534-543, vol. 20.
Landis, W. et al., "Mineral and Organic Matrix Interaction in Normally Calcifying Tendon Visualized in Three Dimensions by High-Voltage Electron Microscopic Tomography and Graphic Image Reconstruction," J. Struct. Biol., 1993, pp. 39-54, vol. 110, No. 1.
Li, Y. et al., "Phosphate removal from aqueous solutions using raw and activated red mud and fly ash," J. Hazard. Mater., 2006, pp. 374-383, vol. B137.
Li, Q. et al., "Interfacial Energies for Heterogeneous Nucleation of Calcium Carbonate on Mica and Quartz," Environ. Sci. Technol., 2014, pp. 5745-5753, vol. 48, No. 10.
Lougheed, T., "Phosphorus Recovery. New Approaches to Extending the Life Cycle," Environ. Health Perspect., Jul. 2011, pp. A302-A305, vol. 119, No. 7.
Lu, X. et al., "Theoretical analysis of calcium phosphate precipitation in simulated body fluid," Biomaterials, Apr. 2005, pp. 1097-1108, vol. 26, No. 10.
McCobb, T. et al., "Phosphorus in a Ground-Water Contaminant Plume Discharging to Ashumet Pond, Cape Cod, Massachusetts, 1999," U.S. Department of the Interior, U.S. Geological Survey, 2003, pp. 1-69, Water-Resources Investigations Report 02-4306.
McDowell, H. et al., "Solubility of Ca5(PO4)3OH in the System Ca(OH)2-H3PO4-H2O at 5, 15, 25, and 37 degrees C," J. Res. Nat. Bur. Stand. A, Mar.-Jun. 1977, pp. 273-281, vol. 81A, Nos. 2 and 3.
Nair, L. et al., "Biodegradable polymers as biomaterials," Prog. Polym. Sci., 2007, pp. 762-798, vol. 32.
Nilsson, A. et al., "The structural origin of anomalous properties of liquid water," Nat. Commun., 2015, pp. 1-11, vol. 6, No. 8998.
Olszta, M. et al., "Bone structure and formation: A new perspective," Mater. Sci. Eng. R, 2007, pp. 77-116, vol. 58.
Parsons, S. et al., "Phosphorus Removal and Recovery from Municipal Wastewaters," Elements, Apr. 2008, pp. 109-112, vol. 4, No. 2.

* cited by examiner

| SI | C. Bay | LA | IL |
|---|---|---|---|
| < 0 | 12 | 0 | 3 |
| 0-2 | 9 | 0 | 2 |
| 2-4 | 17 | 0 | 0 |
| 4-6 | 6 | 1 | 0 |
| > 6 | 4 | 1 | 0 |
| total | 48 | 2 | 5 |
| % saturated | 75 | 100 | 40 |

After 4 hours in 100 mM NaCl 0.6% Alg + 35 mM P

ENGINEERED CALCIUM ALGINATE AND USES THEREOF

CROSS REFERENCE TO RELATED APPLICATIONS

This application claims the benefit of U.S. Provisional Application No. 62/663,700, filed Apr. 27, 2018 the disclosure of which is herein incorporated by reference in its entirety.

FIELD OF THE TECHNOLOGY

The present disclosure relates to biodegradable materials and methods of removing phosphorus from water. The present disclosure also relates to methods of making and using fertilizer compositions which release phosphorus into the surrounding soil.

BACKGROUND

Eutrophication of lakes and other natural bodies of water, caused by the presence of excess nutrients, is a growing problem. Phosphate is delivered to surface and ground water as a result of agricultural and feedlot run-offs, and municipal and industrial wastewaters. Treatment of domestic and agro-industrial wastewater often releases large amounts of phosphorus and nitrogen into water. Excess phosphorous concentration (>1.0 mg/L P) in water bodies causes eutrophication of aquatic ecosystems, which results in deterioration of water quality. Therefore, it is important to reduce phosphorous concentrations in water to improve water quality.

On the other hand, phosphorus is essential for plant growth and is an important constituent of agricultural fertilizers. Phosphorous is typically obtained by mining inorganic phosphate rocks, such as apatite, followed by chemical treatment to produce phosphoric acid, thereby generating phosphate. These natural supplies of inorganic phosphate are, however, diminishing. With increasing world population the demand for phosphorous for food production is estimated to peak sometime between 2030 and 2040. It is predicted that world phosphorous production will begin to decline around 2035. The possible shortfall of phosphorous fertilizers is a major concern for global food security.

Therefore, a method to remove and/or recover phosphorus from water is needed, coupled with a method to then reuse the phosphorus as a fertilizer.

SUMMARY

One aspect of the present disclosure is directed to a biodegradable material. The biodegradable material comprises alginate seeded with calcium phosphate (CaP), calcium carbonate ($CaCO_3$), and combinations thereof.

Another aspect of the present disclosure is directed to a method for making calcium seeded calcium alginate beads. The method comprises (a) adding sodium alginate dropwise into a bath comprising $CaCl_2$ and NaOH and stirring to produce sodium alginate beads; and (b) combining the sodium alginate droplets with a phosphate salt to seed calcium phosphate (CaP) or a bicarbonate salt to seed calcium carbonate ($CaCO_3$) within the calcium alginate beads to form calcium seeded calcium alginate beads.

An additional aspect of the present disclosure is directed to method of recovering or removing a nutrient from an aqueous medium. The method comprises contacting the aqueous medium with calcium mineral-seeded calcium alginate beads under conditions and for a time effective to adsorb the nutrient.

Yet another aspect of the present disclosure is directed to a method of delivering a necessary nutrient to soil. The method comprises contacting the soil with a plurality of calcium mineral-seeded calcium alginate beads conjugated to the nutrient under conditions and for a time effective to release the nutrient.

BRIEF DESCRIPTION OF THE FIGURES

The application file contains at least one drawing executed in color. Copies of this patent application publication with color drawing(s) will be provided by the Office upon request and payment of the necessary fee.

(FIG. 2D, FIG. 2E, and FIG. 2F) Average and standard deviation values of P, Ca, and pH in these three areas are shown separately in the right column figures.

(FIG. 3E and FIG. 3F) Ca-Alg/CaP after three cycles of P removal experiments (24 hours for one cycle) under HA-supersaturated and HA-undersaturated conditions.

(FIG. 8A) WAXD patterns, (FIG. 8B) X-ray PDF analyses, and (FIG. 8C) USAXS patterns of Ca-Alg/CaP prepared with different OH$^-$ concentrations (0-20 mM).

(FIG. 9B) Equilibrium aqueous P concentrations in the presence of Ca-Alg/CaP during three cycles of P release experiments. (FIG. 9C) P release kinetics from Ca-Alg/CaP beads (0 mM OH$^-$) in sand columns.

(FIG. 12A) The influence of NH$_4^+$ at 0.1-10 mM Mg in the system. (FIG. 12B) The influence of pH at 0.1-10 mM NH$_4$. Thermodynamic equilibrium calculations were conducted by Visual MINTEQ (Ver. 3.1). Our simulation result shows that in most cases, even at high Mg$^{2+}$ and NH$_4^+$ concentrations up to 10 mM, the HA-supersaturated solution was undersaturated with respect to struvite at neutral pH. For comparison, typical levels of NH$_4^+$ in toilet water[22] and Mg$^{2+}$ in fresh urine[23] are around 5 and 4 mM, respectively.

(FIG. 15A) illustrates the kinetics of P removal using CaP beads vs. Phoslock. (FIG. 15B) illustrates the amount of initial product that was dissolved in the aqueous medium. (FIG. 15C) is a series of representative photographs showing recovery or lack thereof, of CasP beads of Phoslock using a teabag, respectively.

DETAILED DESCRIPTION

Figure 1A:
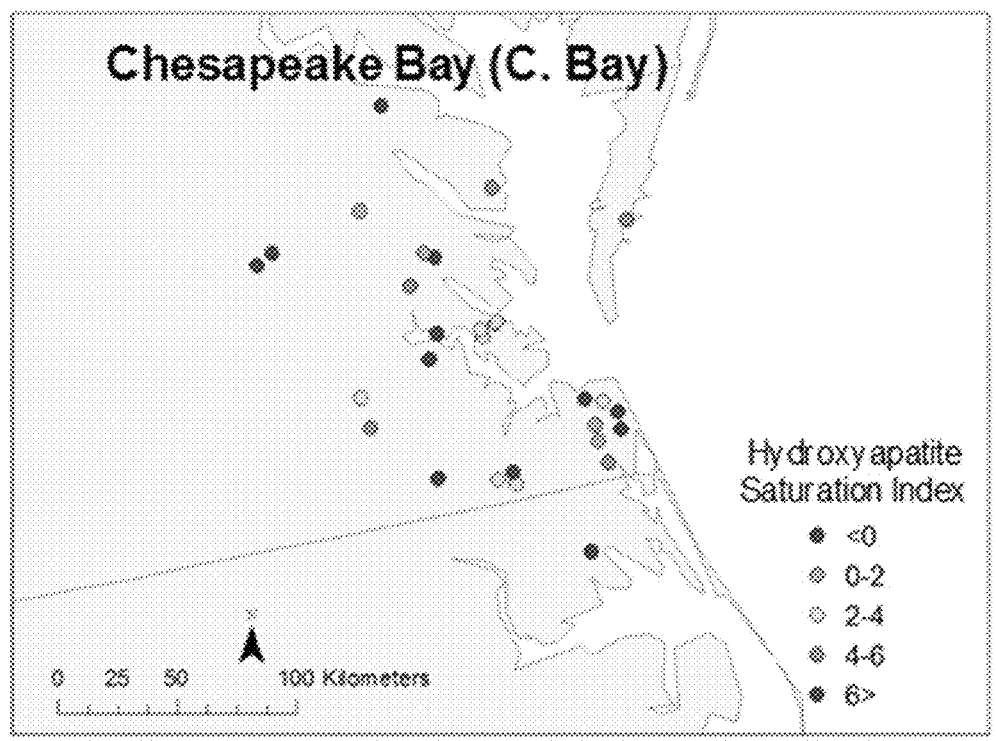
FIG. 1A, FIG. 1B, and FIG. 1C depict hydroxyapatite SI maps of the (FIG. 1A) Chesapeake Bay (C. Bay), (FIG. 1B) Louisiana (LA), and (FIG. 1C) northern Illinois (IL) areas. The SI values were calculated using Visual MINTEQ. The table at the bottom right corner summarizes the number of sampling sites categorized into different SI values.

Applicants have discovered that calcium alginate beads with embedded calcium-bearing seed minerals can be used to effectively remove or recover phosphorus from water. In certain embodiments, the phosphorus may then be reused as a fertilizer.

Additional aspects of the invention are described below.

I. Biodegradable Materials

One aspect to the present disclosure encompasses a biodegradable material comprising alginate complexed with calcium phosphate (CaP), calcium carbonate (CaCO$_3$), and combinations thereof.

Other aspects of the biodegradable material are described in further detail below.

(a) Source of Alginate

In general, the biodegradable material comprises a source of alginate.

Suitable sources of alginate may include any salt derivate of alginate. In some embodiments, the salt derivative of alginate may be sodium alginate or calcium alginate. In an exemplary embodiment, the salt derivative of alginate may be sodium alginate.

(b) Seed Mineral

In general, the biodegradable material is complexed with a seed mineral.

Suitable seed minerals include, without limit, calcium phosphate (CaP), calcium carbonate (CaCO$_3$), calcium oxide, calcium silicate hydrate, lanthanum carbonate, lanthanum oxide, ferric oxides, ferrous chloride, ferric chloride, modified and unmodified clay minerals. In an exemplary embodiment, the seed mineral may comprise calcium phosphate (CaP). In a different exemplary embodiment, the seed mineral may comprise calcium carbonate (CaCO$_3$). In another exemplary embodiment, the seed mineral may comprise calcium phosphate (CaP), calcium carbonate (CaCO$_3$), and combinations thereof.

(c) Phosphorus Containing Compound

In an embodiment, the biodegradable material may further comprise at least one phosphorus containing compound.

Suitable phosphorus containing compounds include, without limit, orthophosphate (PO$_4^{3-}$), hydrogen phosphate (HPO$_4^{2-}$), dihydrogen phosphate, (H$_2$PO$_4^-$), magnesium ammonium phosphate (MgNH$_4$PO$_4$.6H$_2$O, struvite), hydroxyapatite, a polyphosphate, an organic phosphate, bone meals or dried manures from biowaste, and scaling by products during wastewater treatments.

(d) Physical Properties

The biodegradable material may be described by one or more physical properties, including crystallinity, form or shape, size, etc.

(i) Crystallinity

The crystallinity of material may be described by amorphous prior to phosphate seed embedment. After complex with seed, the crystallinity of material may be described by hydroxyapatite structure. Depending on the condition of seed formation, the material may have intermediate crystallinity between amorphous and hydroxyapatite. By carbonate seed formation, the material's crystallinity may be described by calcite, vaterite, aragonite, and amorphous calcium carbonate.

(ii) Form

In an embodiment, the biodegradable material is in the form of a bead, a sol, a gel, a hydrogel, a capsule, a particle, a nanoparticle, a slurry, a matrix, or any other form that can be used in an aqueous environment to contact aqueous or dissolved ions. In an exemplary embodiment, the biodegradable material is in the form of a bead.

(iii) Size

In an embodiment, the beads may have a diameter of from about 2.0 mm to about 5.0 mm. In some embodiments, the beads may have a diameter of from about 2.0 mm, about 2.1 mm, about 2.2 mm, about 2.3 mm, about 2.4 mm, about 2.5 mm, about 2.6 mm, about 2.7 mm, about 2.8 mm, about 2.9 mm, about 3.0 mm, about 3.1 mm, about 3.2 mm, about 3.3 mm, about 3.4 mm, about 3.5 mm, about 3.6 mm, about 3.7 mm, about 3.8 mm, about 3.9 mm, about 4.0 mm, about 4.1 mm, about 4.2 mm, about 4.3 mm, about 4.4 mm, about 4.5 mm, about 4.6 mm, about 4.7 mm, about 4.8 mm, about 4.9 mm, or about 5.0 mm.

II. Synthesis

Another aspect of the present disclosure encompasses a method for making calcium mineral-seeded calcium alginate beads. The method comprises (a) adding sodium alginate dropwise into a bath of $CaCl_2$ and NaOH and stirring to produce sodium alginate beads; and (b) combining the sodium alginate beads with a phosphate salt to seed calcium phosphate (CaP) or a bicarbonate salt to seed calcium carbonate ($CaCO_3$) within the calcium alginate beads to form calcium seeded calcium alginate beads.

(a) Stirring Step

In general, a suitable salt derivative of alginate may be added to a bath containing a source of calcium and a base. The salt derivative of alginate may be added in a dropwise fashion to the bath containing calcium and a base. Without being bound by theory, once the alginate comes into contact with the bath, sodium alginate beads will form.

The salt derivatives of alginate are described in Section (I)(a).

(i) Bath Components

In general, the bath comprises a source of calcium and a base.

Sources of calcium include, without limit, $CaCl_2$, $CaCO_3$, $Ca(IO_3)_2$, $CaBr_2$, $Ca(NO_2)_2$, $CaC_2O_4$, and the like. In an exemplary embodiment, the source of calcium may be $CaCl_2$.

In general, the amount of calcium in the bath can and will vary depending upon the amount of calcium alginate beads to be formed. In an embodiment, the amount of calcium in the bath may be from about 50 mM to about 300 mM. In some embodiments, the amount of calcium in the bath may be about 50 mM, about 60 mM, about 70 mM, about 80 mM, about 90 mM, about 100 mM, about 110 mM, about 120 mM, about 130 mM, about 140 mM, about 150 mM, about 160 mM, about 170 mM, about 180 mM, about 190 mM, about 200 mM, about 210 mM, about 220 mM, about 230 mM, about 240 mM, about 250 mM, about 260 mM, about 270 mM, about 280 mM, about 290 mM, or about 300 mM. In an exemplary embodiment, the amount of calcium in the bath may be about 180 mM.

Sources of bases include, without limit, NaOH, KOH, and the like. In an exemplary embodiment, the base may be NaOH.

In general, the amount of base in the bath can and will vary depending upon the amount of calcium alginate beads to be formed. In an embodiment, the amount of base in the bath may be from about 0 mM to about 50 mM. In some embodiments, the amount of base in the bath may be about 0 mM, about 5 mM, about 10 mM, about 15 mM, about 20 mM, about 25 mM, about 30 mM, about 35 mM, about 40 mM, about 45 mM, or about 50 mM. In an exemplary embodiment, the amount of base in the bath may be about 20 mM.

Without being bound by theory, it is believed that higher Ca concentrations will make smaller sized beads and higher amounts of base will increase the amount of crystallinity in the beads (more hydroxyapatite-like structure, rather than amorphous).

The pH of the bath increases with base concentrations. In an exemplary embodiment with 180 mM Ca, pH is about 6.9 with 0 mM base, but it increases up to 11.9 with 20 mM base.

Without being bound by theory, it is thought that the pH of the bath alters the crystallinity of the calcium-mineral seeded calcium alginate beads. Additionally, without being bound by theory, it is thought that as the pH increases so does the crystallinity, and as the pH decreases so does the crystallinity.

(ii) Time

In general, after the sodium alginate is added to the bath, the mixture is stirred for a time ranging from about 1 minute to about greater than 1 minute. In some embodiments, the mixture is stirred for a time ranging from about 2 minutes to about 5 minutes.

(iii) Temperature

In general, after the sodium alginate is added to the bath, the mixture is stirred at an elevated temperature, room temperature, or cooled temperature.

(b) Seeding Step

In general, the calcium alginate beads may be seeded by combining them with a seed mineral precursor to form calcium-mineral seeded calcium alginate beads. Following seeding, the calcium seeded calcium alginate beads will settle at the bottom of the bath.

(i) Seed Mineral Precursor

In general, the seed mineral precursor may be a phosphate derivative or a bicarbonate derivative.

Suitable phosphate salts include, without limit, disodium phosphate ($Na_2HPO_4$), monosodium phosphate ($NaH_2PO_4$), dibasic potassium phosphate ($K_2HPO_4$) and monopotassium phosphate ($KH_2PO_4$). In an exemplary embodiment, the phosphate derivative may be disodium phosphate ($Na_2HPO_4$).

Suitable bicarbonate salts include, without limit, sodium bicarbonate ($NaHCO_3$), sodium carbonate ($Na_2CO_3$), potassium bicarbonate ($KHCO_3$), and potassium carbonate ($K_2CO_3$). In an exemplary embodiment, the bicarbonate derivative may be sodium bicarbonate ($NaHCO_3$).

III. Methods of Use

An additional aspect of the present disclosure encompasses a method of recovering or removing a nutrient from an aqueous medium, the method comprising contacting the aqueous medium with a plurality of calcium seeded calcium alginate beads under conditions and for a time effective to adsorb a nutrient.

The calcium seeded calcium alginate beads are described in Section (I) and Section (II) hereinabove. The phosphorus is described in Section (I)(c) hereinabove.

(a) Nutrient

In general, the method comprises recovering or removing a nutrient from an aqueous medium.

Suitable nutrients include, without limit, phosphorus, magnesium, nitrogen, iron, manganese, and combinations thereof.

In some embodiments, magnesium and nitrogen can be recovered by forming struvite ($NH_4MgPO_4$) or dolomite ($CaMg(CO_3)_2$) in the beads. In other embodiments, iron and manganese can be recovered by forming (hyr)oxide minerals.

(b) Aqueous Medium

In general, the method comprises contacting calcium mineral-seeded calcium alginate beads with an aqueous medium.

Suitable aqueous mediums include, without limit, surface water, ground water, an aquifer, well water, a eutrophic lake, municipal and industrial wastewater, agricultural runoff, effluent from water or sewer treatment plants, acid mine drainage, sludge, groundwater, a eutrophic lake, a phosphorus-rich reservoir, a livestock farm waste, or a toilet wastewater, a reservoir, well water, a marsh, swamp, a bay, an estuary, a river, a stream, an aquifer, a tidal or intertidal area, or a sea or an ocean. In a preferred embodiment, the aqueous medium may be a eutrophic lake, a phosphorus-rich reservoir, a livestock farm waste, or a toilet wastewater.

In different embodiment, the aqueous medium may be disposed within a stationary treatment medium. Suitable stationary treatment mediums include, without limit, permeable reactive barrier, a slurry wall, a filtration bed, or a filter.

In an embodiment, the aqueous medium may have a neutral pH. In some embodiments, the aqueous medium may have a pH of about 7.

(c) Reaction Conductions

In an embodiment, the calcium mineral-seeded calcium alginate beads are contacted with the aqueous medium for about 1 hour to about 24 hours. In some embodiments, the calcium mineral-seeded calcium alginate beads are contacted with the aqueous medium for about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, or about 24 hours.

In other embodiments, the calcium mineral-seeded calcium alginate beads are contacted with the aqueous medium for less than about 24 hours.

In general, the amount of calcium mineral-seeded calcium alginate beads needed to recover or remove phosphorus from an aqueous medium may vary depending on the aqueous medium and the amount of phosphorus in the aqueous medium. In some embodiments, the amount of calcium mineral-seeded calcium alginate beads may range from about 1 mL to about 10 mL per 100 mL of aqueous medium.

Still an additional aspect of the present disclosure encompasses a method of delivering phosphorus to soil, the method comprising contacting the soil with calcium mineral-seeded calcium alginate beads conjugated to phosphorus under conditions and for a time effective to release the phosphorus.

The calcium mineral-seeded calcium alginate beads are described in Section (I) and Section (II) hereinabove.

In an embodiment, the method may further comprise transporting the calcium mineral-seeded calcium alginate beads conjugated to phosphorus to the soil application site. At the application site, a plant disposed in the soil can take up the phosphorus nutrient from the calcium-mineral seeded calcium alginate beads. The phosphorus can be released slowly over time and its concentrations will be sufficiently high to grow plants.

In general, the release of the nutrient may and will be determined by the crystallinity of the seed materials in the beads, pH of soil or aqueous water, types of soils, types of plants, etc.

In an embodiment, the phosphorus may be released over a period of time from about 30 minutes to about 72 hours. In other embodiments, the phosphorus may be released over a period of less than 1 hour, about 1 hour, about 2 hours, about 3 hours, about 4 hours, about 5 hours, or greater than 5 hours. In some embodiments, the phosphorus may be released over a period of greater than 24 hours, greater than 48 hours, or greater than about 72 hours.

Definitions

When introducing elements of the present disclosure or the preferred aspects(s) thereof, the articles "a," "an," "the," and "said" are intended to mean that there are one or more of the elements. The terms "comprising," "including," and "having" are intended to be inclusive and mean that there may be additional elements other than the listed elements.

As used herein, the following definitions shall apply unless otherwise indicated. For purposes of this invention, the chemical elements are identified in accordance with the Periodic Table of the Elements, CAS version, and the Handbook of Chemistry and Physics, $75^{th}$ Ed. 1994. Additionally, general principles of organic chemistry are described in "Organic Chemistry," Thomas Sorrell, University Science Books, Sausalito: 1999, and "March's Advanced Organic Chemistry," $5^{th}$, Smith, M. B. and March, J., eds. John Wiley & Sons, New York: 2001, the entire contents of which are hereby incorporated by reference.

EXAMPLES

The following examples are included to demonstrate various embodiments of the present disclosure. It should be appreciated by those of skill in the art that the techniques disclosed in the examples that follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

As used herein, the following definitions shall apply unless otherwise indicated. For purposes of this invention, the chemical elements are identified in accordance with the Periodic Table of the Elements, CAS version, and the Handbook of Chemistry and Physics, 75th Ed. 1994. Additionally, general principles of organic chemistry are described in "Organic Chemistry," Thomas Sorrell, University Science Books, Sausalito: 1999, and "March's Advanced Organic Chemistry," 5th Ed., Smith, M. B. and March, J., eds. John Wiley & Sons, New York: 2001, the entire contents of which are hereby incorporated by reference.

The following abbreviations are used throughout the Examples: Alg: alginate; Ar: argon; Au: gold; HA: hydroxyapatite; Pd: palladium; PDF: X-ray pair distribution function; SEM: scanning electron microscope; SI: saturation index; SAXS: small-angle X-ray scattering; USAXS: ultra-small-angle X-ray scattering; WAXD: wide-angle X-ray diffraction; and XRD: X-ray diffraction.

Example 1: Designing the Crystalline Structure of Calcium Phosphate Seed Minerals in Organic Templates for Sustainable Phosphorus Management
Introduction Recent anthropogenic activities, such as deforestation and fertilization, have doubled natural dissolved P fluxes.[1,2] This increased release is turning P into a pollutant that poses significant threats, such as mass die-offs of aqueous organisms owing to significant eutrophication in local aquatic systems.[3,4] On the other hand, the sustainability of the global P cycle will also be significantly endangered by an increase in P mining from limited natural sources to supply fertilizers for agricultural production. Unfortunately, these mines are located in only a few countries, such as Western Sahara, which is the largest P rock exporter to Europe.[4,5]

Recycling P from wastewater streams or eutrophic water bodies can be an environmentally sustainable approach to mitigate the imbalance of the global P cycle, securing food and water for a growing population.[6-8] P recovery as struvite ($MgNH_4PO_4 \cdot 6H_2O$) is a promising strategy in enhanced biological P removal facilities with anaerobic digesters.[7,9,10] Where this centralized treatment option is not feasible, such as in the remediation of eutrophic reservoirs, then other approaches, including chemical precipitation,[7] constructed wetlands,[11] and column filtration,[12,13] can be used to prevent P pollution of aqueous environments. These strategies rely highly on chemical reactions, such as sorption and ion exchange, between phosphate and cationic Ca, Fe, or Al species in solutions or on the surfaces of natural or engineered materials.[9,13] In particular, P removal efficiency has shown good correlations with the CaO and Ca contents in filter materials ($R^2=0.51$ and 0.43, respectively).[13] While many of these materials have shown effective P removal, challenges still handicap practical operations: For example, filtration materials can become clogged, thus reducing the interval between replacements.[10,13] The pH of effluents is another important concern, because many CaO or Ca-bearing materials often result in treated effluent pH higher than[10,13-17] thus requiring secondary pH adjustment or buffering chemicals. Chemical precipitation using ferric or aluminum salts also needs to be operated at pH below 5 to prevent undesired hydroxide mineral formation.[7,18] Additionally, these approaches have some limitations for on-site restoration, such as of eutrophic lakes, because many sorption and precipitation reactions are easily reversible.[12,19] In other words, if the immobilized P is not totally separated from the environment, P can be released again when the water chemistry changes for natural or anthropogenic reasons.[20]

While evaluating the water quality of eutrophic environments in the USA,[21,22] it was found that many groundwater samples in the Chesapeake Bay and the available data set from Louisiana area were indeed supersaturated with respect to hydroxyapatite (HA, $Ca_5(PO_4)_3OH$), which is the most thermodynamically stable calcium phosphate mineral (CaP) at neutral pH.[23] P concentrations in these areas remain higher than those at equilibrium condition, thus increasing the risk of eutrophication. Further, this risk can be significantly enhanced during summers in certain areas, where P-binding iron oxides are abundant because these minerals are reductively dissolved by the decreasing dissolved oxygen level with increasing temperature.[24] Interestingly, a similar situation involving maintaining an HA-supersaturated condition without precipitation can be found in physiological body fluid systems (pH 7.4).[25-27] Recent studies demonstrated that a combined structure of CaP nuclei and fibrillar collagen protein is a key to the bone mineralization, driving the deposition of aqueous Ca and P species in specific locations within the fibrillar structure.[28,29] This process can provide useful insights for regulating P levels in environmental aqueous systems with high nucleation energy barriers.

Here, a new strategy to manage P in aqueous systems by recovering it from nutrient-rich aqueous solutions and reusing it as a slow-releasing fertilizer is proposed. A composite material of biological substrates and embedded mineral seed nuclei can help overcome the nucleation energy barrier for CaP in aqueous environments supersaturated with HA. As a biological organic substrate, alginate (($C_{12}H_{14}CaO_{12})_n$) bead was chosen due to its abundance in nature and its benign properties.[30] Furthermore, its biodegradation in soil, which produces the most basic units of carbohydrates, such as uronic acids, makes it environmentally sustainable as a fertilizer.[31,32] Replacement of $Na^+$ by $Ca^{2+}$ in the alginate structure naturally forms a spherical bead.[30] This form has been effectively used to encapsulate synthetic nanoparticles or minerals utilized for their catalytic[33-35] and adsorptive properties[36-38] in environmental applications. Unlike previous applications that simply embed pre-synthesized or stable natural minerals, the present disclosure uses the nucleation of reactive CaP seed mineral particulates directly initiated from ionic precursors during the beads' formation. This straightforward preparation allowed a better control of the crystalline structures of seed minerals without using any hazardous substance or additional energy input.[39] Utilizing the properties of calcium phosphate minerals with different crystallinities in alginate beads is a novel approach for P management in aqueous systems. For comparison with the CaP seed minerals, carbonate ($CaCO_3$) was used,[40-42] which is another representative biomineral, to simulate potential substrates for CaP nucleation in natural systems.[43]

The present example establishes the feasibility of mineral/organic composites prepared from naturally abundant resources for P management in aqueous systems at neutral pH. The degree of CaP seed crystallization in the beads was evaluated as a critical factor governing the equilibrium P concentration during the removal and release processes. The findings suggest that engineering the thermodynamic driving force of CaP nucleation is a promising way to regulate P levels in both P-abundant and P-deficient environments as a green chemistry solution.

Experimental

Hydroxyapatite Saturation Index (SI) Mapping of Groundwater:

The actual SI values (the log of the ion activity product, IAP, divided by the solubility product, $K_{sp}$) of groundwater samples from three areas in the USA. The Chesapeake Bay area (C. Bay) was chosen because of the frequent occurrence of eutrophication in this region due to inflows from natural and anthropogenic sources.[71,72] Similarly, the coastal Louisiana area (LA) has also faced issues associated with eutrophication and high P levels in the water.[73] Contrarily, an area in northern Illinois area (IL) near Lake Michigan was chosen because of this region's reputation for low P levels,[74] but this area may show relatively high Ca levels due to its calcareous soils.[75]

Groundwater monitoring data (1970-2007) were collected from the USGS National Groundwater Monitoring Network (NGWMN),[21] then processed to determine whether environments were actually supersaturated with respect to HA (HA-supersaturated). The latest data from groundwater samples, including pH, total P (assumed to be equal to total phosphate) concentration, hardness, and total dissolved solid values, were selected as input parameters for Visual MINTEQ (Ver. 3.1), which calculates the SI using its built-in database. Hardness data (as $CaCO_3$) were used as input parameters of $Ca^{2+}$, unless $Ca^{2+}$ concentration was given specifically. The concentrations of $Ca^{2+}$, aqueous carbonate species, $Na^+$, and $Cl^-$ were considered to calculate the ionic strength. By assuming that the amount of total dissolved solids is the sum of the hardness and NaCl, the concentrations of NaCl was estimated. Organic molecules, such as natural organic matter and extracellular matrix proteins from microorganisms, may influence the saturation condition or nucleation energy barrier by complexation with $Ca^{2+}$ or other aqueous species.[76,77] However, in this proof of concept calculation, the input parameters to the inorganic compounds listed above were limited. The SI values for HA, as the output parameters of the software, were placed on SI maps (FIG. 1A, FIG. 1B, and FIG. 1C) created by ArcGIS (Esri, USA), using longitude and latitude information from the NGWMN database.[21]

Figure 1B:
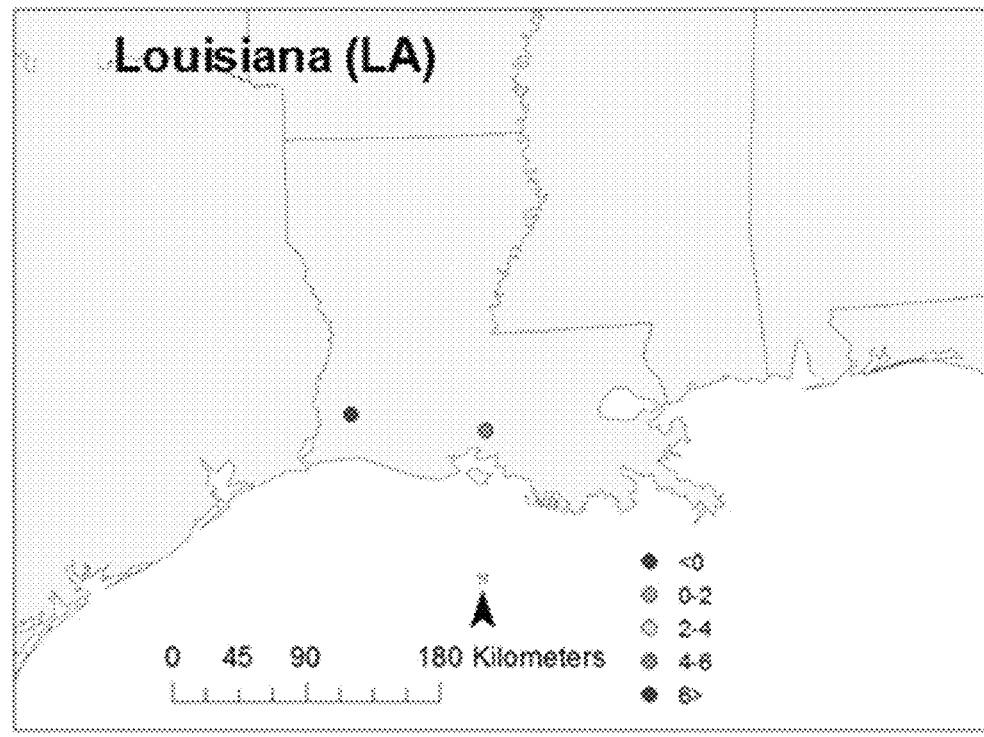

Analysis of SI:

Based on our thermodynamic calculations of the SI values for HA, interestingly, 36 out of 48 groundwater samples (75%) in the C. Bay area were HA-supersaturated (FIG. 1A). Most of the HA-supersaturated sampling points were close to the Bay, indicating that significant Ca and P concentrations have been introduced into the ocean through the groundwater. Two sampling sites were studied from LA, and the SI values of both sites were higher than 4 (FIG. 1B). Because of the limited data available, the result may not represent the entire LA area. However, this result also shows that multiple aqueous environments are HA-supersaturated. In contrast, only two out of five sites were slightly HA-supersaturated (0<SI<2) in northern IL, and other three sites were undersaturated with respect to HA (SI<0, FIG. 1C).

Figure 2A:
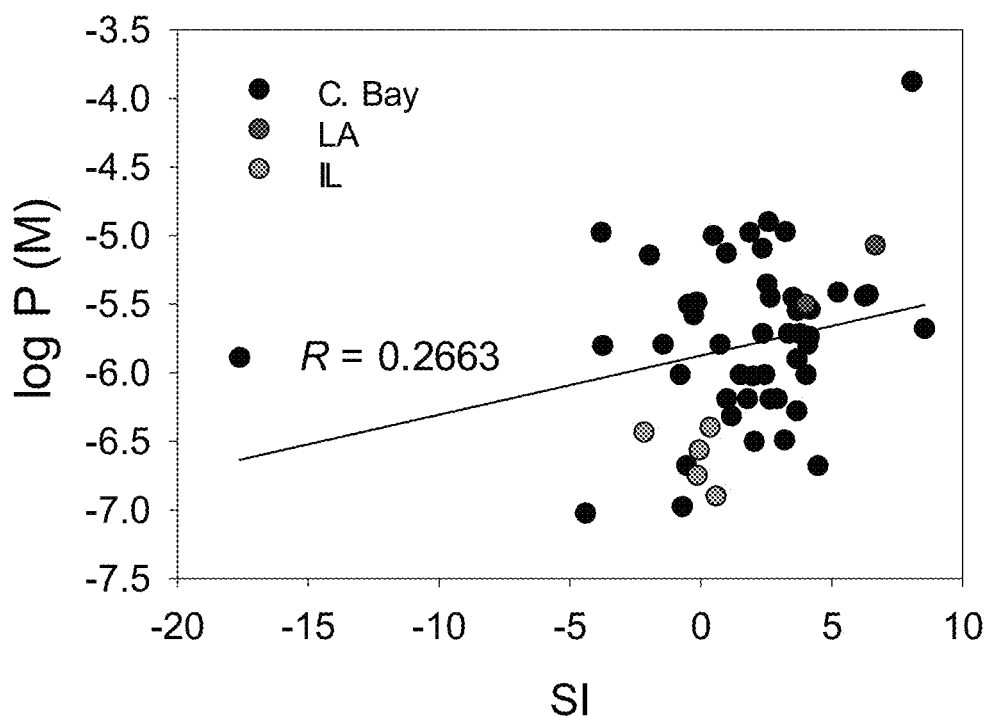
FIG. 2A, FIG. 2B, FIG. 2C, FIG. 2D, FIG. 2E, and FIG. 2F (FIG. 2A, FIG. 2B, and FIG. 2C) Relationships between the SI for HA and concentrations of P, Ca, and pH in three areas studied (C. Bay, Chesapeake Bay; LA, Louisiana; IL, northern Illinois). R is the correlation coefficient from the linear relationship.
Figure 2B:
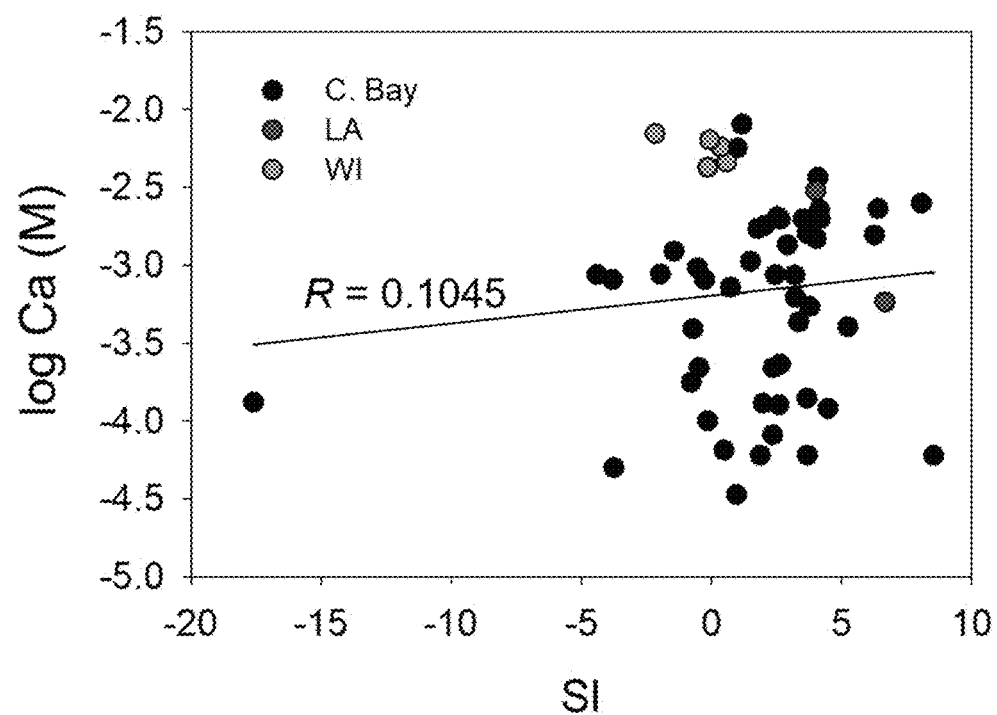
Figure 2C:
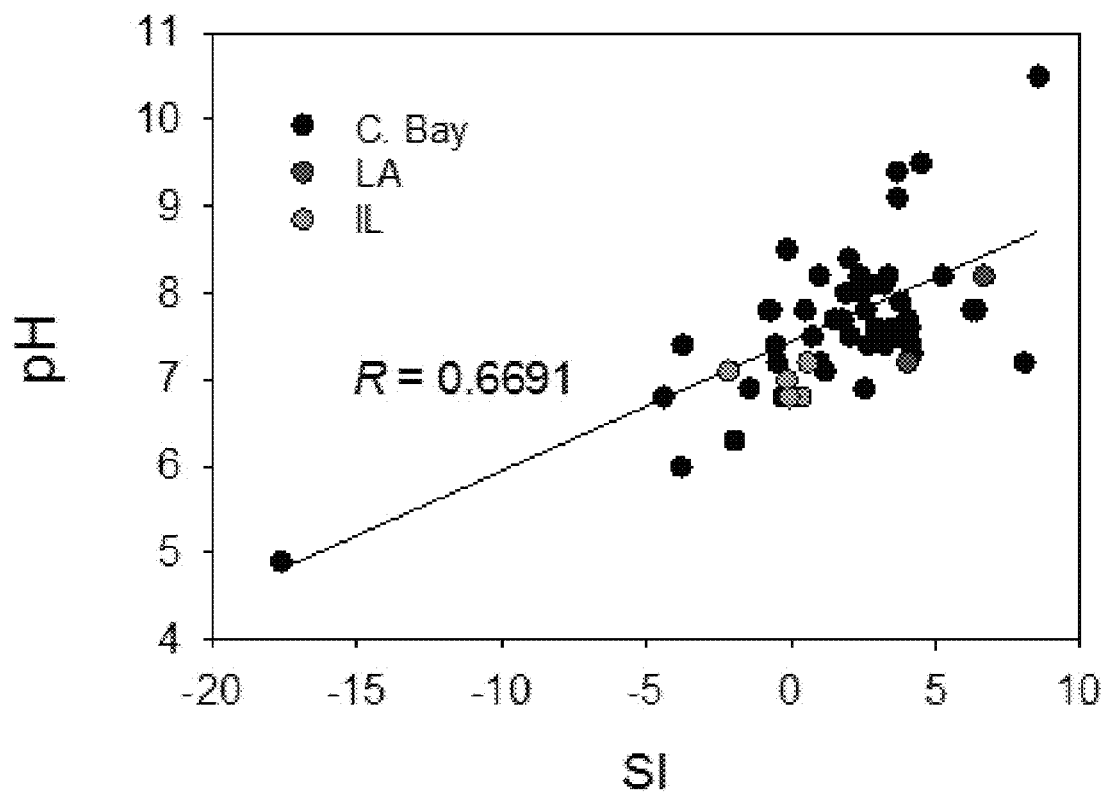
Figure 2D:
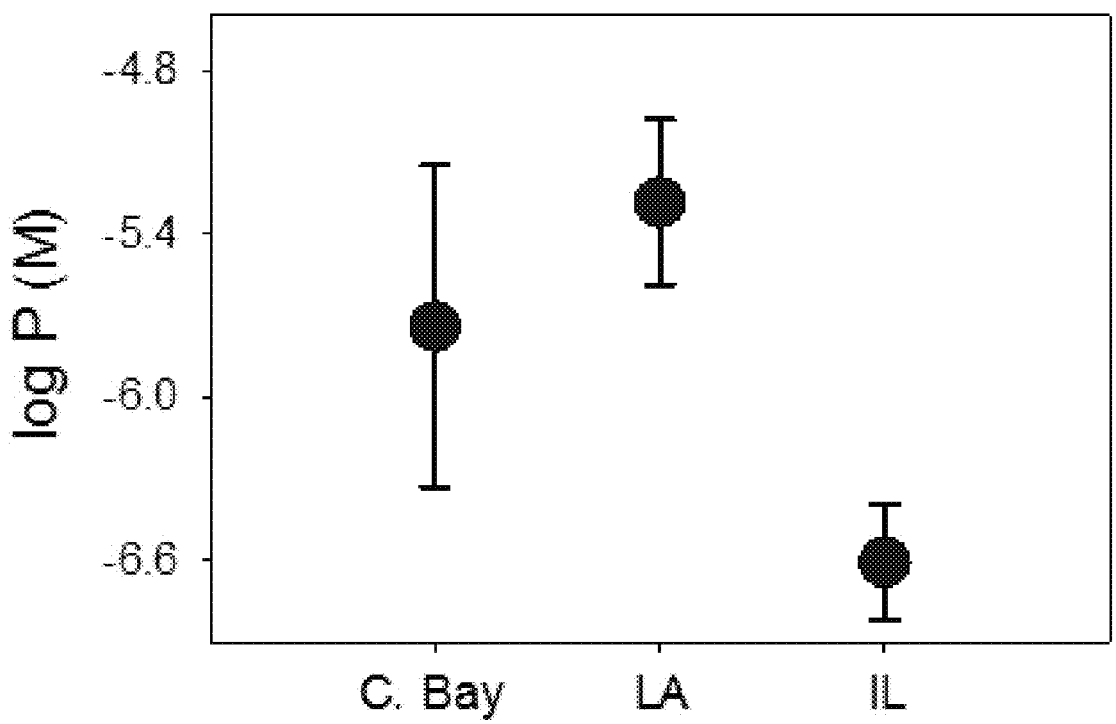
Figure 2E:
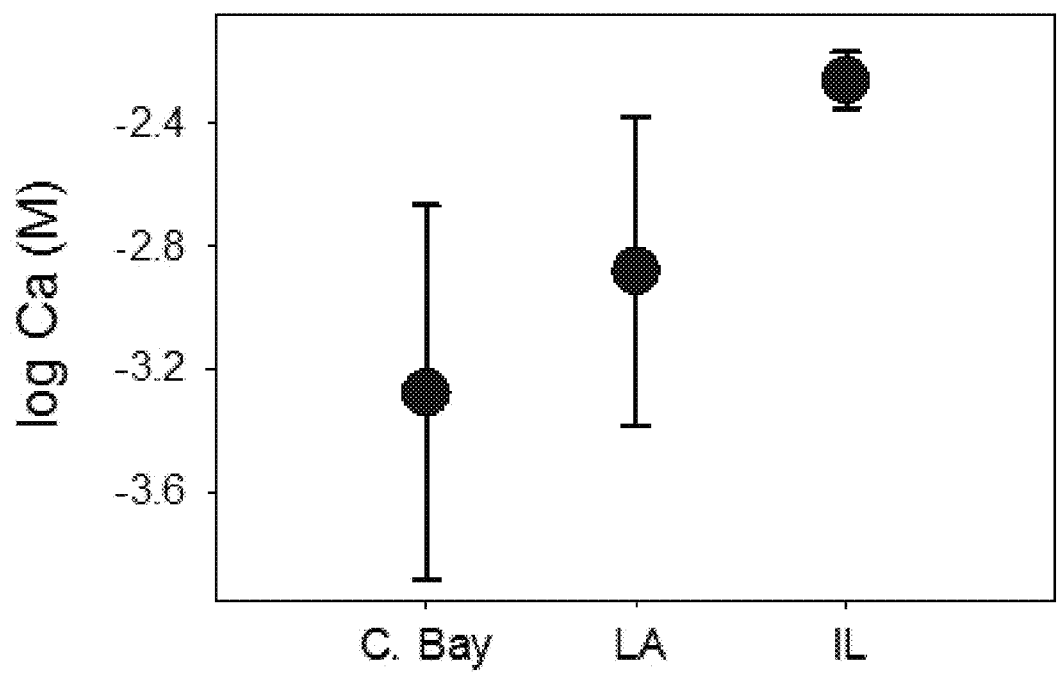
Figure 2F:
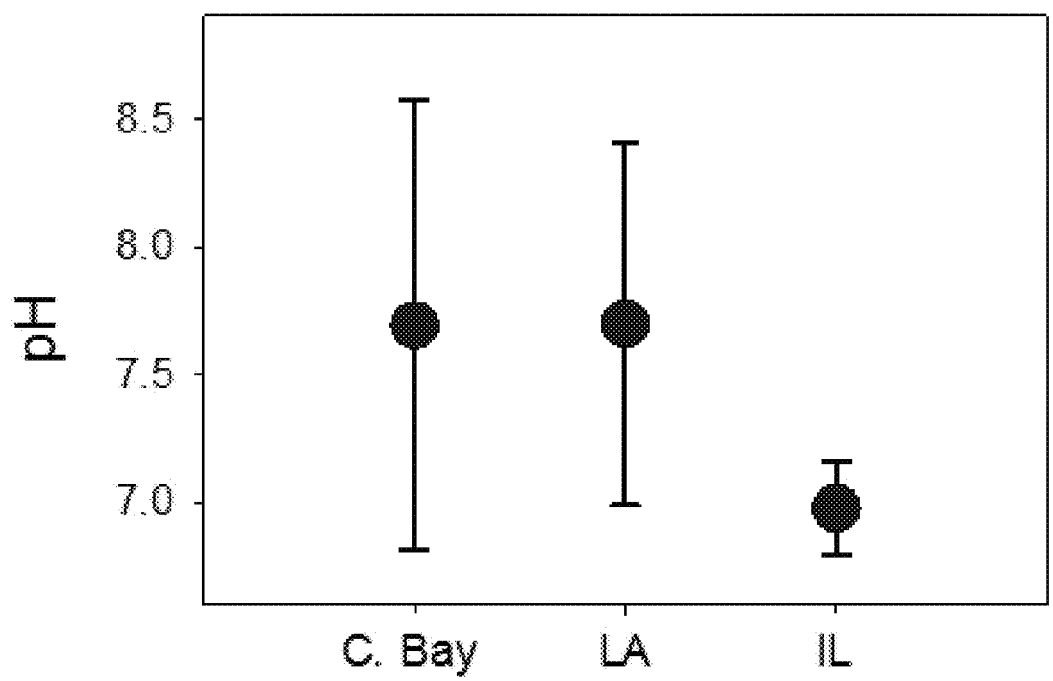
Figure 10:
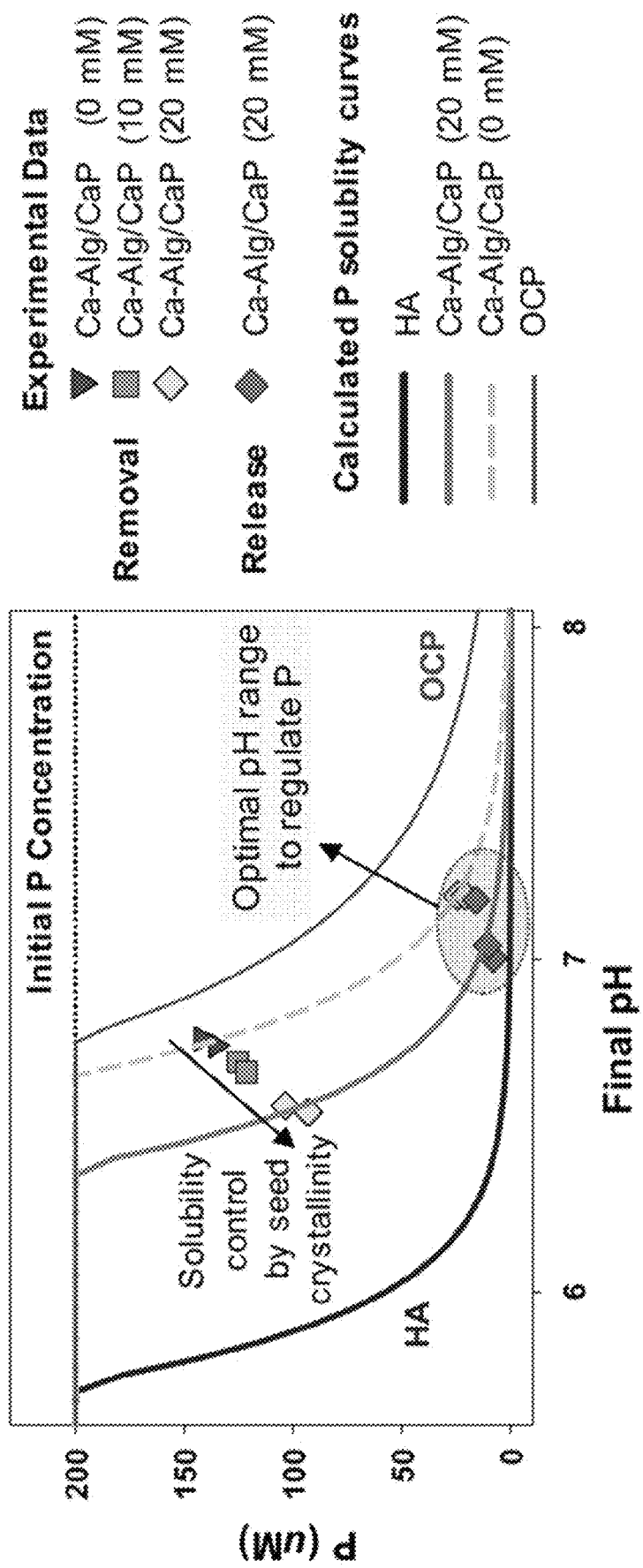
FIG. 10 depicts P concentrations at final pH values obtained from the P removal and release experiments (data from FIG. 7A, FIG. 9A, and FIG. 9B). Blue and red solid lines are drawn based on thermodynamic calculations using the solubility products of hydroxyapatite (HA, pK$_{sp}$=58.5) and octacalcium phosphate (OCP, pK$_{sp}$=48.4). Grey solid and dotted lines apparent P solubility curves for HA calculated based on the experimental data of Ca-Alg/CaP prepared with 20 mM OH$^-$ (pK'$_{sp}$=54.2) and 0 mM OH$^-$ (pK'$_{sp}$=52.5).

The SI values in the three studied areas show correlations in the order pH>P>Ca (FIG. 2A, FIG. 2B, and FIG. 2C). P concentrations in C. Bay and LA are obviously higher than in northern IL (FIG. 2D), suggesting the influence of increasing P levels on eutrophication. Due to the calcareous soils, Ca concentrations in the northern IL are relatively higher than in the other two areas (FIG. 2E). However, due to the region's low P concentrations and pH, SI values are relatively low (FIG. 2C). The pH values for the HA-supersaturated sites are typically higher than 7 (FIG. 2F), and HA is the most stable of calcium phosphate minerals in this pH range.[23] Our study shows that Ca-Alg/CaP can effectively decrease P concentrations close to the equilibrium level with HA at pH around 7 (FIG. 10). Therefore, this strategy can contribute to maintaining the P level in the stable range (e.g., equilibrium with seed mineral in beads), preventing a sudden increase of P in the aqueous systems.

Figure 4:
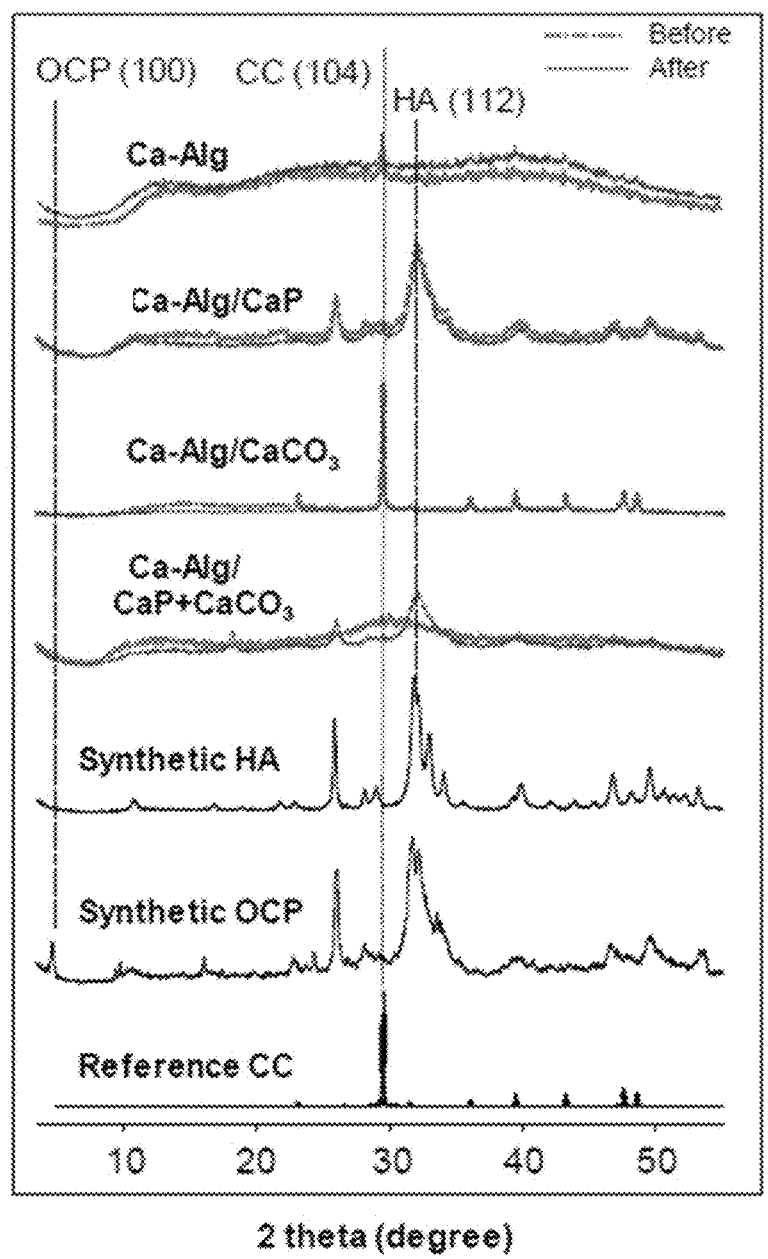
FIG. 4 depicts X-ray diffraction patterns of calcium alginate beads with different seed minerals (a-d) before and after the P removal reaction under the hydroxyapatite (HA)-supersaturated condition. Synthetic HA and octacalcium phosphate samples (OCP) were analyzed for comparison. Reference calcite (CC) was prepared from Iceland spar crystal Chihuahua, Mexico (Ward's Science, USA).

Preparation of Ca-Alginate Beads:

All chemicals used in this study were at least ACS grade, and solutions for the experiments were prepared using deionized water (≥18.2 MΩ-cm, Barnstead ultrapure water systems). Four different types beads were synthesized: calcium alginate beads without any seed mineral (Ca-Alg), and beads with CaP, $CaCO_3$, and both CaP and $CaCO_3$ (called Ca-Alg/CaP, Ca-Alg/$CaCO_3$, and Ca-Alg/CaP+$CaCO_3$, respectively). Ca-Alg beads were prepared by slowly adding 2 mL of sodium alginate solution (6 mg $mL^{-1}$, Spectrum Chemical SO106) dropwise into a 50 mL Ca bath (180 mM $CaCl_2$ and 20 mM NaOH) with mild stirring at room temperature. Each droplet of the solution immediately formed one spherical Ca-Alg bead (2.8±0.2 mm in diameter, Table 1). To seed CaP or $CaCO_3$ nuclei inside Ca-Alg beads, 35.2 mM $Na_2HPO_4$ or 119.0 mM $NaHCO_3$ were mixed into the sodium alginate solutions, respectively. CaP or $CaCO_3$ nuclei formed simultaneously with the formation of beads. The SI values of the reaction solutions, defined as the ion activity product (IAP) over the solubility product ($K_{sp}$) in log scale, were calculated using Visual MINTEQ (ver. 3.1). The SI values of solutions forming CaP and $CaCO_3$ nuclei were 27.6 for HA and 4.3 for calcite, respectively. Photographs of the four bead types are shown in FIG. 4, with particle size analyses and dry weight measurements in Table 1.

TABLE 1

Bead sizes and dry weights of beads and seed minerals.

|  | Ca-Alg | Ca-Alg/ CaP | Ca-Alg/ $CaCO_3$ | Ca-Alg/CaP + $CaCO_3$ |
|---|---|---|---|---|
| Bead size (mm) | 2.5 ± 0.2 | 3.3 ± 0.4 | 3.8 ± 0.2 | 3.2 ± 0.4 |
| Dry weight (mg)* | 14.0 ± 3.9 | 19.7 ± 1.7 | 19.4 ± 1.3 | 24.7 ± 2.0 |
| Seed weight (mg) | — | 5.7 | 5.5 | 10.7 |

Three different crystalline degrees of seeds in Ca-Alg/CaP beads were obtained by varying the $OH^-$ concentrations (0, 10, and 20 mM NaOH) in Ca baths. Because most CaP minerals, including HA, show lower solubility at higher pH,[23] it was hypothesized that the addition of $OH^-$ made seed nuclei form in a solution with higher SI with respect to HA, and that the higher SI provided a higher HA nucleation driving force, leading to formation of seed minerals with higher crystallinity. All beads, after dropwise addition, were stored in the Ca bath for four hours, during which time they settled at the bottom of the bath. Then beads were rinsed with deionized water five times to remove unreacted phosphate or carbonate precursors before being used for batch experiments. For the reference samples used to compare the mineral crystallographies in systems, synthetic HA (purchased from ACROS Organics) and octacalcium phosphate (OCP, synthesized as described by Arellano-Jiménez et al.[44]), and Iceland spar calcite crystals obtained from Chihuahua, Mexico, (purchased from Ward's Science, USA) were used.

Analysis of Bead Size:

To analyze the particle sizes, ImageJ 1.47 v (National Institutes of Health, USA) was used. The average and standard deviation values for each bead type were obtained by measuring 15 samples. For the batch experiments for P removal, 2 mL of sodium alginate solution (6 mg $L^{-1}$) was added dropwise to form beads. The average and standard deviation of the dry weight were obtained from triplicate bead preparation procedures. Beads were fully dried in a 105° C. oven for 24 hours before the measurements. The dry weights of Ca-Alg beads were slightly higher than the amount of initially added sodium alginate (12 mg) because of calcium replacement and structural water inside the composites. The dry weights of seed minerals were calculated by subtracting that of Ca-Alg beads.

Procedures for Other Characterizations of Beads and Seed Minerals: Before and after the P removal experiments, to characterize the crystalline structure of seed minerals and to image the surfaces of beads, X-ray diffraction (XRD, Bruker D8 Advance) data and scanning electron microscope (SEM, FEI Nova NanoSEM 2300) images of beads were used, respectively. To prepare samples for XRD and SEM analyses, beads were air-dried and gently ground with ethanol in an agate mortar. For XRD analysis, ground samples were placed on a zero diffraction Si plate (MTI Corporation), then the XRD patterns were collected using Cu Kα radiation (40 kV and 40 mA). For SEM analysis, ground samples were placed on adhesive carbon tapes attached on SEM stubs, sputter-coated with Au—Pd under Ar gas at 0.2 mbar (Cressington 108) to increase conductivity, then imaged with a 10 kV electron accelerating voltage at 5-6 mm working distances.

To characterize the particle size and crystallinity of CaP seed nuclei prepared with different $OH^-$ concentrations, X-ray scattering data were collected at the Advanced Photon Source (APS) at Argonne National Laboratory (Argonne, IL, USA). Beads were packed in Kapton polyimide capillaries (Cole-Parmer, inner diameter 1.46 mm) without any dehydration procedures. Analyses of samples under hydrated conditions maintained the particle sizes and phases of CaP nuclei. Wide-angle X-ray diffraction (WAXD) and X-ray pair distribution function (PDF) data were collected at sector 11-ID-B using a 58.66 keV X-ray beam.[78] For the WAXD data collection, samples were exposed to the beam for 25 sec at a sample-to-detector distance (SDD) of 95 cm. For the X-ray PDF, data was collected during 3 min of beam exposure using a 20 cm SDD. Then one-dimensional data were produced by using FIT2D software provided by European Synchrotron Radiation. The PDF function, G(r), was obtained by PDFgetX2 software to provide the atomic number density as a function of atomic separation distances, r.[79] The particle size (d) was evaluated over a wide range of the scattering vector, $q=0.0001$-$0.1$ Å$^{-1}$, using ultra-small-angle X-ray scattering (USAXS). Because $d=2\pi/q$, the corresponding particle size range was 6.3 nm-6.3 μm. USAXS data was collected at sector 9-ID-C using a 21.0 keV X-ray beam.[79] Data analyses, including one-dimensional data reduction and fitting scattering patterns, were conducted using a series of macro programs in the IRENA package written in IGOR Pro (WaveMetrics Inc.), which was provided by sector 9-ID-C.[57-59] In addition, SAXS measurements of samples were conducted at sector 12-ID-B (14.0 keV) to better evaluate the features of small particles appearing at $q=0.009$-$0.3$ Å$^{-1}$ ($d=2$-$70$ nm). The WAXD, USAXS, and SAXS patterns of an empty Kapton capillary were also collected for background subtraction.

Thermodynamic Calculations of Ca and P Concentrations in Equilibrium with Different Calcium Phosphate Minerals:

The concentrations of Ca and P species equilibrated with different calcium phosphate minerals at pH 5-10 were calculated based on the equilibrium constants among calcium, phosphate, and carbonate species. To simulate the calcium phosphate saturated condition used in this study, 10 mM NaCl, 2 mM CaCl$_2$, and 0.2 mM Na$_2$HPO$_4$ were added as initial aqueous components, and an open carbonate system ($p_{CO_2}=10^{-3.5}$, $p_{CO_2}/[H_2CO_3(aq)]=31.6$ atm/M) was assumed. The association/dissociation reactions listed in eq. 1-11 were considered for the calculation of the activities of carbonate, phosphate, and calcium species in the system.[81,82]

$$K_{A1,CO3} = \frac{(H^+)(HCO_3^-)}{(H_2CO_3(aq))} = 10^{-6.35} \quad \text{eq. 1}$$

$$K_{A2,CO3} = \frac{(H^+)(CO_3^{2-})}{(HCO_3^-)} = 10^{-10.33} \quad \text{eq. 2}$$

$$K_{A1,PO4} = \frac{(H^+)(H_2PO_4^-)}{(H_3PO_4(aq))} = 10^{-2.12} \quad \text{eq. 3}$$

$$K_{A2,PO4} = \frac{(H^+)(HPO_4^{2-})}{(H_2PO_4^-)} = 10^{-7.21} \quad \text{eq. 4}$$

$$K_{A3,PO4} = \frac{(H^+)(PO_4^{3-})}{(HPO_4^{2-})} = 10^{-12.32} \quad \text{eq. 5}$$

$$K_{CaHCO_3^+} = \frac{(CaHCO_3^+)}{(Ca^{2+})(HCO_3^-)} = 10^{1.16} \quad \text{eq. 6}$$

$$K_{CaCO_3(aq)} = \frac{(CaCO_3(aq))}{(Ca^{2+})(CO_3^{2-})} = 10^{3.38} \quad \text{eq. 7}$$

$$K_{CaOH^+} = \frac{(CaOH^+)}{(Ca^{2+})(OH^-)} = 25.12 \quad \text{eq. 8}$$

$$K_{CaH_2PO_4^+} = \frac{(CaH_2PO_4^+)}{(Ca^{2+})(H_2PO_4^-)} = 31.9 \quad \text{eq. 9}$$

$$K_{CaHPO_4(aq.)} = \frac{(CaHPO_4(aq))}{(Ca^{2+})(HPO_4^{2-})} = 6.81 \times 10^2 \quad \text{eq. 10}$$

$$K_{CaPO_4^-} = \frac{(CaPO_4^-)}{(Ca^{2+})(PO_4^{3-})} = 3.46 \times 10^6 \quad \text{eq. 11}$$

The activity of each ionic component, i, in parentheses was the product of its concentration, $C_i$, and the activity coefficient of the component, $\gamma_i$ by the Davies equation (eq. 12). I is the ionic strength of the solution (eq. 13) and Z is the charge of the component.[82]

$$\log \gamma_i = -0.5 z_i^2 \left[ \frac{I^{\frac{1}{2}}}{1+I^{\frac{1}{2}}} - 0.2I \right] \quad \text{eq. 12}$$

$$I = \frac{1}{2} \sum_i c_i z_i^2 \quad \text{eq. 13}$$

By applying eqs. 1-13 to mass balance equations with respect to Ca, $PO_4^{3-}$, and $CO_3^{2-}$, we calculated the activities of all components and the IAP of three different calcium phosphate minerals: HA (eq. 14), octacalcium phosphate (OCP, eq. 15), and dicalcium phosphate (DCP, eq. 16). In addition to these calcium phosphate minerals, the most stable calcium carbonate mineral, calcite (CC, eq. 17), was considered as well, due to the higher possibility of its formation in an aqueous system with a sufficient amount of Ca in a high pH range.

$$IAP_{HA} = (Ca^{2+})^5 (PO_4^{3-})^3 (OH^-) \quad \text{(eq. 14)}$$

$$IAP_{OCP} = (Ca^{2+})^4 (H^+)(PO_4^{3-})^3 \quad \text{(eq. 15)}$$

$$IAP_{DCP} = (Ca^{2+})(HPO_4^{2-}) \quad \text{(eq. 16)}$$

$$IAP_{CC} = (Ca^{2+})(CO_3^{2-}) \quad \text{(eq. 17)}$$

The SI for each mineral can be calculated by IAP over $K_{sp}$ in log scale $$\left(SI = \log \frac{IAP}{K_{sp}}\right).$$

The experimentally determined $K_{sp}$ values were obtained from different literature sources: $K_{sp,HA}=10^{-58.5}$ at 25° C.,[18] $K_{sp,OCP}=10^{-484}$ at 23.5° C.,[87] $K_{sp,DCP}=10^{-6.62}$ at 25° C.,[20] and $K_{sp,CC}=10^{-8.48}$ at 25° C.[21] SI values were evaluated for each mineral at each pH, from 5 to 10 with 0.05 steps. When SI>0, we assumed that phosphate (or carbonate for CC) species were governed by $K_{sp}$ reaching an equilibrium. Thus concentrations of all the species were recalculated until the sum of Ca precipitated as a mineral and all the aqueous Ca species equaled the initial Ca amount in the system. The computational work was done using a script written in MATLAB R2013 (Mathworks, USA).

Figure 6A:
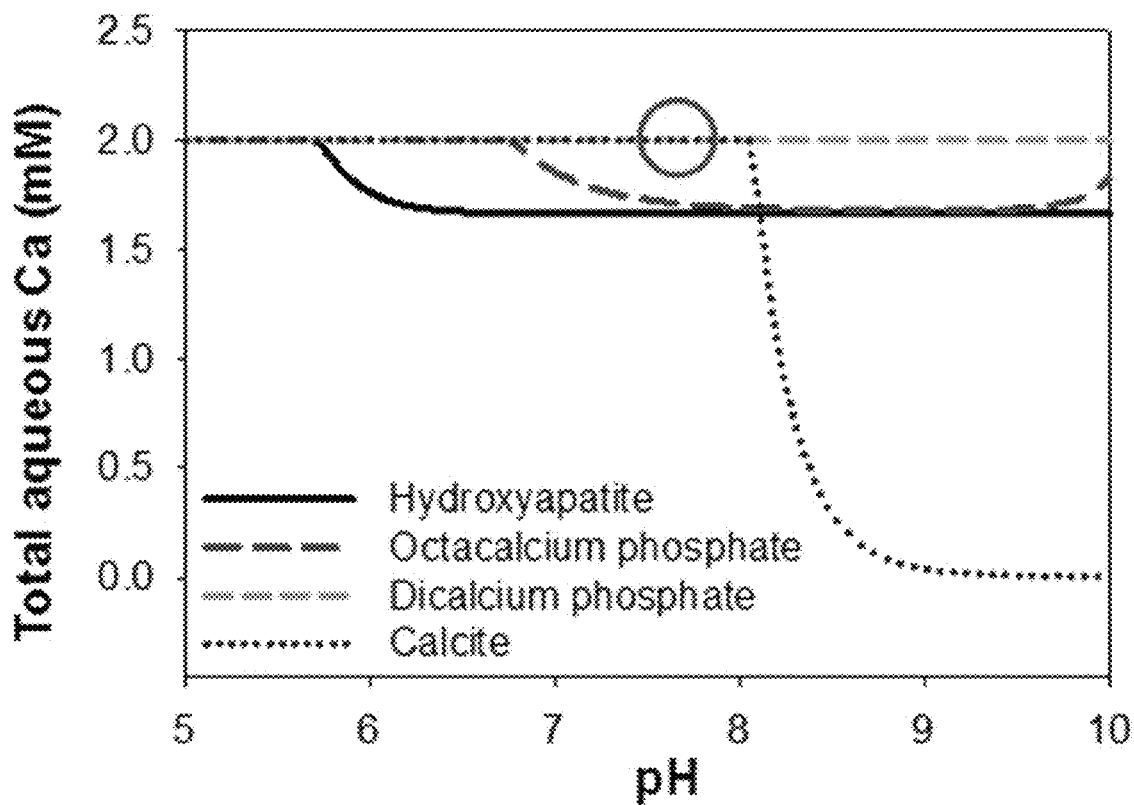
FIG. 6A, FIG. 6B, and FIG. 6C depict Ca and P concentrations in equilibrium with different calcium phosphate and carbonate minerals at pH 5-10 (FIG. 6A and FIG. 6B). Initial conditions of the system: 10 mM NaCl, 2 mM $CaCl_2$, and 0.2 mM $Na_2HPO_4$. Open carbonate system. Plotted saturation indices for calcium phosphate minerals under the initial condition in the pH range (FIG. 6C). The blue box in (FIG. 6C) highlights the experimental regime used in this study. Red circles in (FIG. 6A, FIG. 6B, and FIG. 6C) indicate the initial experimental condition for P removal experiments in the saturated system.
Figure 6B:
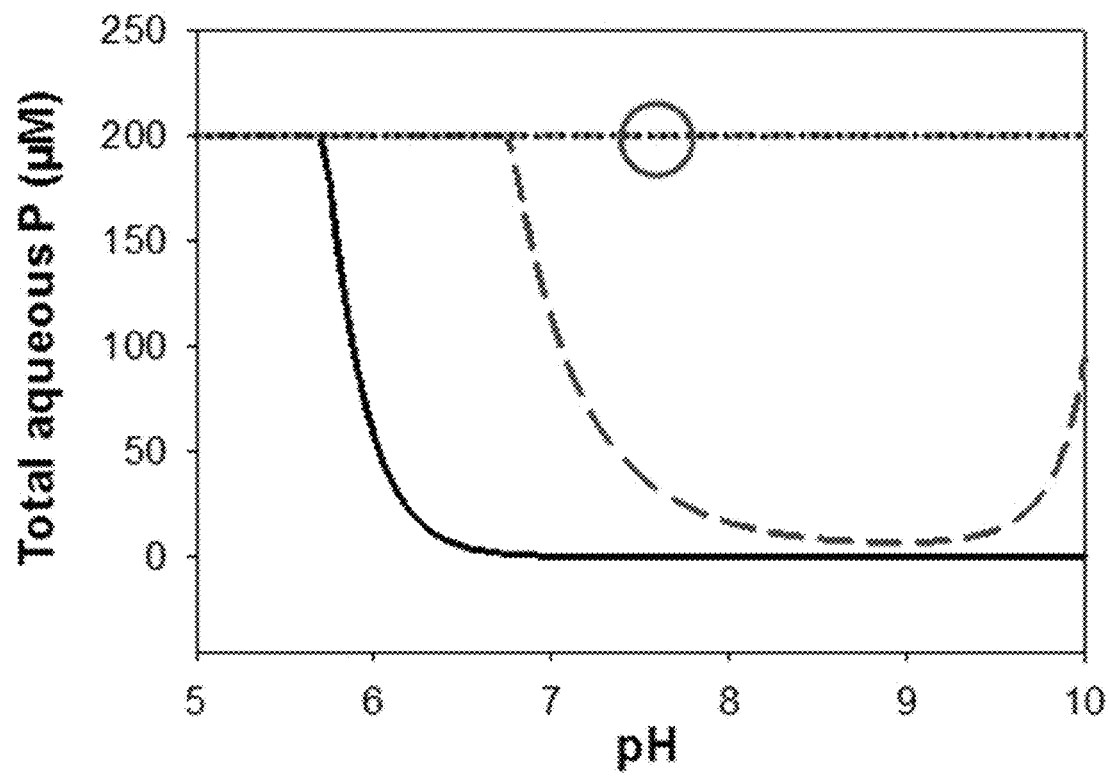
Figure 6C:
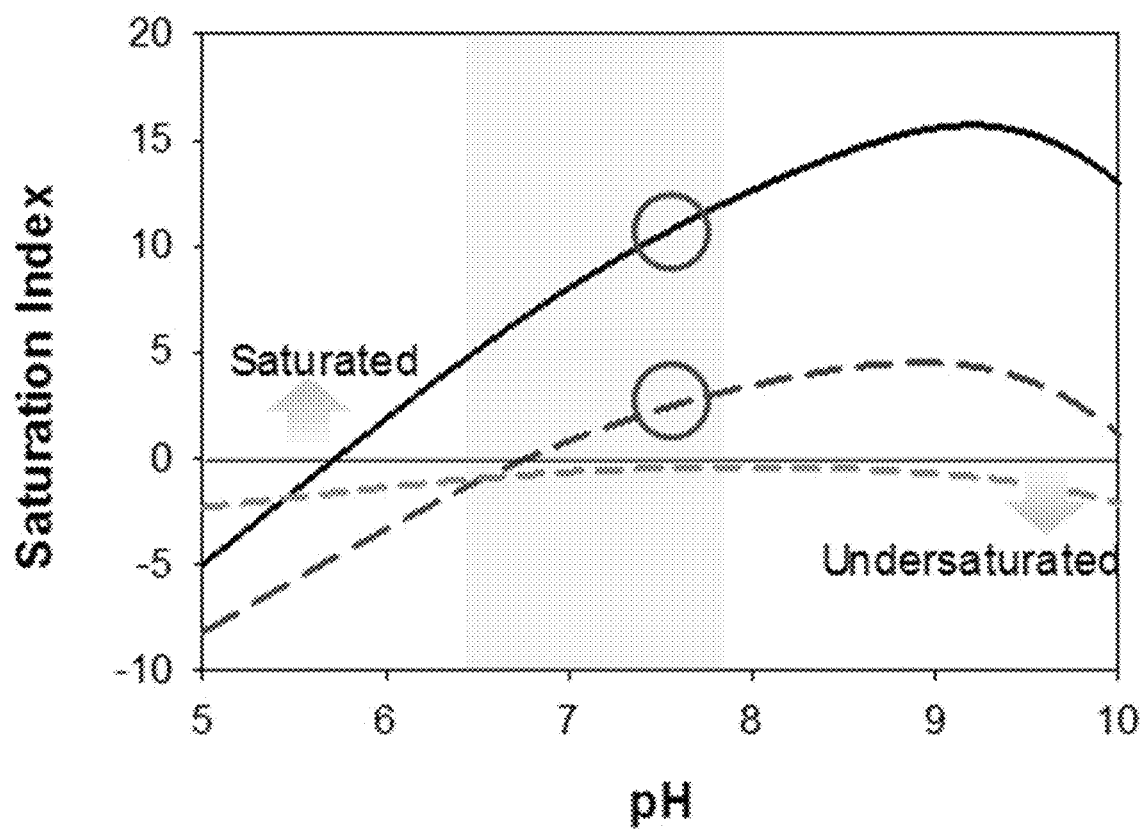

FIG. 6A and FIG. 6B show the total aqueous Ca and P concentrations, equilibrated with different calcium phosphate and carbonate minerals at pH 5-10. FIG. 6C shows the SI with respect to different calcium phosphate minerals. Among the minerals studied, HA shows the lowest solubility above pH 6. Aqueous P concentration starts to decrease at pH 7, when equilibrium with OCP is reached. However, the system is undersaturated with respect to dicalcium phosphate within the pH range evaluated. Calcite formation becomes significant above pH 8, and therefore, carbonate may compete with phosphate for Ca above that pH. However, the equilibrium pH values of the solution after the experiments in this study were all below pH 8, thus the possibility of CC formation was considered insignificant.

P Removal and Release Experiments:

To evaluate the P removal efficiencies of beads with different seed nuclei, batch experiments were conducted in both HA-supersaturated (2 mM $CaCl_2$, 10 mM NaCl, and 0.2 mM $Na_2HPO_4$) and HA-undersaturated (0 mM $CaCl_2$, 10 mM NaCl, and 0.2 mM $Na_2HPO_4$) solutions. The SI value for the HA-supersaturated condition was 11.8 at an initial pH of 7.8±0.1. However, with respect to calcite, the system was undersaturated at pH<8. Beads prepared from a 2 mL volume of the sodium alginate solution were added to 100 mL of HA-supersaturated and undersaturated solutions with mild stirring. At 2, 5, and 22 hours of reaction time, 2 mL of solution from each batch was filtered (0.45 μm) and diluted with 1% trace metal $HNO_3$ for analyses of Ca and P concentrations, using inductively coupled plasma-optical emission spectrometry (ICP-OES, PerkinElmer Optima 7300DV). To evaluate the P removal efficiencies of different crystallinities of CaP seed nuclei prepared with varying OH-concentrations in the Ca bath, similar batch experiments were conducted under the HA-supersaturated condition (SI=11.0 at initial pH 7.6±0.1).

To test the potential reuse of beads as a fertilizer, the release of P from beads was also evaluated. The beads were transferred to a fresh batch containing no phosphate ions (2 mM $CaCl_2$ and 10 mM NaCl, initial pH 6.8±0.1) after P removal experiments. Changes in P concentrations were measured until equilibrium (up to 24 hours, called one cycle), then the beads were transferred to another P-free solution batch to repeat the experiments. In total, three cycles of batch experiments were conducted using same beads to evaluate how seed minerals control the equilibrium P concentrations over multiple cycles with a decreasing amount of available P from the beads. In addition, to evaluate P release kinetics in a soil-relevant condition, sand column experiments (cross-sectional dimension 2.5×2.5 cm) were conducted. The columns were packed with a 5 cm thickness of acid-rinsed sand on top of a 3 cm thick gravel layer, then beads prepared from 5 mL of sodium alginate solutions were applied on top of the column. Then, 10 mM NaCl solution was injected at a flow rate of 80 mL h$^{-1}$ for 4 hours. Effluent was collected for every 30 minutes for P quantification. To quantify P during the releasing experiments, the colorimetric molybdenum blue method was used by measuring the maximum absorbance at 880 nm with a UV-visible spectrophotometer (Thermo Scientific Evolution 60S).[45] Duplicate batch experiments were conducted for both P removal and release experiments.

Because HA mineralization releases protons (e.g., $5Ca^{2+}+3HPO_4^{2-}+OH^- \rightarrow Ca_5(PO_4)_3OH+3H+$),[46] the pH of the solutions slightly decreased during P removal and increased during P release. To fairly compare the final P concentrations from different experiments at similar final pH~7, the initial pH values for different experiments were adjusted to 6.8-7.8.

Characterization of Beads and Seed Minerals:

Scanning electron microscope (SEM) and X-ray diffraction (XRD) were used to identify the seed minerals in the beads. Ca-Alg/CaP beads prepared at different OR concentrations were further characterized by multiple synchrotron-based X-ray analyses: wide-angle X-ray diffraction (WAXD), X-ray pair distribution function (PDF), and ultra-small- and small-angle X-ray scattering (USAXS and SAXS). The characterization data was obtained at the Advanced Photon Source (APS, at sectors 9-ID-C, 11-ID-B, and 12-ID-B) at Argonne National Laboratory (Argonne, IL, USA).

Thermodynamic Calculations:

For the HA-supersaturated system, concentrations of Ca and P species in equilibrium with different minerals at pH 5-10 were calculated using a script written in MATLAB (Mathworks, USA) with the following input solubility products: $K_{sp}=10^{-58.5}$, $10^{-48.4}$, $10^{-6.62}$, and $10^{-8.48}$, respectively for HA ($Ca_5(PO_4)_3OH$),[47] OCP ($Ca_8H_2(PO_4)_6 \cdot 5H_2O$),[48] dicalcium phosphate dehydrate (DCP, $CaHPO_4 \cdot 2H_2O$),[49] and calcite (CC, $CaCO_3$).[50] SI values for these phosphate minerals were also calculated, and the procedures and results are detailed below. A potential formation of struvite is also evaluated below.

Results and Discussion

Figure 5A:
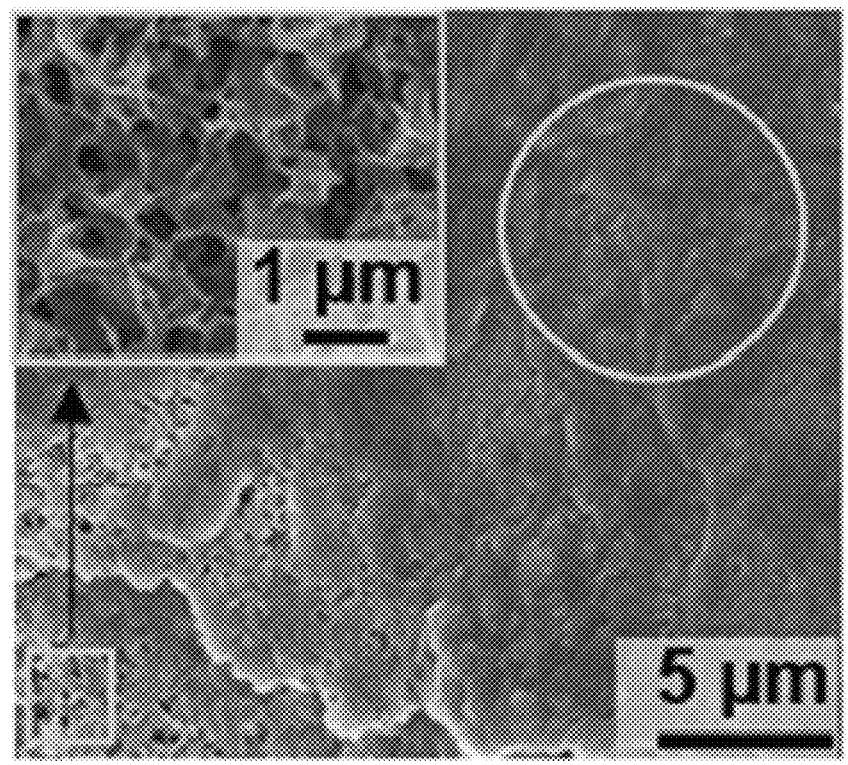
FIG. 5A, FIG. 5B, FIG. 5C, and FIG. 5D depict SEM images of (FIG. 5A) Ca-Alg, (FIG. 5B) Ca-Alg/CaP, (FIG. 5C) Ca-Alg/$CaCO_3$ with a zoomed in image showing faceted calcite crystals, and (FIG. 5D) Ca-Alg/CaP+$CaCO_3$ before and after P removal reaction.
Figure 5B:
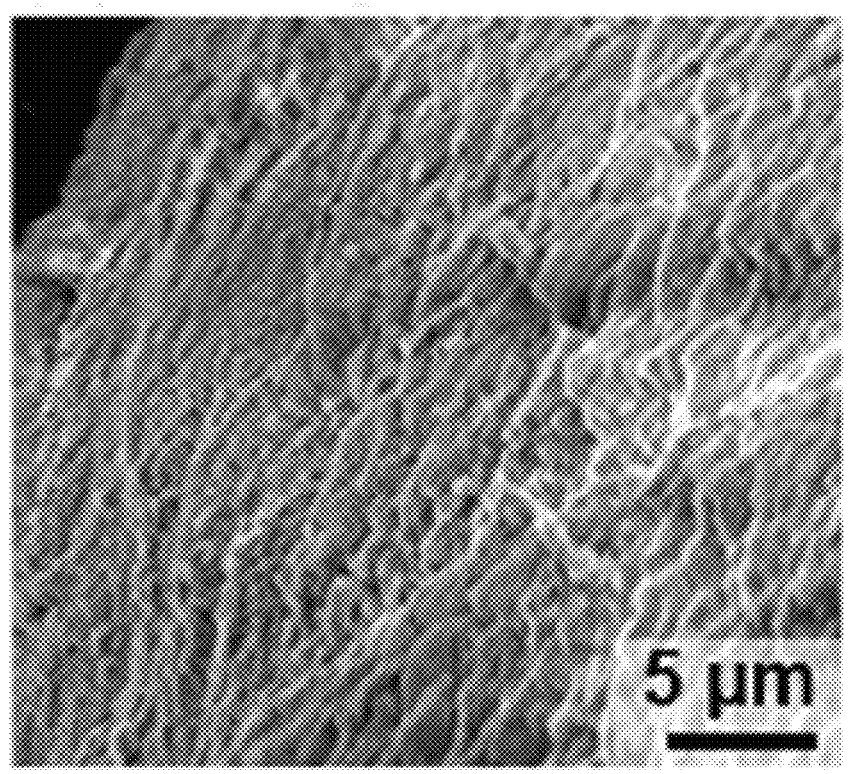
Figure 5C:
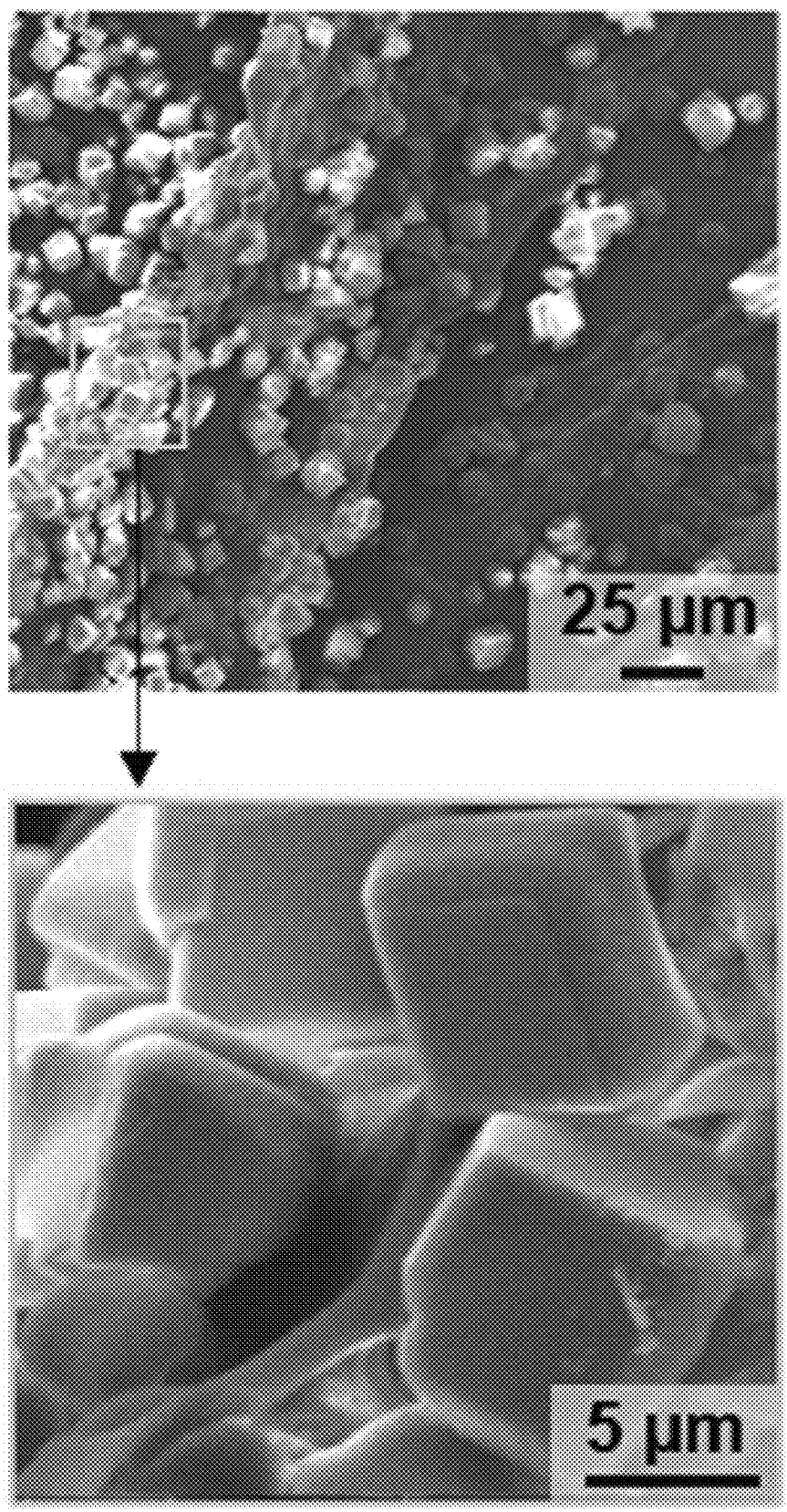

Characterization of Beads with Different Seed Minerals:

Ca-Alg beads with no seed mineral did not show specific crystalline phases (FIG. 5A, FIG. 5B, FIG. 5C, and FIG. 5D), showing both relatively flatter alginate surfaces (circle in FIG. 5A) compared to other systems and porous structures (inset of FIG. 5A) in SEM images. A small sharp peak was observed in their XRD pattern at 2 theta=29.5°, which corresponds to the strongest peak of calcite (FIG. 4). It was postulated that a small fraction of calcite formed inside the Ca-Alg during the formation of beads in the Ca bath. In the Ca bath containing 20 mM of NaOH (pH above 12), calcite could form in the open carbonate system without any additional source of carbonate (FIG. 6A). Additions of phosphate precursors nucleated poorly crystalline HA-like CaP seed minerals. The XRD pattern of Ca-Alg/CaP was similar to that of the synthetic HA reference sample, but peaks from individual crystalline faces were not as fully developed (FIG. 4) as those from the synthetic HA. No individual crystal particles were apparent in the SEM images of the surface of Ca-Alg/CaP, but increased surface rippling was observed after seeding CaP nuclei in Ca-Alg (FIG. 7B). CaP seed nuclei might be tightly bound or fully embedded in the alginate structure, presumably filling the porous structures. This structure can be achieved through our approach of forming seed nuclei simultaneously with the gelation of beads. In the Ca-Alg/CaCO$_3$ system, a clear calcite structure was observed in the XRD pattern (FIG. 4). Correspondingly, in FIG. 5C, rhombohedral calcite crystals are visible on the surface of the beads.

The XRD patterns of Ca-Alg, Ca-Alg/CaP, and Ca-Alg/CaCO$_3$ did not change after 22 hours of reaction under the HA-supersaturated condition, indicating that no existing crystalline phase disappeared and no noticeable crystalline phase was newly formed. A change in the XRD pattern was observed only for Ca-Alg/CaP+CaCO$_3$, which transformed the phase of nuclei from amorphous to poorly crystalline HA (FIG. 4). Because the broad XRD peak of amorphous nuclei corresponds to the strongest peak of calcite, the dominant phase of nuclei is expected to be amorphous calcium carbonate (ACC) containing a relatively large amount of phosphate. In the SEM images of Ca-Alg/CaP+CaCO$_3$, only scattered submicron spherical particles (arrows in the top image of FIG. 5D) initially formed on the surface of beads, while more planar crystals a few microns in diameter formed after the P removal reaction (circles in the bottom image of FIG. 5D).

P Removal by Calcium Alginate Beads with Different Seed Minerals: The removal of P by beads with different seed minerals through batch experiments, monitoring P and Ca concentrations under both HA-supersaturated and HA-undersaturated conditions was evaluated. In the control experiment (no beads) under the HA-supersaturated solution, both P and Ca (FIG. 7A and FIG. 7C) concentrations remained constant during 22 hour of reaction. This observation confirms that there was no significant nucleation (i.e., there was a high energy barrier for HA nucleation). With Ca-Alg beads (no seed mineral), about 15% of P was removed from solutions during 22 hours. The role of a biological template in stimulating CaP nucleation has been previously reported.[29,46] However, no crystalline structural change was observed in the XRD data of the beads after the experiments (FIG. 4), indicating that the CaP nucleation and crystallization were not sufficiently enhanced by Ca-Alg within 22 hours. Instead, P species at prenucleation stages might be loosely bound to the alginate surface.[29]

Figure 7A:
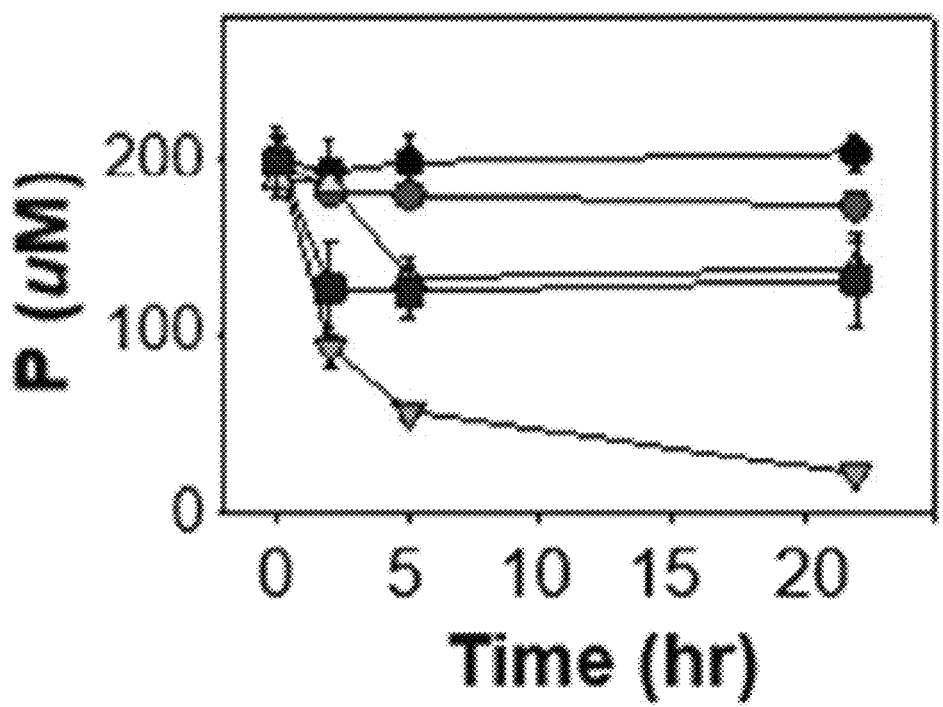
FIG. 7A, FIG. 7B, and FIG. 7C depict P and Ca concentrations during P removal reactions using Ca-Alg with different seed minerals in solutions initially supersaturated (FIG. 7A and FIG. 7C) and undersaturated (FIG. 7B and FIG. 7D) with hydroxyapatite. Initial conditions: 10 mM NaCl, 0.2 mM Na$_2$HPO$_4$, pH=7.8; For the HA-supersaturated condition, 2 mM CaCl$_2$ was added.
Figure 7B:
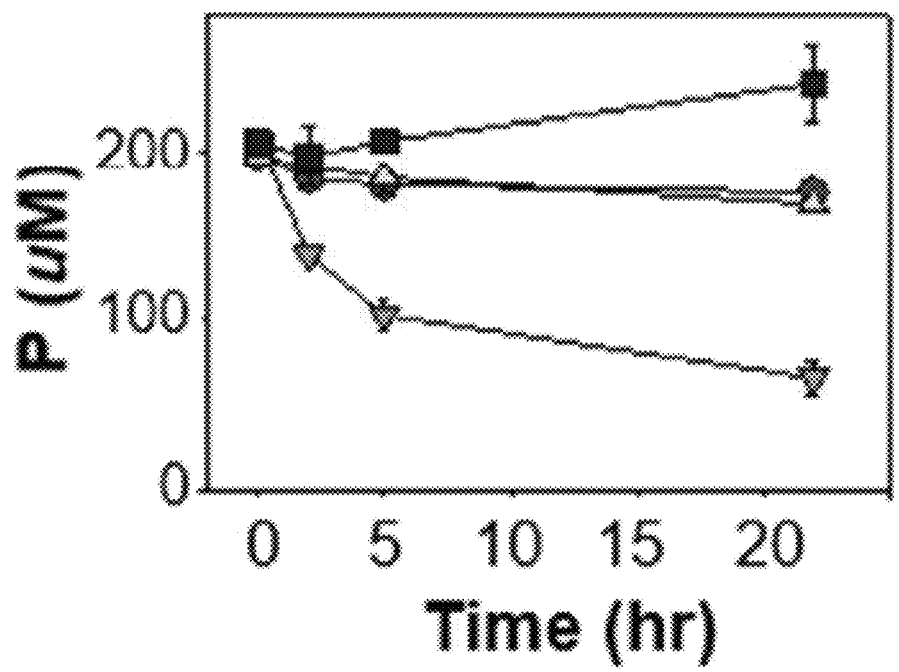
Figure 7C:
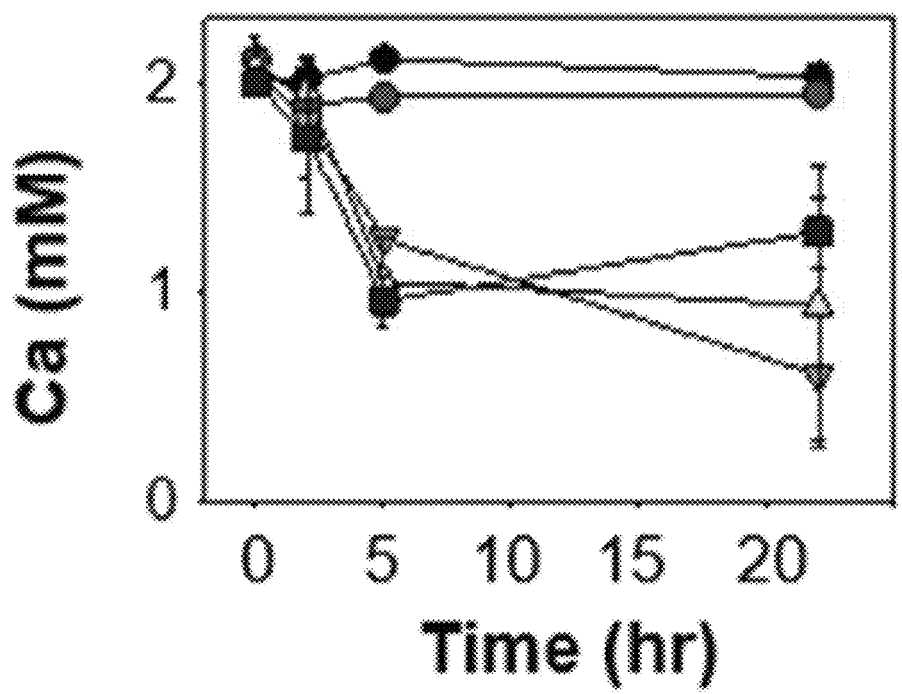

P removal efficiencies increased with seed minerals in the beads under the HA-supersaturated condition (FIG. 7A). The highest P removal efficiency was achieved by Ca-Alg/CaP, reducing P concentrations from an initial 200 μM to 22.7 μM in 22 hours (at final pH 7.2), which was close to or even below the typical P-levels in biologically or chemically treated effluents from wastewater treatment plants (~30-60 μM).[7] Because the XRD data showed no difference in patterns before and after the P removal process, it was concluded that P was sequestered in the beads as a form of calcium phosphate mineral with a crystalline structure similar to the seed mineral (FIG. 4). Therefore, as expected, the SI of the system also significantly decreased with Ca-Alg/CaP, from an initial value of 11.8 to 4.0 within 22 hours. The pH change of the solution did not contribute to the P removal, because the pH actually decreased slightly, from 7.8 to 7.2, during the experiments. With other types of beads, the final pH values were slightly higher (7.4-7.7) than with CaP seed, but their removal efficiencies were even lower.

Figure 3A:
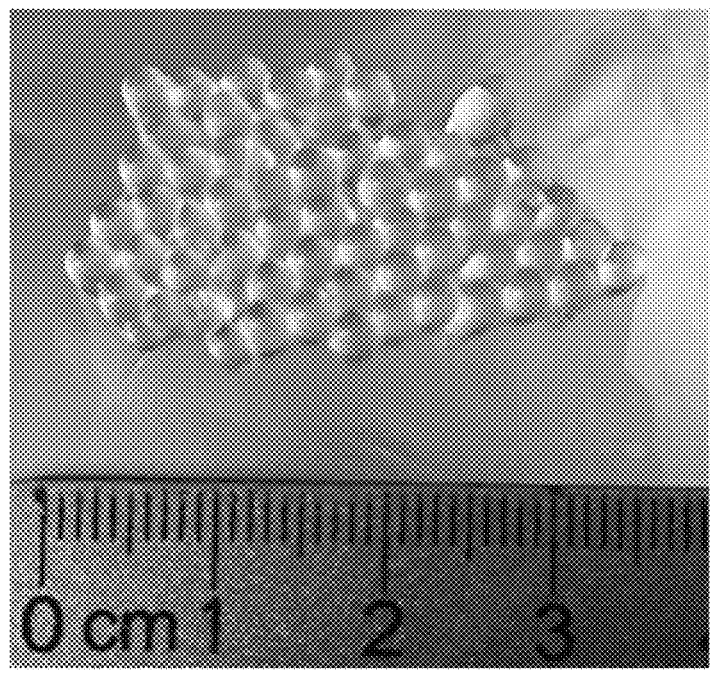
FIG. 3A, FIG. 3B, FIG. 3C, FIG. 3D, FIG. 3E, and FIG. 3F depict Photographs of the four different types of beads used in this study (FIG. 3A) Ca-Alg, (FIG. 3B) Ca-Alg/CaP, (FIG. 3C) Ca-Alg/$CaCO_3$, and (FIG. 3D) CA-Alg/CaP+$CaCO_3$.
Figure 3B:
Figure 3C:
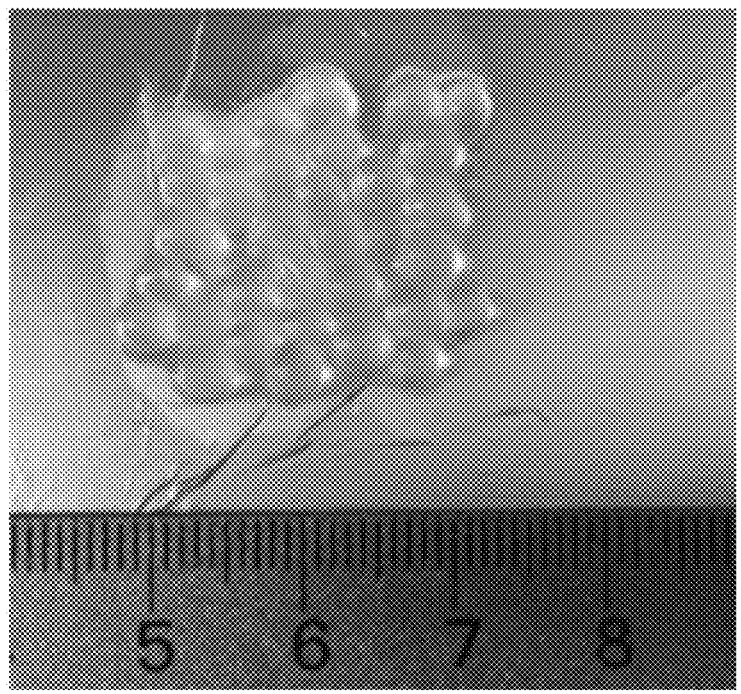
Figure 3D:
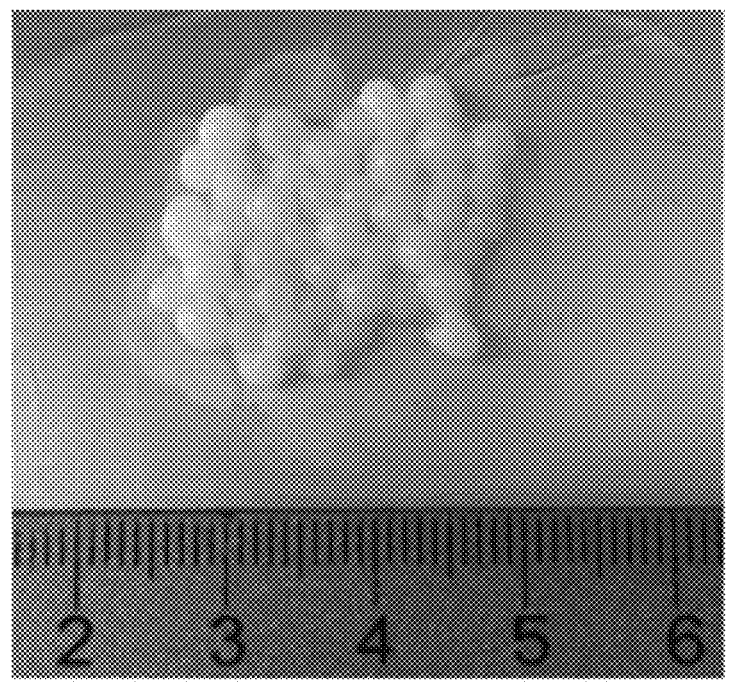
Figure 3E:
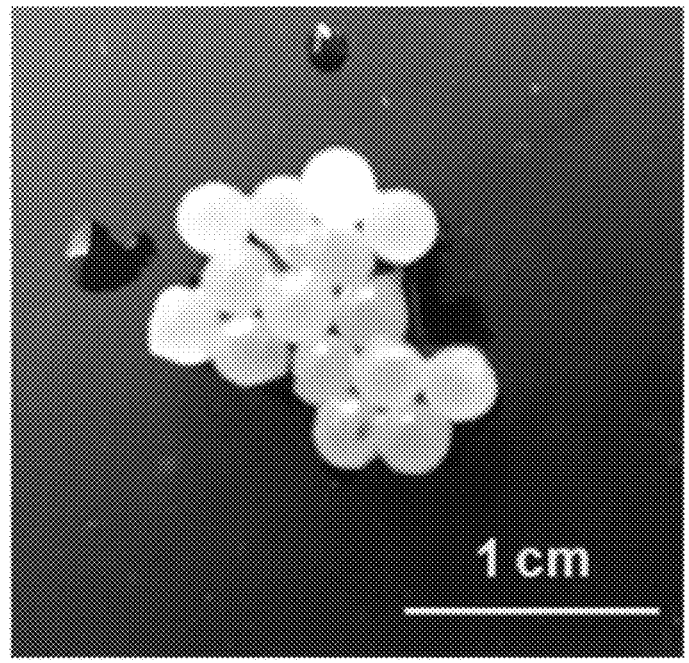
Figure 3F:
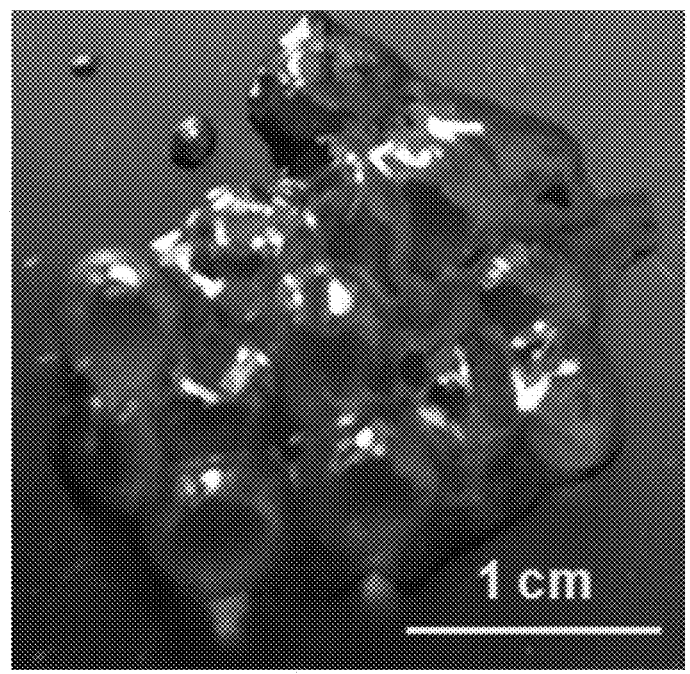
Figure 7D:
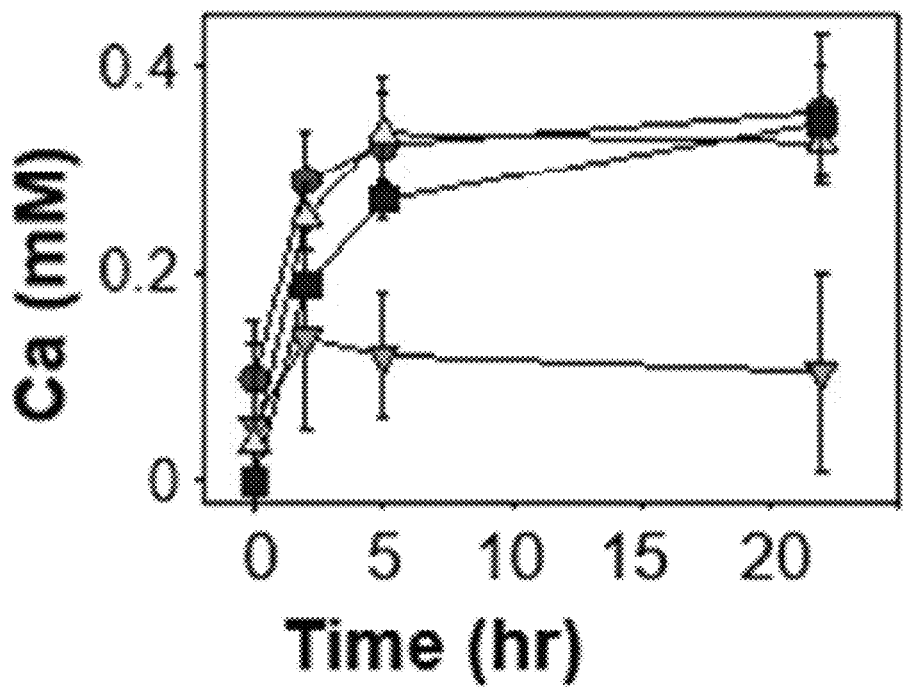

Interestingly, even in the HA-undersaturated condition, up to 68% of initial P was removed by Ca-Alg/CaP (FIG. 7B) by utilizing Ca-ions released from the beads. Thus, especially around the beads' surfaces, the batch environments become locally supersaturated with respect to HA, so CaP nucleation could be stimulated by the seed minerals. As a matter of fact, after P removal using Ca-Alg, Ca-Alg/CaCO$_3$, and Ca-Alg/CaP+CaCO$_3$, the Ca concentrations released into the undersaturated solutions became higher than 0.3 mM after 5 hours (FIG. 7D). The SI of this environment was 8.1 (0 3 mM Ca, 0.2 mM P, and 10 mM NaCl at pH 7.8). On the other hand, the release of Ca from Ca-Alg/CaP remained lower (~0.1 mM Ca) than those from other beads until 22 hours, while the P concentration decreased from 200 μM to 66 μM. Therefore, it can be estimated that the released Ca ions were reversely consumed by formation of new CaP phases. However, the loss of Ca$^{2+}$ from the beads visibly destroyed the beads' gelated state and spherical shape under the HA-undersaturated condition (FIG. 3E and FIG. 3F). Hence, the existence of sufficient Ca$^{2+}$, as in the HA-supersaturated condition, would be an important factor for stable operation.

Figure 5D:
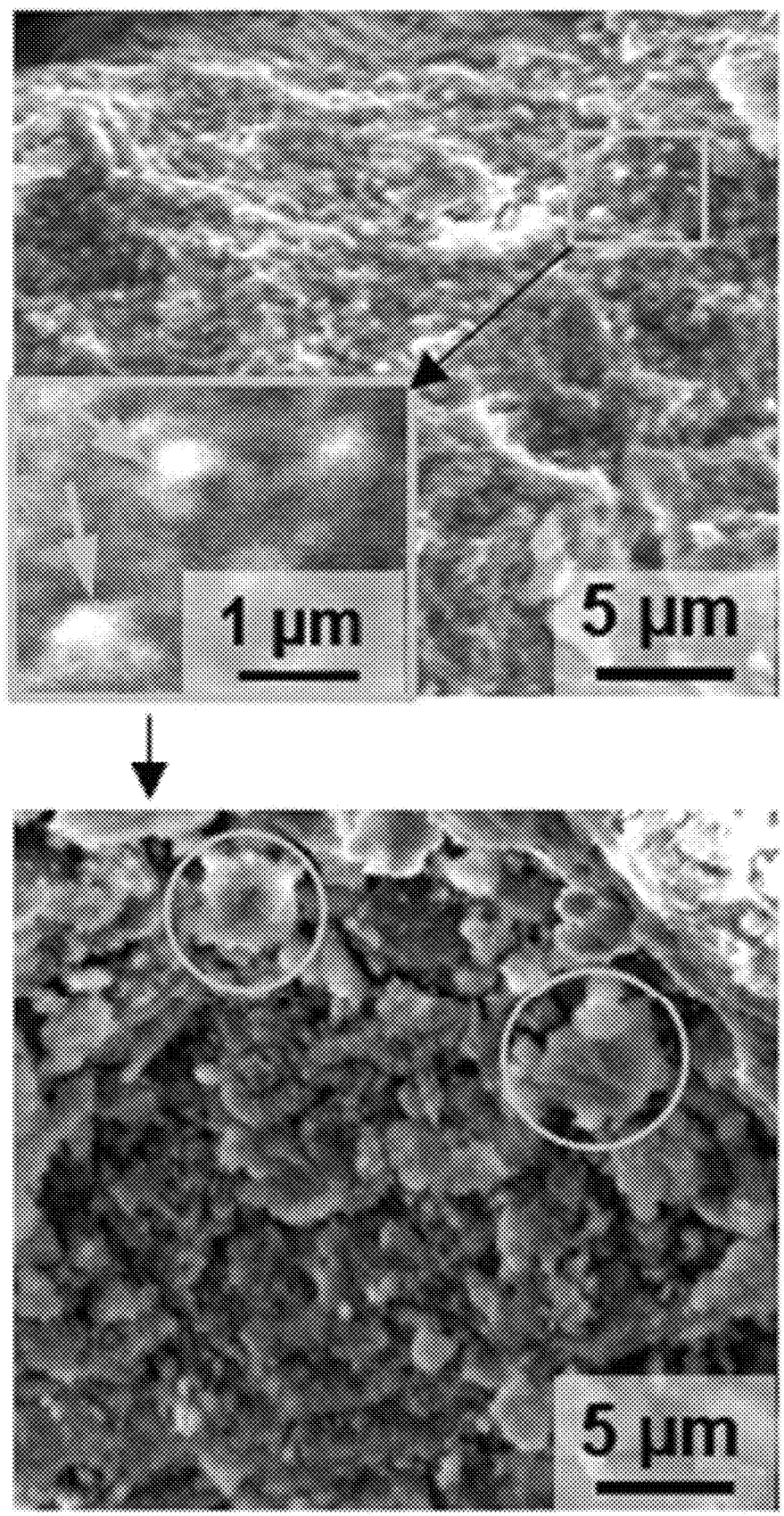

Although P removal was less efficient with carbonate seed mineral than phosphate seed, Ca-Alg/CaCO$_3$ beads removed about 35% of P from the HA-supersaturated condition (FIG. 7A). The higher removal efficiency by Ca-Alg/CaCO$_3$ than by Ca-Alg with no seed minerals indicates the contribution of CaCO$_3$ seeds to the P removal. No phosphate mineral phases were observed from the XRD pattern of Ca-Alg/CaCO$_3$ after P removal (FIG. 4). Therefore, adsorption on surfaces of Ca-Alg and calcite seed are the most probable P removal mechanisms.[43,51] A similar removal efficiency was achieved by Ca-Alg/CaP+CaCO$_3$ beads, whose ACC-like seed transformed to HA-like platy particles at the outer surface of the beads after P removal under the HA-supersaturated condition (FIG. 4 and FIG. 5D). This transformation indicated that ionic Ca and P species were dissolved from seeds and then secondarily precipitated. Indeed, in the HA-undersaturated condition with Ca-Alg/CaP+CaCO$_3$ beads, P concentrations increased over time due to the dissolution of seed minerals (FIG. 7B). The XRD pattern of the final CaP products on the Ca-Alg/CaP+CaCO$_3$ surface after P removal (FIG. 4, red line) was comparable to that of seed minerals in Ca-Alg/CaP (FIG. 4). However, the P removal efficiency of Ca-Alg/CaP+CaCO$_3$ was much lower than that of the Ca-Alg/CaP system. Therefore, CaP seeds can be more effectively used for P removal when they form simultaneously with the beads (Ca-Alg/CaP) than when they are transformed from the amorphous phase during the P removal process (Ca-Alg/CaP+CaCO$_3$). Therefore, the later part of this study further evaluates the roles of seed minerals in Ca-Alg/CaP beads in aqueous P management.

Aqueous P Concentrations Controlled by the Crystalline Degree of CaP Seed Minerals:

Based on evaluations of different types of seed minerals, it was found that seeding HA-like particles within the beads (Ca-Alg/CaP) was most effective for P removal. The crystalline structure of newly precipitated CaP from the aqueous solution during P removal was the same as that of the initial seed mineral. Therefore, if the aqueous P concentration reaches an equilibrium with CaP seed, the solubility of the seed mineral governs the equilibrium P concentration. Given that the solubility of amorphous calcium phosphate is much higher than that of HA,[52] the equilibrium P concentration after P removal may be engineered by controlling the crystallinity of seed nuclei.

To prove this hypothesis, Ca-Alg/CaP was prepared in the Ca bath with lower OH$^-$ concentrations of 0 and 10 mM, and then compared them with original samples prepared with 20 mM OH$^-$. Higher OH$^-$ concentrations in the nucleating solution increased the PO$_4^{3-}$ species fraction, and consequently, the IAP of calcium phosphate minerals, such as HA (IAP$_{HA}$=[Ca$^{2+}$]$^5$[PO$_4^{3-}$]$^3$[OH$^-$]). As was hypothesized in the experimental section, the increased IAP enhances the thermodynamic driving force for HA nucleation, which decreases the free energy of nucleation quickly,[53] forming stable CaP seed mineral with low solubility and high crystallinity.

Figure 8A:
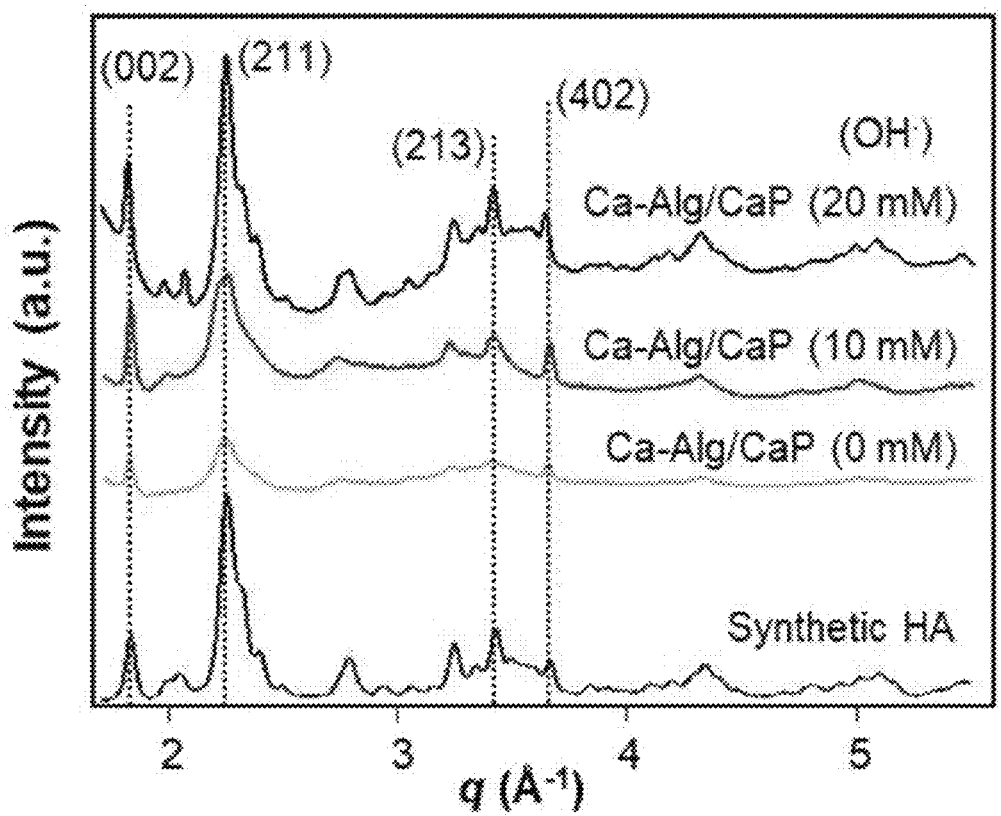
FIG. 8A, FIG. 8B, and FIG. 8C depict crystalline structure of CaP seed nuclei and equilibrium P concentrations.
Figure 8B:
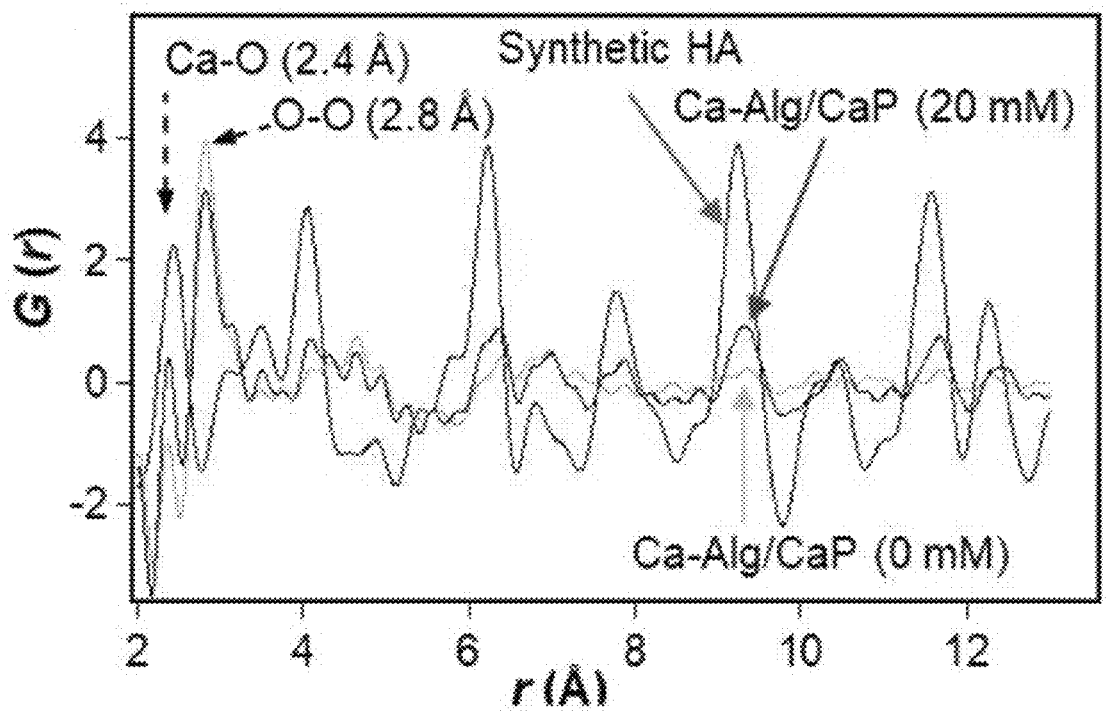

WAXD patterns of Ca-Alg/CaP beads clearly confirmed that seed minerals prepared with 20 mM $OH^-$ have a more HA-like structure than those prepared with 0 or 10 mM $OH^-$ (FIG. 8A). In the WAXD pattern of Ca-Alg/CaP prepared in 0 mM, only a few broad peaks appear, such as at q=1.83, 2.23, 3.41, and 3.58 $Å^{-1}$, which correspond to the (002), (211), (213), and (402) faces of HA. However, with 20 mM $OH^-$, most peaks observed from synthetic HA also appeared identically. The influence of $OH^-$ concentrations on the crystalline structures of Ca-Alg/CaP was further analyzed by X-ray PDF (FIG. 8B). Ca-Alg/CaP samples prepared with 0 and 20 mM of $OH^-$ both showed their first two peaks at the same interatomic distances, r, in their PDF functions, G(r). The first peak, at r=2.4 Å, corresponds to the nearest-neighbor Ca—O, which is evidence of calcium phosphate nuclei formation.[54] The second peak, at r=2.8 Å, indicates an O—O interatomic distance typically observed in liquid water.[55] This peak at r=2.8 Å was strong because the beads were all analyzed in a hydrated condition to prevent potential alteration of the seed nuclei's crystalline structures by dehydration. Compared to the PDF of synthetic HA, which showed a clear long-range order (interatomic distance, r>12 Å), that for Ca-Alg/CaP prepared with 20 mM $OH^-$ was weaker, but the correlation still extended for over 10 Å. Any comparable correlation essentially disappeared for samples prepared with 0 mM $OH^-$. Therefore, it was concluded that seed mineral in Ca-Alg/CaP became structurally ordered more like HA when prepared with 20 mM $OH^-$ than that with 0 mM $OH^-$.

Figure 8C:
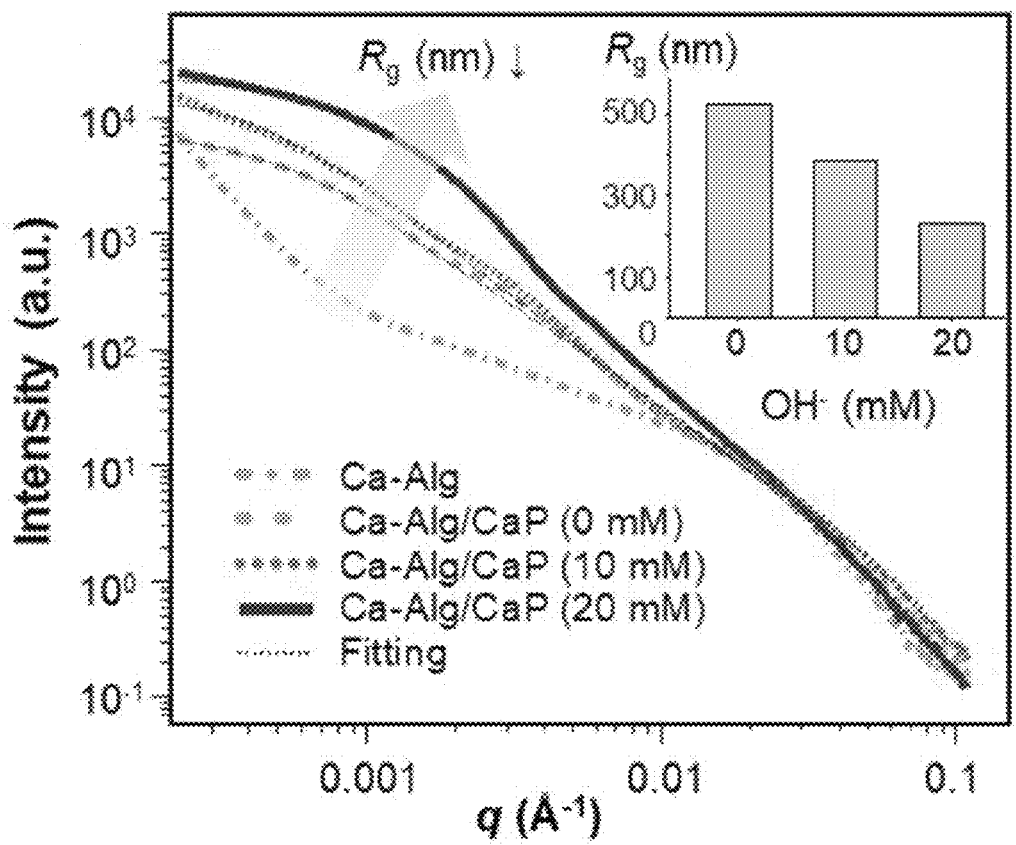

During the phase transformation of CaP particles from amorphous to crystalline apatite in biologically relevant aqueous systems, the size of particles often decreases because the particles form via aggregation and subsequent condensation of nucleation precursors.[29,46,56] However, the size of CaP seeds embedded in beads could not be easily evaluated using conventional surface characterization tools. From USAXS analysis of the Ca-Alg/CaP, the grain size of the nuclei as a radius of gyration, Rg (FIG. 8C) was determined.[57-59] The Rg of CaP nuclei decreased significantly with increasing crystallinity, from 522 nm (with 0 mM $OH^-$) to 232 nm (with 20 mM $OH^-$). No discernible features of smaller size particles, such as apatite plates (40 nm×30 nm×2 nm) in bones,[60] were observed by using either USAXS or SAXS (with an adjusted q range to better analyze particles smaller than 70 nm).[61,62] With a limited amount of calcium and phosphate precursors, the crystallization of seed nuclei might not proceed further during the Ca-Alg beads formation. Therefore, Ca-Alg/CaP beads prepared under different $OH^-$ conditions could maintain specific seed nuclei crystalline structures and grain sizes, as introduced in this study.

Figure 9A:
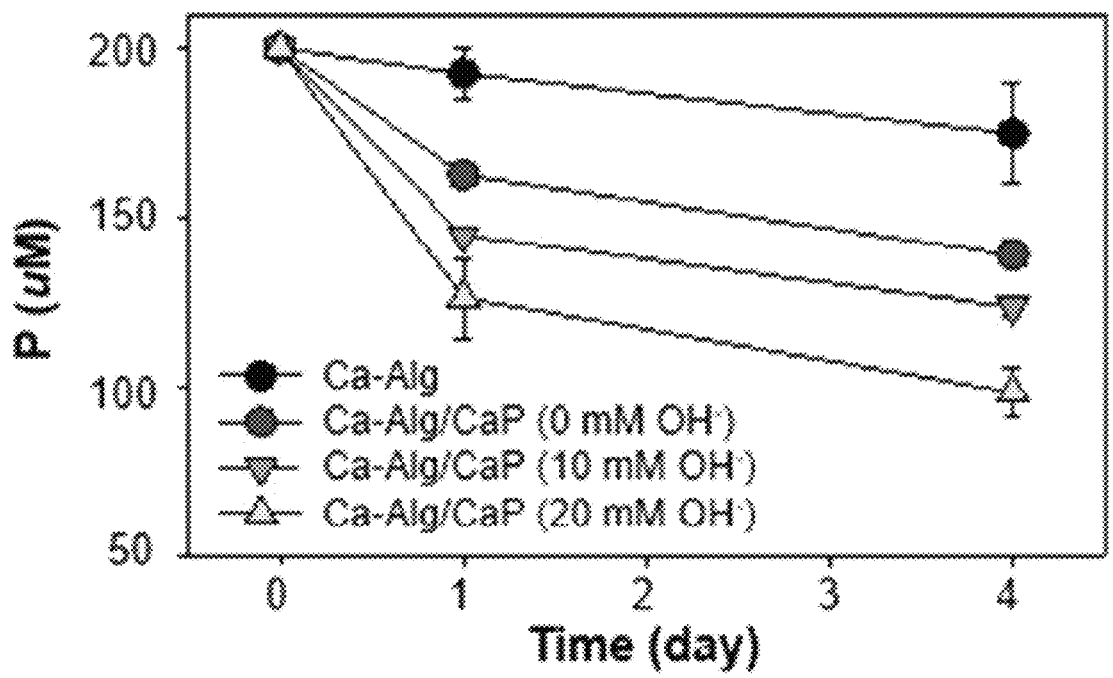
FIG. 9A, FIG. 9B, and FIG. 9C depict (FIG. 9A) Equilibrium aqueous P concentrations in the presence of Ca-Alg/CaP during P removal. Initial conditions: 10 mM NaCl, 0.2 mM Na$_2$HPO$_4$, pH=7.6, and 2 mM CaCl$_2$.
Figure 9B:
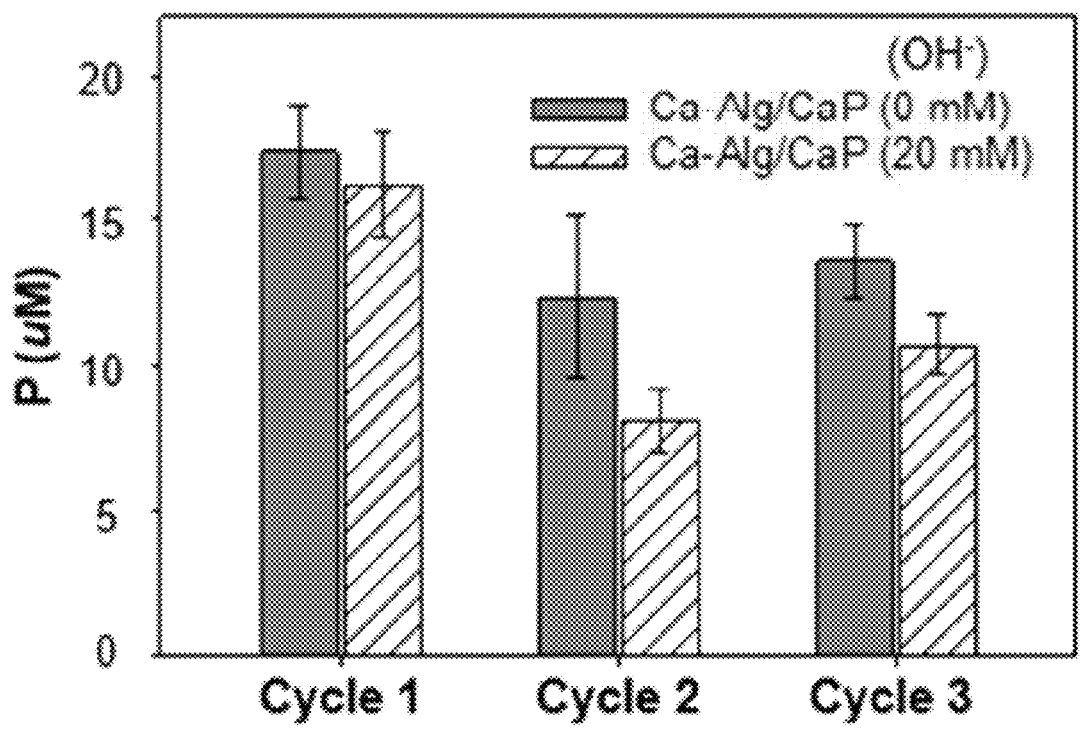

It was confirmed that higher $OH^-$ concentrations in the Ca bath for the beads' preparation resulted in a more ordered crystalline structure of HA-like seed minerals (FIG. 8A and FIG. 8B). The higher crystallinity of the seed minerals made them less soluble, lowering the P concentrations at the end of the removal experiments (FIG. 9A). From this clear trend, it can be concluded that the equilibrium P concentration is highly governed by the crystalline degree of the seed mineral. After the P removal experiments, to evaluate whether the beads could release P into the aqueous system as a potential fertilizer, the beads were recovered from the batch and then placed in P-free solutions. P released from Ca-Alg/CaP reached equilibrium within five hours. This time to reach equilibrium was nearly constant over three cycles of the release experiments, although the P concentration was slightly higher in the 1st cycle than in the 2nd and 3rd cycles (FIG. 9B). The equilibrium P concentrations in the 2nd and 3rd cycles with Ca-Alg/CaP prepared with 20 mM $OH^-$ were 9.4±2.0 µM, which was about 28% lower than with Ca-Alg/CaP prepared with 0 mM $OH^-$ (p<0.1 by Student's t-test, final pH values for both systems were equal to 7.0). This result indicates that the crystallinity of the seed nuclei also governs the P concentrations during the P release process, supporting the potential application of P-loaded Ca-Alg/CaP beads as a slow-release fertilizer. Over the three cycles, only 20% of the total immobilized P was released from the beads.

Figure 9C:
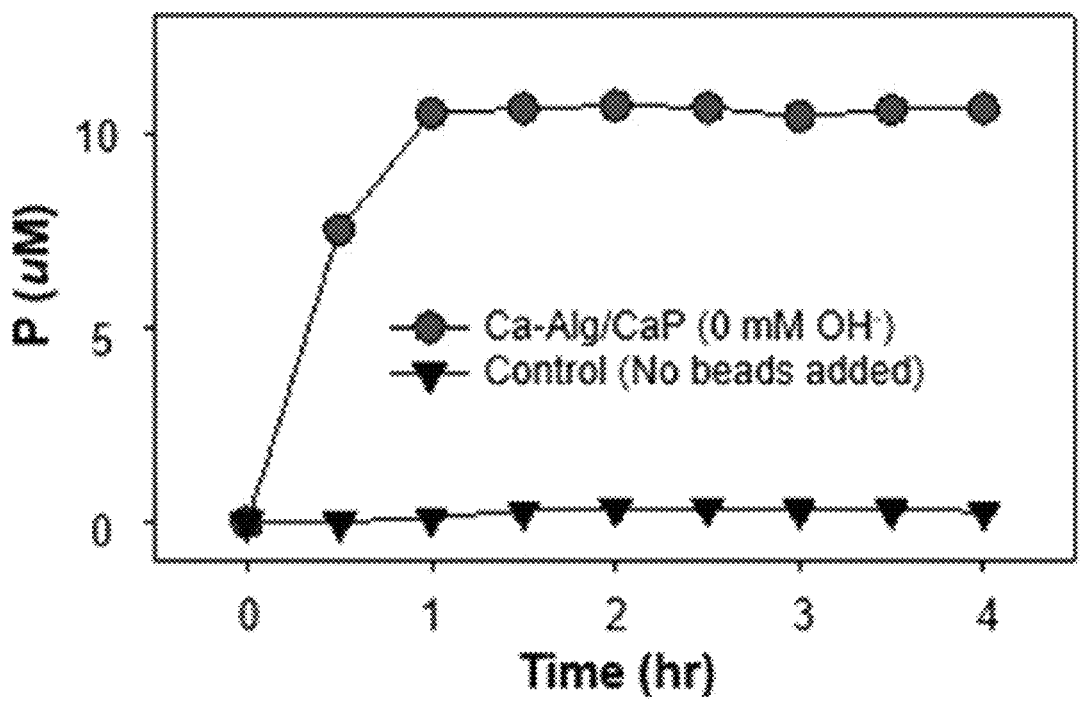

The beads' ability to maintain the P equilibrium concentration was also validated by sand column experiments. After the Ca-Alg/CaP beads (prepared in 0 mM $OH^-$) were placed on top of the 5 cm thick sand layer, P concentration in the effluent reached ~10 µM at pH~7 within an hour (FIG. 9C). Although the column experiments simulated a simplified soil system, the tests demonstrated that, within a relatively short time period, the P-captured beads can release P into the soil pore-water. The released P concentration was 10 times higher than the minimum P required in a rhizosphere soil solution (~1 µM),[63] suggesting that P can be released sufficiently fast for plant growth. Furthermore, the P level in the effluent from the column remained constant for an extended time, without excessive release of P, thus working as a slow-release fertilizer. This release pattern is clearly distinct from that of other, much more soluble phosphate fertilizer, such as triple superphosphate ($CaH_4P_2O_8$, solubility in water is about 20 $g^{L-1}$, releasing up to 0.17 M of P).[64,65] These findings provide an insight into the engineered control of steady P transport from fertilizer to plants.

FIG. 10 presents the final P concentrations (near equilibrium) obtained from the removal and release experiments, together with their final pH values, for comparison with the P solubility curves of reference CaP minerals (HA and OCP). At a final pH range 6.6-6.8, the data points from seed minerals with higher crystallinity are closer to the HA solubility curve, despite the slightly lower pH values. At this range of final pH values, the difference in equilibrium P concentrations for the different seed minerals most obviously appears as expected from the largest difference between the solubility curves for HA and OCP. The apparent solubility products, $pK'_{sp}$, of HA calculated based on the experimental data of CaP seed with 20 mM and 0 mM were 54.2 and 52.5, respectively, indicating that P solubility was controlled by the seed minerals' crystallinity over approximately two orders of magnitude.

Although the $pK'_{sp}$ of CaP seeds prepared in 20 mM $OH^-$ was lower than that of synthetic HA ($pK_{sp}$=58.5),[47] the seeds effectively decreased P concentrations from an initial 200 µM to ~20 µM at the end of release experiments (final pH 7.0-7.2). This P range is below the level allowed for typical wastewater effluents (~30-60 µM).[7] Therefore, the beads can be effectively utilized to treat aqueous systems contaminated by various P pollution sources, such as wastewater and landfill leachate (240-880 µM P, pH 7.5-8.5),[66] without the need for secondary pH adjustments. Similar equilibrium P concentrations with the CaP seed minerals (~10 µM P at pH 7.0-7.2) were also achieved during the P release experiments, highlighting the potential use of recovered P as a slow-release fertilizer. This level of P is sufficient to maintain the growth of crops,[63] without excessive P release into the environment.

Figure 11:
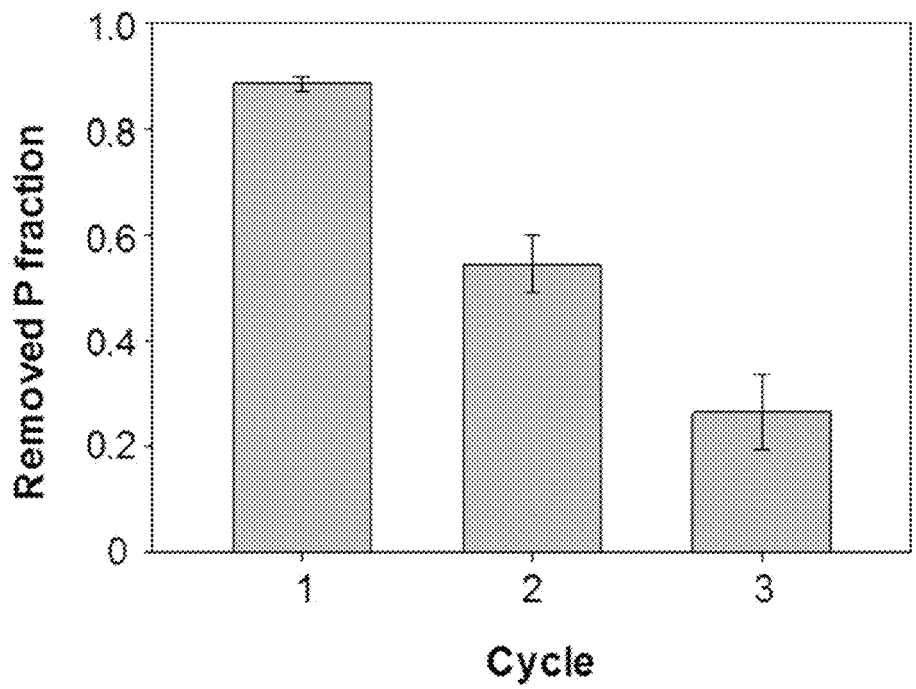
FIG. 11 depicts removed P fractions in solutions (initial conditions were 10 mM NaCl, 0.2 mM Na$_2$HPO$_4$, and 2 mM CaCl$_2$, pH=7.8) using Ca-Alg/CaP. Experiments were conducted by adding beads prepared by addition of 2 mL sodium alginate solution (equivalent to 5.7 mg of dry CaP seed mineral) into a batch containing 100 mL solution (first cycle). After 24 hours of reactions, beads were collected and then transferred to a fresh batch (second cycle). Three batches were used for removal with the same beads.
Figure 12A:
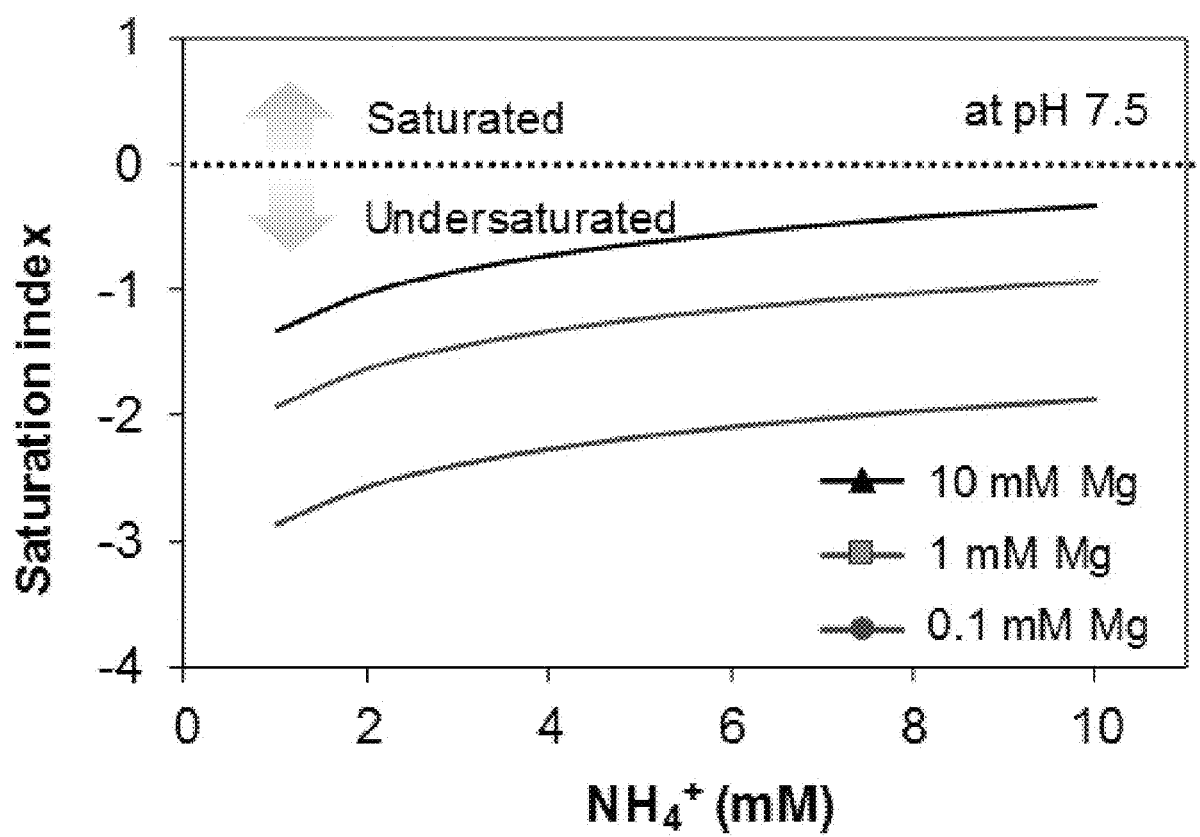
FIG. 12A and FIG. 12B depict supersaturation index with respect to struvite in the HA-supersaturated condition.
Figure 12B:
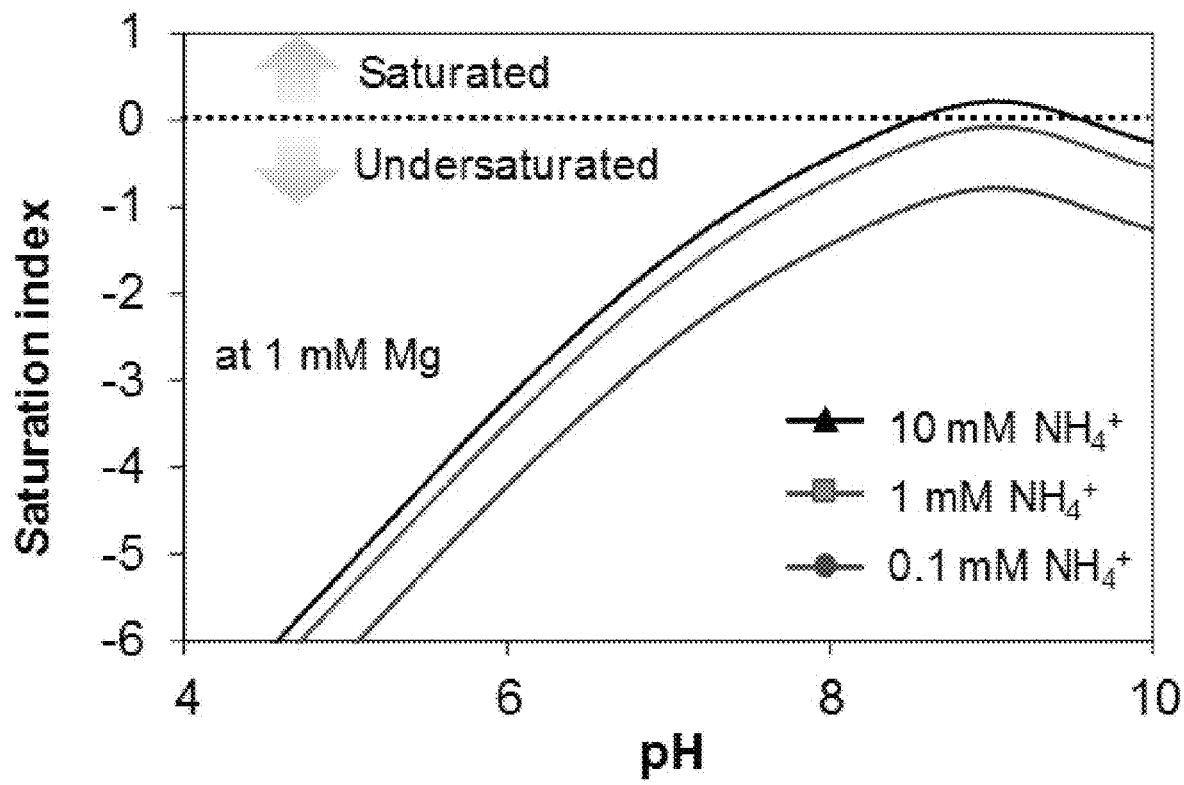

Potential Field Applications of Ca-Alg/CaP:

In this study, the aqueous P concentrations were controlled by the solubility of seed minerals, and the CaP seeded beads could remove almost 90% of P in the HA-supersaturated system within a day at pH 7.2 (from initial 200 µM to ~20 µM, FIG. 7A). Therefore, the suggested approach can be successfully operated for the P removal at neutral pH, avoiding expensive secondary pH adjustment of the effluent. The same principle for reaching equilibrium with poorly crystalline HA-like CaP seed mineral can also be applied for P release (FIG. 9C), highlighting the potential use of recovered P as a fertilizer. The use of a macroscale organic template of calcium alginate beads provided a practical benefit of easier recovery for reuse as a fertilizer without the need for further processes, such as filtration or centrifugation. In addition, the large volume of the beads (compared to the amount of alginate and seed mineral) can store a large amount of P. In our experiments under the HA-saturated condition, 96.4 mg of P was captured per g of dry seed mineral (FIG. 7A and Table 1). In our additional experiments, the beads captured additional P over two more cycles, showing removal of up to 186 mg g$^{-1}$ (FIG. 11). This value was significantly higher than for other recently reported P adsorbents, such as commercial HFO-201 (an Fe(III) oxide-based nanocomposite, ~35 mg g$^{-1}$ at pH 6-7), hydrated La(III) oxide nanoclusters (~60 mg g$^{-1}$ at pH 6-7),[67] or zirconium oxide nanoparticles (99 mg g$^{-1}$ at pH 6.2).[68] However, more accurate comparisons with these materials can be made by evaluating P removal efficiency under the same experimental conditions and with the same dose of adsorbents in the future. Especially, the competition among phosphate and other oxyanions, such as arsenic and nitrate, needs to be evaluated because these oxyanions potentially affect the P removal efficiency of beads and their environmental safety when applied as a clean fertilizer. Although struvite formation in our experimental condition was not plausible (FIG. 12A and FIG. 12B), when the beads are used for effluents from wastewater treatment plants with anaerobic digestion,[65] the influence of $NH_4^+$ should be considered because it may compete with HA by forming struvite in the presence of $Mg^{2+}$.

Figures 1C, 1D:
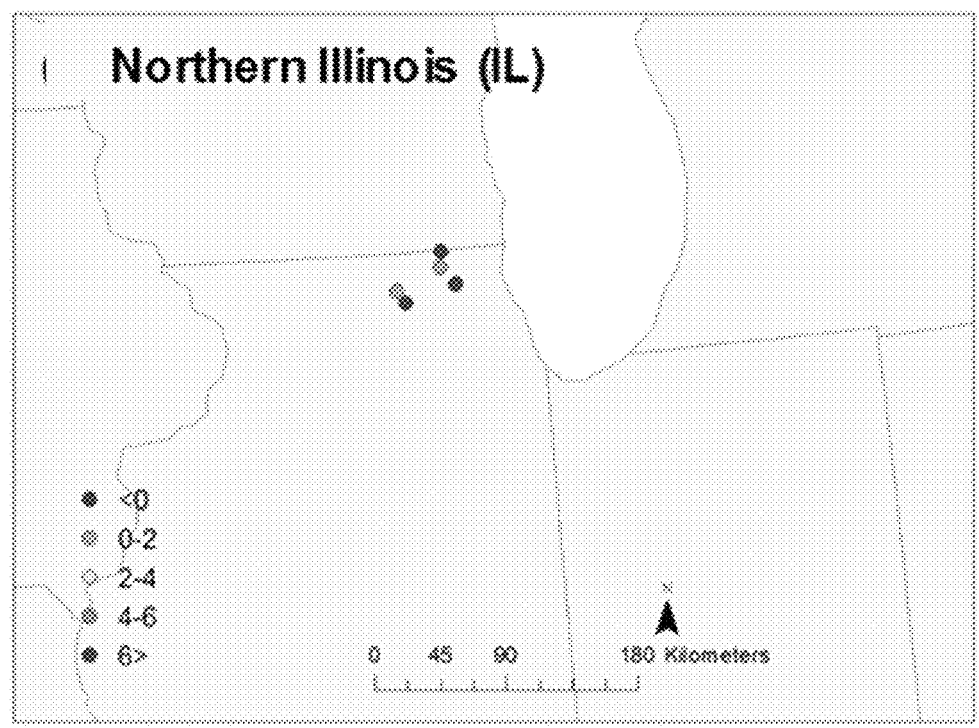

As discussed, Ca-Alg/CaP performed best under the HA-supersaturated condition (2 mM Ca and 0.2 mM P) at circumneutral pH, and this condition is highly comparable to Ca-rich and/or P-rich aqueous environments. According to the USGS National Water-Quality Assessment, about 60 percent of sampled wells provide hard water (>120 mg/L as $CaCO_3$). Moreover, many of them have hardness levels even higher than 180 mg L$^{-1}$ (equivalent to 1.8 mM of $Ca^{2+}$, generally classified as very hard water).[22] These aqueous systems with high $Ca^{2+}$ concentrations can be easily HA-supersaturated when exposed to P-abundant streams. For example, even without significant commercial or industrial loads, the concentration of total phosphorus in wastewater treatment effluent may exceed 6 mg L$^{-1}$ as P (~0.2 mM).[69,70] Indeed, our evaluation of the saturation of groundwater using USGS National Groundwater Monitoring Network data showed that most of samples in the Chesapeake Bay and Louisiana areas (pH 7.7±0.9 and 7.7±0.7, respectively) were HA-supersaturated (FIG. 1A, FIG. 1B, and FIG. 1C). This analysis strongly supports our approach as a potential P management strategy by showing that many aqueous environments at neutral pH are already supersaturated with respect to HA.

Figure 13A:
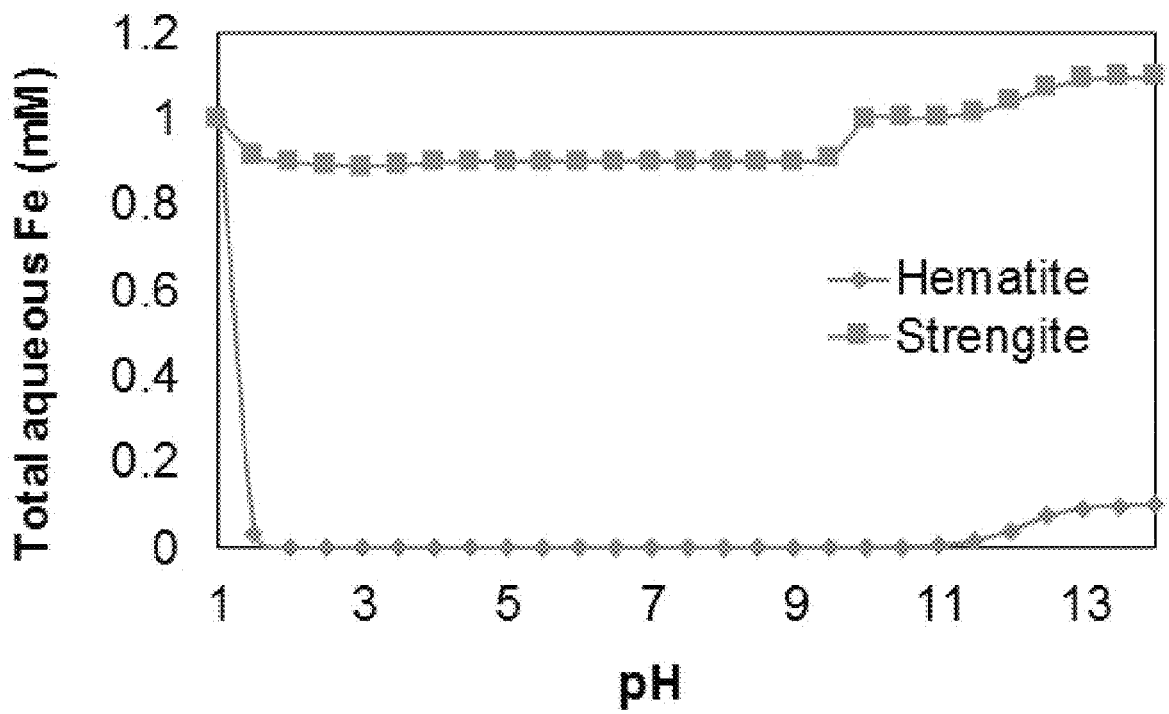
FIG. 13A and FIG. 13B depict aqueous Fe and P concentrations equilibrated with hematite (Fe$_2$O$_3$) and strengite (FePO$_4$.2H$_2$O). Thermodynamic equilibrium calculations were conducted by Visual MINTEQ (Ver. 3.1). Initial conditions of the system were 1 mM FeCl$_3$ and 0.1 mM Na$_3$PO$_4$. A lower Fe concentration equilibrated with hematite than with strengite indicates that iron oxide is more thermodynamically stable than iron phosphate minerals (FIG. 13A). If hematite precipitation occurs (FIG. 13B), the immobilization of P as a strengite mineral is inhibited. At higher pH, iron hydroxide formation dominates, therefore P immobilization is also inhibited.
Figure 13B:
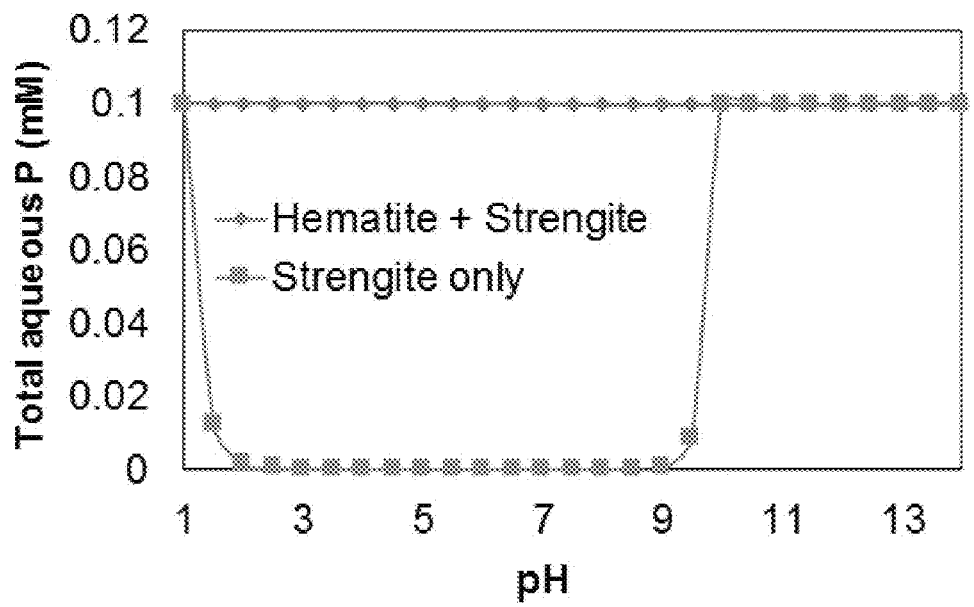

The current options for chemical precipitations using ferric salts or calcium (hydr)oxide are known to be effective, but they have limited applicability for on-site operations due to their significant pH alteration.[7] Moreover, although phosphate minerals are generally formed during these chemical processes, they turn into other mineral forms, such as ferric oxide, coloring water orange. Indeed, hematite ($Fe_2O_3$) is thermodynamically more stable than strengite ($FePO_4.2H_2O$) at a wide pH range, as shown in an example of a system containing 1 mM $FeCl_3$ and 0.1 mM $Na_3PO_3$ (FIG. 13A and FIG. 13B). Thus, the consumption of ferric ions by hematite precipitation would inhibit P immobilization in certain environments. In addition, pH must be maintained around 5 during chemical precipitation using ferric chloride, because iron hydroxide minerals, which compete with iron phosphate minerals, can form at a higher pH range.[7] During treatments using CaO or Ca bearing materials, calcium hydroxide or calcium carbonate may form instead of CaP minerals (pH>8.5, FIG. 4), which can release P into the aqueous environments again. This adverse effect significantly weakens the capacities of these processes as effective treatment methodologies.

REFERENCES

1. G. M. Filippelli, *Rev. Mineral. Geochem.*, 2002, 48, 391-425.
2. S. M. Powers, T. W. Bruulsema, T. P. Burt, N. I. Chan, J. J. Elser, P. M. Haygarth, N. J. K. Howden, H. P. Jarvie, Y. Lyu, H. M. Peterson, A. N. Sharpley, J. Shen, F. Worrall and F. Zhang, *Nat. Geosci.*, 2016, 9, 353-356.
3. R. J. Diaz and R. Rosenberg, *Science*, 2008, 321, 926-929.
4. J. Elser and E. Bennett, *Nature*, 2011, 478, 29-31.
5. D. Cordell, J.-O. Drangert and S. White, *Global Environ. Change*, 2009, 19, 292-305.
6. T. Lougheed, *Environ. Health Perspect.*, 2011, 119, a302-a305.
7. S. A. Parsons and J. A. Smith, *Elements*, 2008, 4, 109-112.
8. P. J. A. Withers, J. J. Elser, J. Hilton, H. Ohtake, W. J. Schipper and K. C. van Dijk, *Green Chem.*, 2015, 17, 2087-2099.
9. P. Wilfert, P. S. Kumar, L. Korving, G.-J. Witkamp and M. C. M. van Loosdrecht, *Environ. Sci. Technol.*, 2015, 49, 9400-9414.
10. Z. Bradford-Hartke, J. Lane, P. Lant and G. Leslie, *Environ. Sci. Technol.*, 2015, 49, 8611-8622.
11. A. S. Brooks, M. N. Rozenwald, L. D. Geohring, L. W. Lion and T. S. Steenhuis, *Ecol. Eng.*, 2000, 15, 121-132.
12. A. R. Buda, G. F. Koopmans, R. B. Bryant and W. J. Chardon, *J. Environ. Qual.*, 2012, 41, 621-627.
13. C. Vohla, M. Koiv, H. J. Bavor, F. Chazarenc and U. Mander, *Ecol. Eng.*, 2011, 37, 70-89.
14. J. P. Gustafsson, A. Renman, G. Renman and K. Poll, *Water Res.*, 2008, 42, 189-197.
15. Y. Li, C. Liu, Z. Luan, X. Peng, C. Zhu, Z. Chen, Z. Zhang, J. Fan and Z. Jia, *J. Hazard. Mater.*, 2006, 137, 374-383.
16. A. Heistad, A. M. Paruch, L. Vrale, K. Adam and P. D. Jenssen, *Ecol. Eng.*, 2006, 28, 374-379.
17. S. Karaca, A. Gurses, M. Ejder and M. Acikyildiz, *J. Colloid Interface Sci.*, 2004, 277, 257-263.
18. J. Thistleton, T. A. Berry, P. Pearce and S. A. Parsons, *Process Saf. Environ. Prot.*, 2002, 80, 265-269.
19. F. Xie, F. Wu, G. Liu, Y. Mu, C. Feng, H. Wang and J. P. Giesy, *Environ. Sci. Technol.*, 2014, 48, 582-590.

20. S. R. Joshi, R. K. Kukkadapu, D. J. Burdige, M. E. Bowden, D. L. Sparks and D. P. Jaisi, *Environ. Sci. Technol.,* 2015, 49, 5887-5896.
21. National Ground-Water Monitoring Network Website, http://cida.usgs.gov/ngwmn/index.jsp.
22. L. A. DeSimone, P. A. Hamilton and R. J. Gilliom, *Quality of water from domestic wells in principal aquifers of the United States, 1991-2004: overview of major findings,* US Department of the Interior, US Geological Survey, 2009.
23. O. Borkiewicz, J. Rakovan and C. L. Cahill, *Am. Mineral.,* 2010, 95, 1224-1236.
24. E. Smolders, E. Baetens, M. Verbeeck, S. Nawara, J. Diels, M. Verdievel, B. Peeters, W. De Cooman and S. Baken, *Environm. Sci. Technol.,* 2017, 51, 2584-2592.
25. J. L. Gamble, *Chemical anatomy physiology and pathology of extracellular fluid: A lecture syllabus,* Harvard University Press, Sixth edition edn., 1967.
26. M. J. Glimcher, *Rev. Mineral. Geochem.,* 2 479 006, 64, 223-282.
27. J. D. Pasteris, B. Wopenka and E. Valsami-Jones, *Elements,* 2008, 4, 97-104.
28. Y. Wang, T. Azais, M. Robin, A. Vallee, C. Catania, P. Legriel, G. Pehau-Arnaudet, F. Babonneau, M.-M. Giraud-Guille and N. Nassif, *Nat. Mater.,* 2012, 11, 724.
29. A. Dey, P. H. Bomans, F. A. Muller, J. Will, P. M. Frederik and N. A. Sommerdijk, *Nat. Mater.,* 2010, 9, 1010-1014.
30. R. Russo, M. Malinconico and G. Santagata, *Biomacromolecules,* 2007, 8, 3193-3197.
31. L. S. Nair and C. T. Laurencin, *Prog. Polym. Sci.,* 2007, 32, 762-798.
32. J. R. Dodson, H. L. Parker, A. Munoz Garcia, A. Hicken, K. Asemave, T. J. Farmer, H. He, J. H. Clark and A. J. Hunt, *Green Chem.,* 2015, 17, 1951-1965.
33. S. Bajpai, N. Chand and V. Chaurasia, *Food Bioprocess Technol.,* 2012, 5, 1871-1881.
34. K. Zhao, L. Feng, Z. Li, Y. Fu, X. Zhang, J. Wei and S. Wei, *RSC Adv.,* 2014, 4, 51321-51329.
35. X. Shen, J. L. Shamshina, P. Berton, G. Gurau and R. D. Rogers, *Green Chem.,* 2016, 18, 53-75.
36. W. Chen, L. Li, W. Zhang, F. Xu, M. Niu, J. Wang and Y. Wang, *Clean: Soil, Air, Water,* 2014, 42, 561-570.
37. H. Yang, Q. Zhou, W. Luo, C. Yan and C. Zhou, *Desalin. Water Treat.,* 2016, 57, 18354-18365.
38. Y. Vijaya, S. R. Popuri, A. S. Reddy and A. Krishnaiah, *J. Appl. Polym. Sci.,* 2011, 120, 3443-3452.
39. J. H. Clark, *Green Chem.,* 1999, 1, 1-8.
40. B. Bhushan, *Philos. Trans. R. Soc., A,* 2009, 367, 1445-1486.
41. H. C. W. Skinner, Mineral. *Mag.,* 2005, 69, 621-641.
42. Q. Li, A. Fernandez-Martinez, B. Lee, G. A. Waychunas and Y.-S. Jun, *Environ. Sci. Technol.,* 2014, 48, 5745-5753.
43. L. Wang, E. Ruiz-Agudo, C. V. Putnis, M. Menneken and A. Putnis, *Environ. Sci. Technol.,* 2012, 46, 834-842.
44. M. J. Arellano-Jimenez, R. Garcia-Garcia and J. Reyes-Gasga, *Journal of Physics and Chemistry of Solids,* 2009, 70, 390-395.
45. S. Tsang, F. Phu, M. M. Baum and G. A. Poskrebyshev, *Talanta,* 2007, 71, 1560-1568.
46. W. J. E. M. Habraken, J. Tao, L. J. Brylka, H. Friedrich, L. Bertinetti, A. S. Schenk, A. Verch, V. Dmitrovic, P. H. H. Bomans, P. M. Frederik, J. Laven, P. van der Schoot, B. Aichmayer, G. de With, J. J. DeYoreo and N. A. J. M. Sommerdijk, *Nat. Commun.,* 2013, 4.
47. H. McDowell, T. Gregory and W. Brown, *J. Res. Nat. Bur. Stand. A,* 1977, 81, 273-281.
48. M. Tung, N. Eidelman, B. Sieck and W. Brown, *J. Res. Nat. Bur. Stand.,* 1988, 93, 613-624.
49. T. M. Gregory, E. C. Moreno and W. E. Brown, *J. Res. Nat. Bur. Stand. A,* 1970, 74A, 461-475.
50. L. N. Plummer and E. Busenberg, *Geochim. Cosmochim. Acta,* 1982, 46, 1011-1040.
51. L. Wang, L. Qin, C. V. Putnis, E. Ruiz-Agudo, H. E. King and A. Putnis, *Environ. Sci. Technol.,* 2016, 50, 259-268.
52. C. Combes and C. Rey, *Acta Biomater.,* 2010, 6, 3362-3378.
53. J. J. De Yoreo, G. A. Waychunas, Y.-S. Jun and A. Fernandez-Martinez, *Rev. Mineral. Geochem.,* 2013, 77, 229-257.
54. J. M. Delgado-Lopez, R. Frison, A. Cervellino, J. Gomez-Morales, A 525. Guagliardi and N. Masciocchi, *Adv. Funct. Mater.,* 2013, 24, 1090-1099.
55. A. Nilsson and L. G. M. Pettersson, *Nat. Commun.,* 2015, 6.
56. D. Kim, B. Lee, S. Thomopoulos and Y.-S. Jun, *Cryst. Growth Des.,* 2016, 16, 359-5366.
57. J. Ilaysky and P. R. Jemian, *J. Appl. Crystallogr.,* 2009, 42, 347-353.
58. J. Ilaysky, P. R. Jemian, A. J. Allen, F. Zhang, L. E. Levine and G. G. Long, *J. Appl. Crystallogr.,* 2009, 42, 469-479.
59. F. Zhang, J. Ilaysky, G. Long, J. G. Quintana, A. Allen and P. Jemian, *Metall. Mater. Trans. A,* 2010, 41, 1151-1158.
60. W. J. Landis, M. J. Song, A. Leith, L. McEwen and B. F. McEwen, *J. Struct. Biol.,* 1993, 110, 39-54.
61. Y.-S. Jun, B. Lee and G. A. Waychunas, *Environ. Sci. Technol.,* 2010, 44, 8182-8189.
62. Y.-S. Jun, D. Kim and C. W. Neil, *Acc. Chem. Res.,* 2016, 49, 1681-1690.
63. A. E. Johnston, P. R. Poulton, P. E. Fixen and D. Curtin, *Adv. Agron,* 2014, 123, 177-228.
64. L. P. F. Benicio, V. R. L. Constantino, F. G. Pinto, L. Vergutz, J. Tronto and L. M. da Costa, *ACS Sustain. Chem. Eng.,* 2017, 5, 399-409.
65. G. Kongshaug, B. A. Brentnall, K. Chaney, J.-H. Gregersen, P. Stokka, B. Persson, N. W. Kolmeijer, A. Conradsen, T. Legard, H. Munk, O. Skauli, H. Kiiski, K. R. Solheim, T. Legard, B. A. Brentnall and P. Rauman-Aalto, in *Ullmann's Encyclopedia of Industrial Chemistry,* Wiley-VCH, 2000.
66. K. Yetilmersoy and Z. Sapci-Zengin, *J. Hazard. Mater.,* 2009, 166, 260-269.
67. Y. Zhang, B. Pan, C. Shan and X. Gao, *Environ. Sci. Technol.,* 2016, 50, 1447-1454.
68. Y. Su, H. Cui, Q. Li, S. Gao and J. K. Shang, *Water Res.,* 2013, 47, 5018-5026.
69. S. Sengupta and A. Pandit, *Water Res.,* 2011, 45, 3318-3330.
70. T. D. McCobb, D. R. LeBlanc, D. A. Walter, K. M. Hess, D. B. Kent and R. L. Smith, *Phosphorus in a ground-water contaminant plume discharging to Ashumet Pond, Cape Cod, Massachusetts,* 1999, Report 2002-4306, 2003.
71. J. D. Hagy, W. R. Boynton, C. W. Keefe and K. V. Wood, Estuaries, 2004, 27, 634-658.

72. N. N. Rabalais, R. E. Turner, R. J. Diaz and D. Justić, ICES J. Mar. Sci., 2009, 66, 1528-1537.
73. N. N. Rabalais, R. E. Turner, B. K. S. Gupta, E. Platon and M. L. Parsons, Ecol. Appl., 2007, 17, S129-S143.
74. C. L. Schelske, E. F. Stoermer and W. F. Kenney, Limnol. Oceanogr., 2006, 51, 728-748.
75. E. K. Read, M. Ivancic, P. Hanson, B. J. Cade-Menun and K. D. McMahon, Water Res., 2014, 62, 229-240.
76. M. J. Olszta, X. Cheng, S. S. Jee, R. Kumar, Y.-Y. Kim, M. J. Kaufman, E. P. Douglas and L. B. Gower, Mater. Sci. Eng. R, 2007, 58, 77-116.
77. X. Cao, W. G. Harris, M. S. Josan and V. D. Nair, Sci. Total Environ., 2007, 383, 205-215.
78. K. W. Chapman, S. H. Lapidus and P. J. Chupas, J. Appl. Crystallogr., 2015, 48.
79. X. Qiu, J. W. Thompson and S. J. Billinge, J. Appl. Crystallogr., 2004, 37, 678-678.
80. J. Ilaysky, F. Zhang, A. J. Allen, L. E. Levine, P. R. Jemian and G. G. Long, Metal. Mater. Trans A, 2013, 44, 68-76.
81. X. Lu and Y. Leng, Biomaterials, 2005, 26, 1097-1108.
82. C. N. Sawyer, P. L. McCarthy and G. F. Parkin, Chemistry for Environmental Engineering and Science, McGraw Hill, 2002.

Figure 14:
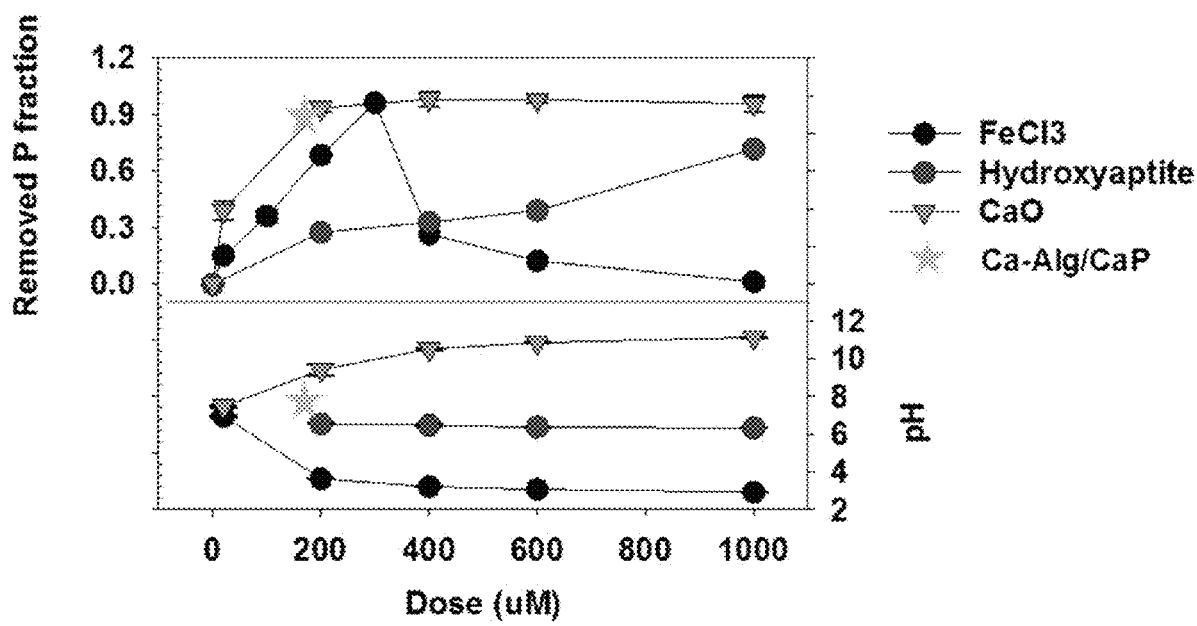
FIG. 14 depicts P concentrations during removal using FeCl$_3$, hydroxyapatite, CaO, and Ca-Alg/CaP beads.

Example 2: Comparison with Other Treatments Using $FeCl_3$, Hydroxyapatite, CaO 0-1000 mM of $FeCl_3$, hydroxyapatite, and CaO were added to 100 mL of P-containing solution (10 mM NaCl, 2 mM $CaCl_2$, 0.2 mM $Na_2HPO_4$, pH 7.6,). After 22 hour reaction, P concentrations in solution and pH of the solution were measured. The result was compared with P removal data at 22 hour using calcium alginate beads with calcium phosphate seed mineral (Ca-Alg/CaP, indicated by star symbol, data from FIG. 7A, green reverse triangle (FIG. 14)). The dose of Ca-Alg/CaP represents the amount of seed minerals.

Example 3: Comparison of Phosphorous Removal Using CaP Beads and Commercially Available Product, Phoslock (La-Modified Bentonite)

200 mg/L (dry weight/Solution) of beads (Ca-Alg/CaP) and Phoslock were placed in tea bags (as an easier recovery tool), then the tea bags were added to a P-containing solution (10 mM NaCl, 1 mM $CaCl_2$, 0.1 mM $Na_2HPO_4$). The pH of the solutions was maintained at either 7.5 or 8.0. The P concentrations in solutions and pH of the solutions were measured at 1, 2, 3, 4, and 5 days. After 5 days, the tea bags were recovered to observe remaining beads and Phoslock.

Figure 15A:
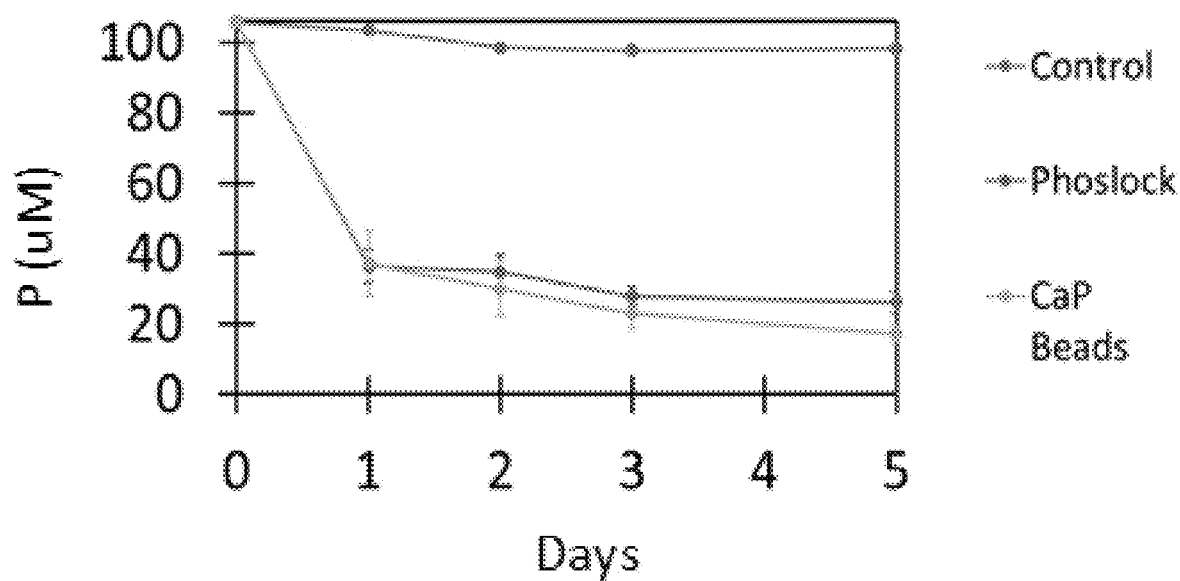
FIG. 15A, FIG. 15B, and FIG. 15C depict comparison of P removal using CaP beads and Phoslock.
Figure 15B:
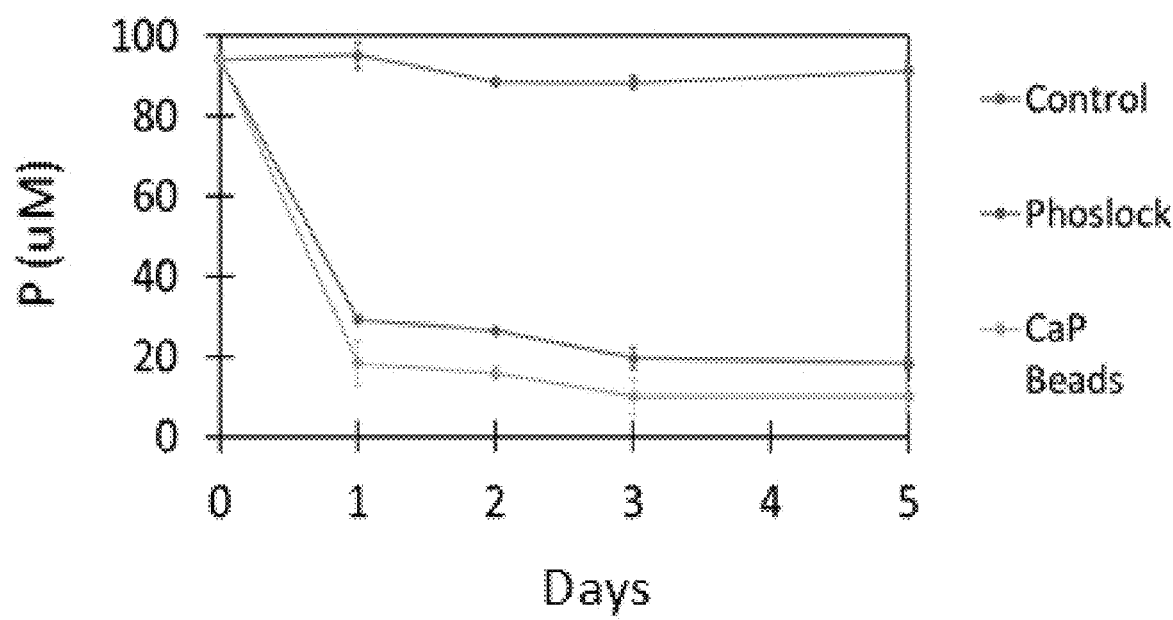
Figure 15C:
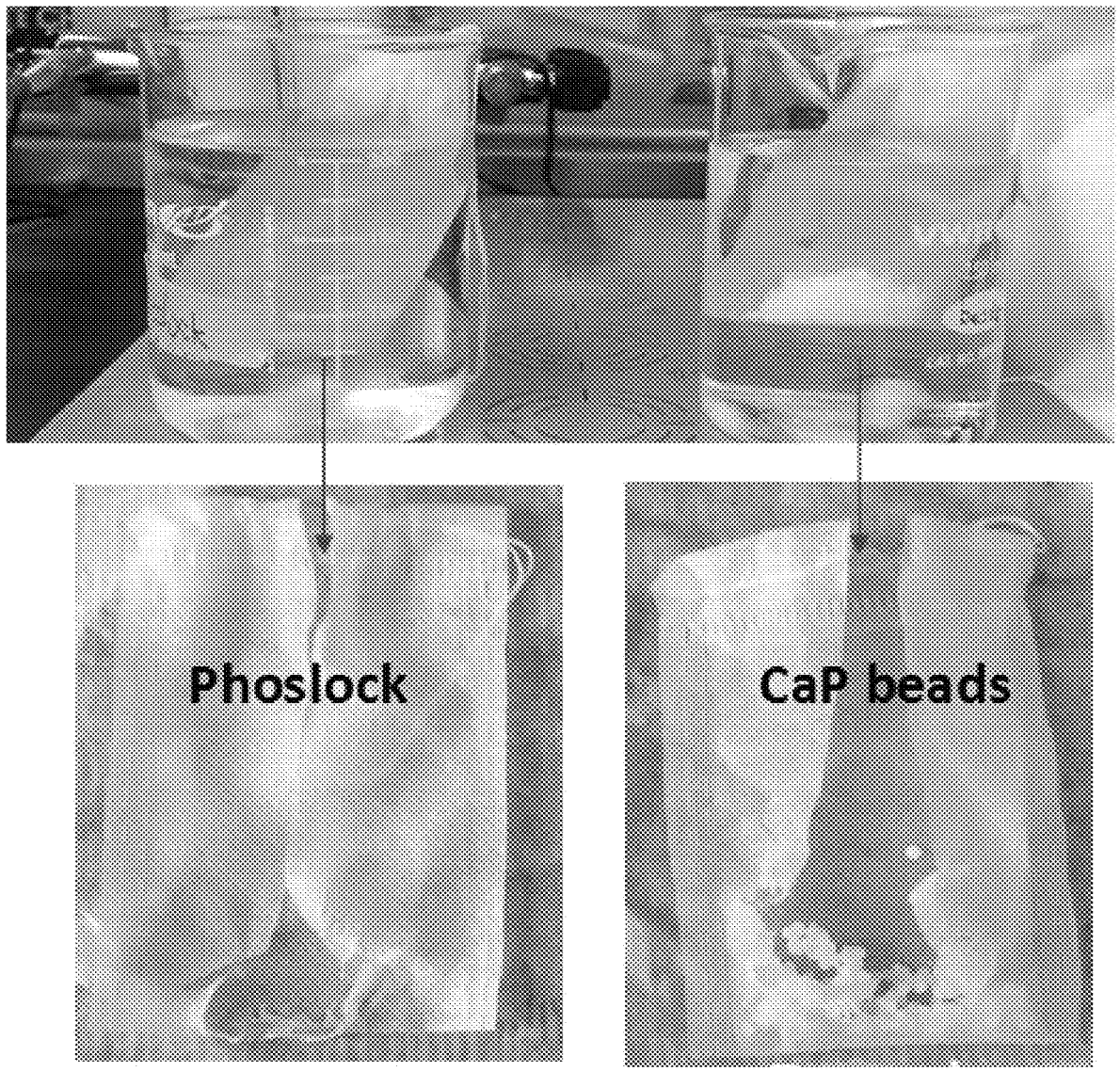

The biodegradable material described herein shows faster kinetics and lower equilibrium phosphate concentrations than Phoslock at both pH 7.5 and 8.0 (FIG. 15A). In addition to the improved removal efficiency, our product provides practical benefits of easier recovery. During the removal using Phoslock, most of initial products were dissolved into the solution, thus cannot be removed out from aqueous solution. On the other hand, beads were easily recovered by simply using a tea bag (FIG. 15B and FIG. 15C).

Example 4: Selective P Removal During 3 Cycles of P Removal Process Using Ca-Alg/CaP Ca-Alg/CaP beads (5.7 mg dry seed weight) were placed in 100 mL of P-containing solutions (Initial condition: 10 mM NaCl, 2 mM $CaCl_2$, 0.1 mM $Na_2HPO_4$, pH 7.8). In one condition, we additionally added 0.2 mM $Na_2HAsO_4$ to evaluate the influence of co-existing As on P removal. Another condition has only P as a control group (Data also presented in FIG. 11). After 24 hours of reaction (end of the first cycle), beads were collected and then transferred to a fresh batch (second cycle). Total three batches (three cycles) were tested for each condition for the P and As removal.

Figure 16:
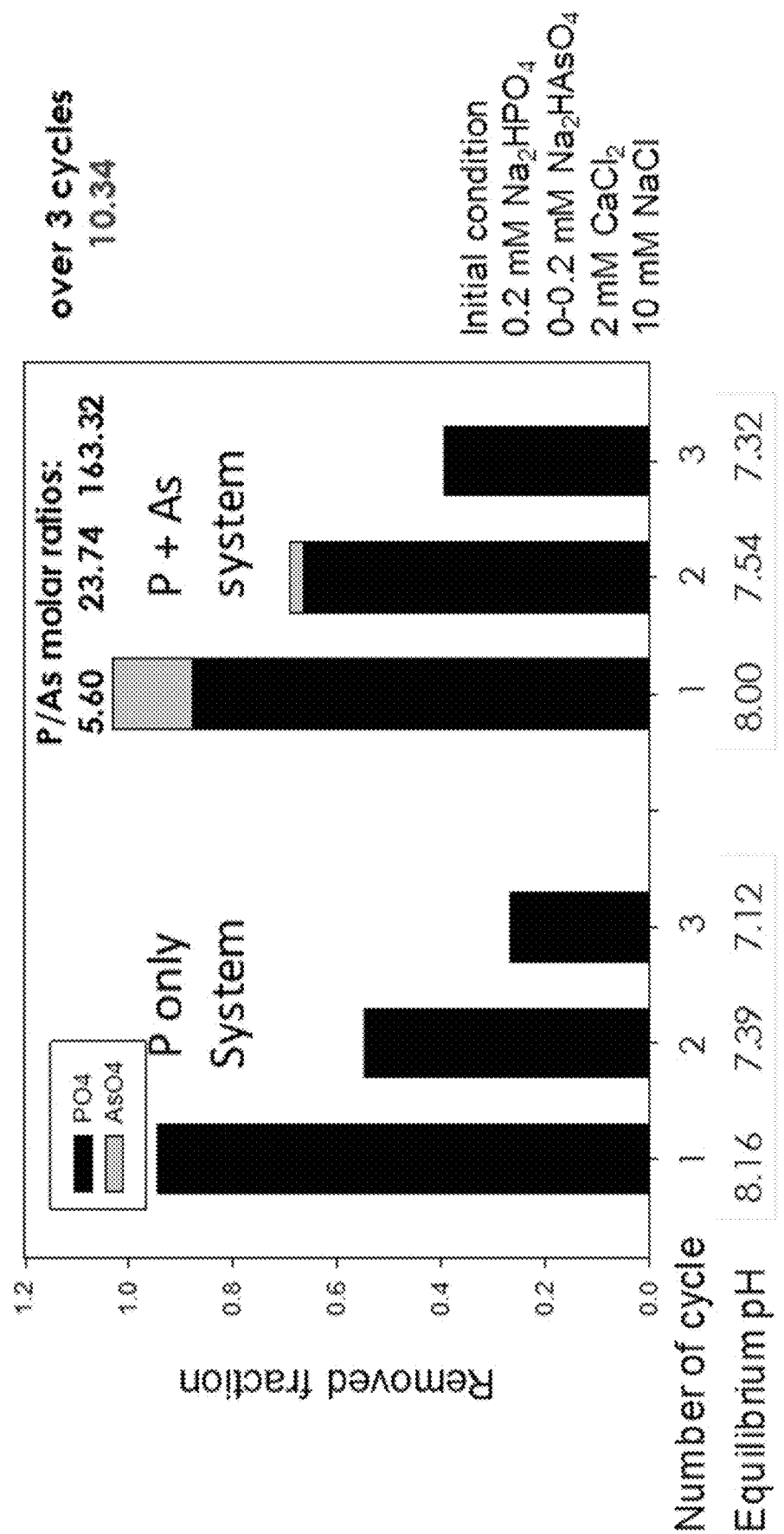
FIG. 16 depicts selective P removal during 3 cycles of P removal process using Ca-Alg/CaP.

Left 3 bar graphs were obtained from the P only system and Right 3 bar graphs were obtained from the P+As system (FIG. 16). P removal efficiency is not affected by co-existing arsenate during the 3 cycles of P removal processes. In addition, the selectivity toward P over As increases significantly over cycles, probably due to the decreased equilibrium pH at the later cycles. The decreased equilibrium pH resulted in overall lower removal efficiency.

All cited references are herein expressly incorporated by reference in their entirety.

Whereas particular embodiments have been described above for purposes of illustration, it will be appreciated by those skilled in the art that numerous variations of the details may be made without departing from the disclosure as described in the appended claims.

Example 5: Testing in Simplified General Wastewater Solution

Testing solution: 2 mM $CaCl_2$, 0.2 mM $Na_2HPO_4$, 10 mM NaCl pH=7.8 or 2 mM $CaCl_2$, 0.2 mM $Na_2HPO_4$, 30 mM NaCl, and pH=7.8 (Test solution volume=100 ml, ~0.0028 mg beads added (dry weight))

Bead fabrication conditions: 0.6% w/v sodium alginate (Food chemical codex (F.C.C.) grade; Spectrum Chemicals) (NaAlg)+35 mM $Na_2HPO_4$ dripped with a syringe pump into 180 mM $CaCl_2$+20 mM NaOH solution, and pH≈12

Justification: 10 mM NaCl conditions reflect the ionic strength of surface waters, while 30 mM reflects the ionic strength of municipal wastewater. Previously, we had tested the beads in 10 mM NaCl conditions.

Figure 17:
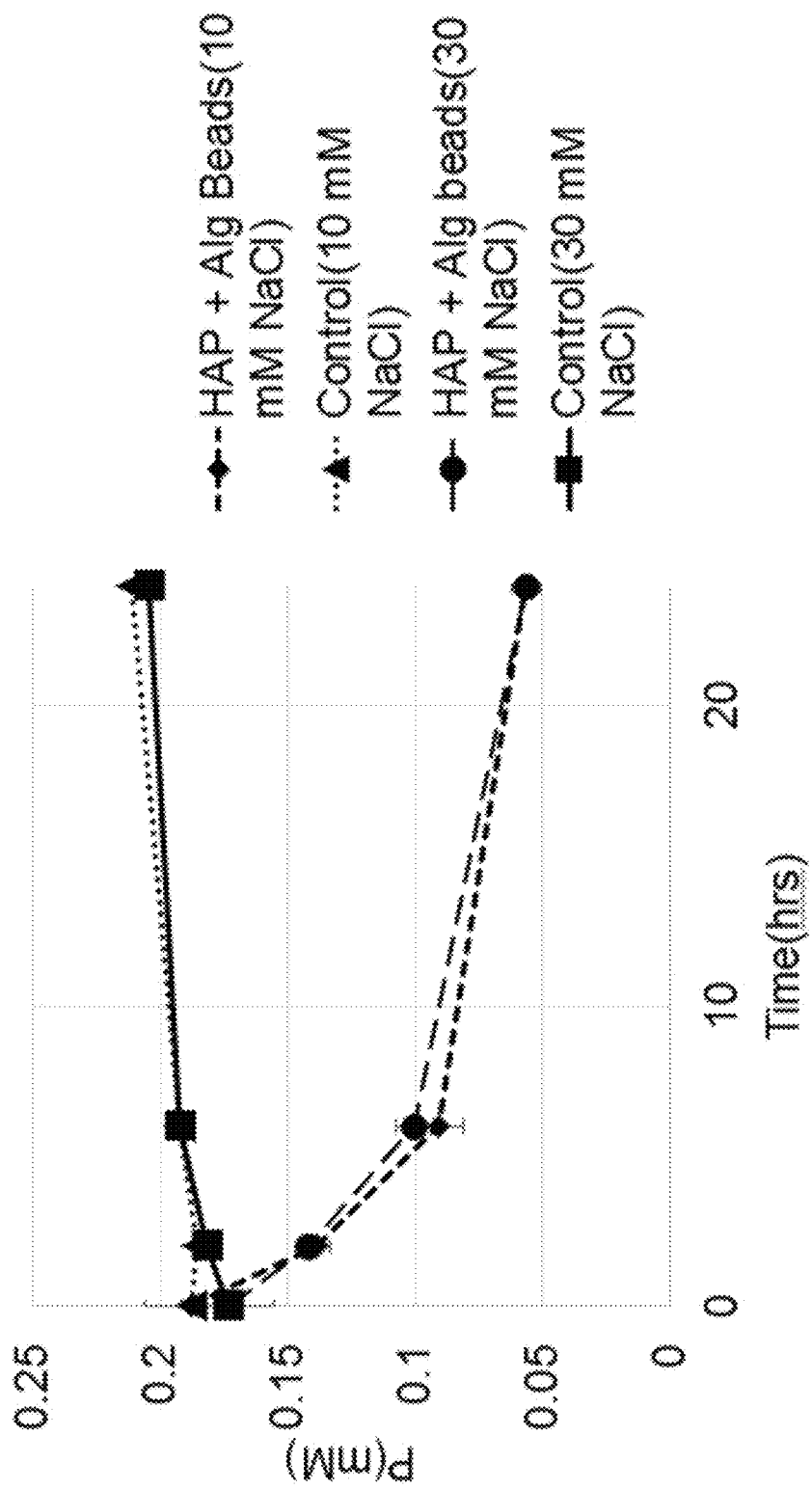
FIG. 17 depicts ionic strength shift (increase) from 10 mM NaCl (≈10 mM ionic strength) to 30 mM NaCl (≈30 mM ionic strength) had no effect on phosphate removal procedure.

Ionic strength shift from 10 mM NaCl (≈10 mM ionic strength) to 30 mM NaCl (≈30 mM ionic strength) had no effect on phosphate removal procedure (FIG. 17).

Testing solution: 2 mM $CaCl_2$, 0.2 mM $Na_2HPO_4$, 20 mM NaCl, 10 mM $NaHCO_3$, and pH=7.5 (Test solution volume=100 ml, 0.0028 mg beads added (dry weight)).

Bead Fabrication conditions: 0.6% w/v sodium alginate (F.C.C grade; Spectrum Chemicals)(NaAlg)+35 mM $Na_2HPO_4$ dripped with a syringe pump into 180 mM $CaCl_2$+20 mM NaOH solution, and pH≈12.

Figure 18:
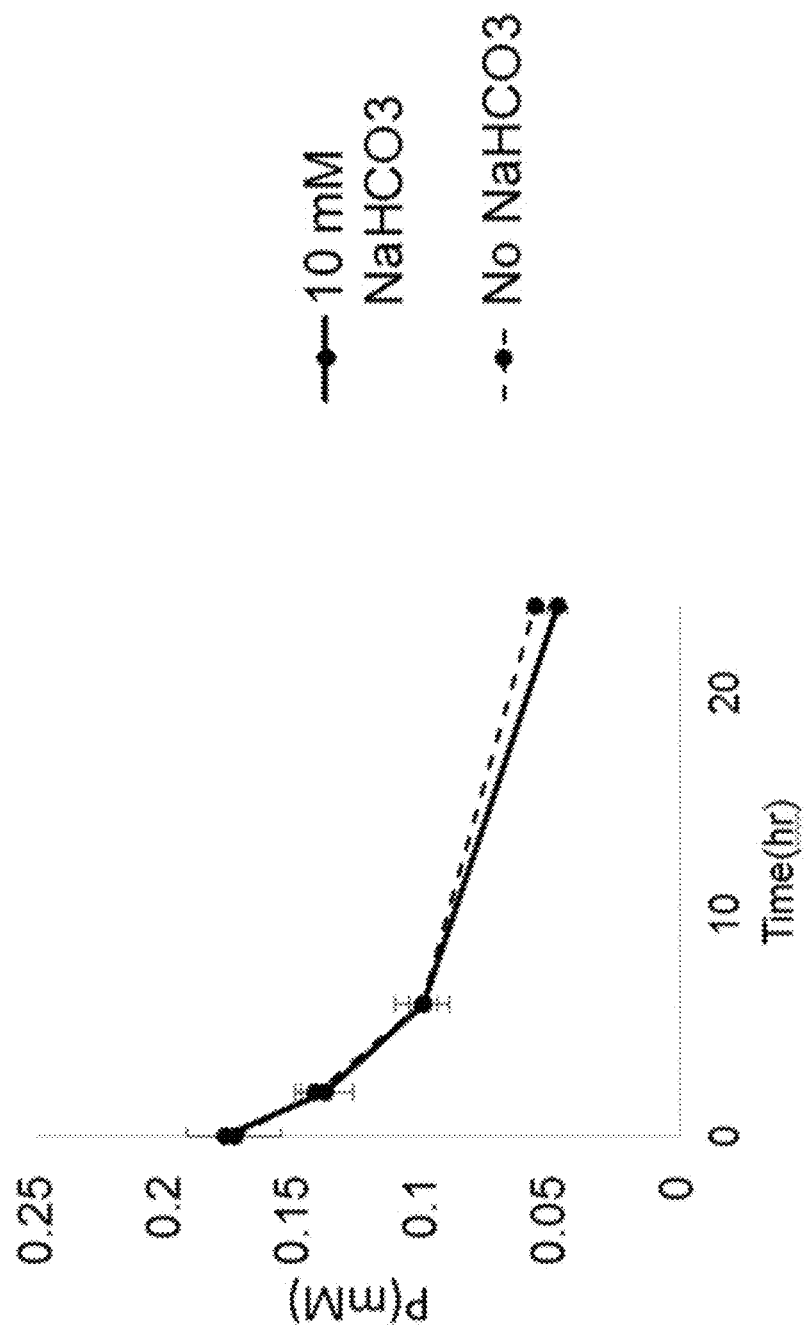
FIG. 18 depicts the beads perform well even with 10 mM NaHCO$_3$ addition (The effects of carbonate on the performance were not discernible).

Justification: Bicarbonate is present at an elevated level in wastewater due to both dissolution of $CO_2$ and organic waste degradation/microbial activity. Bicarbonate is a common inhibitor of precipitation of calcium phosphate minerals at high pH values due to the formation of calcium carbonate minerals. FIG. 18 shows the beads perform well even with 10 mM $NaHCO_3$ addition.

Testing solution: 2 mM $CaCl_2$, 0.2 mM $Na_2HPO_4$, 30 mM NaCl, and pH=7.5 (Test solution volume=100 ml, 0.0028 mg beads added (dry weight)).

Bead fabrication conditions: 0.6% w/v sodium alginate (F.C.C grade; Spectrum Chemicals)(NaAlg)+35 mM $Na_2HPO_4$ dripped with a syringe pump into 180 mM $CaCl_2$+20 mM NaOH solution, and pH≈12 (Beads were dried before application).

Figure 19:
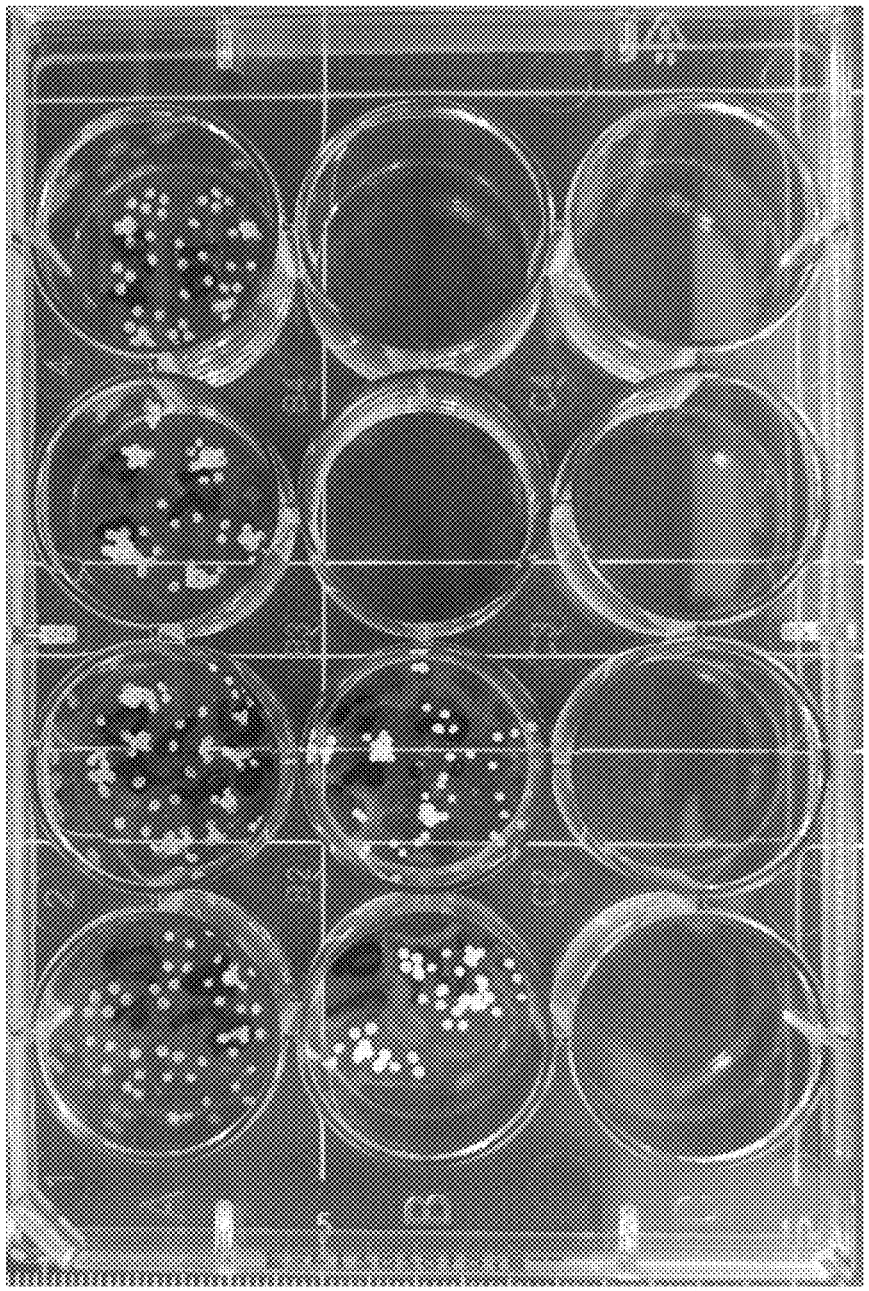
FIG. 19 depicts after drying, beads are not able to swell and have much slower kinetics for P removal in DI water.
Figure 20B:
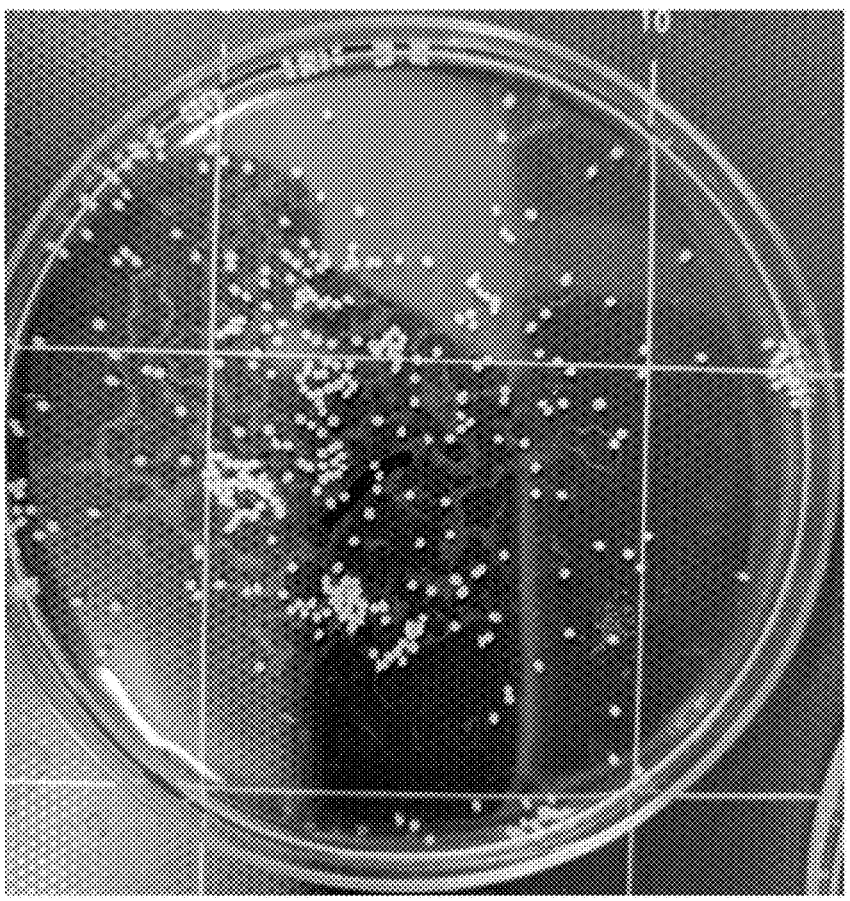
FIG. 20B shows after 4 hours in 100 mM NaCl.
Figure 20A:
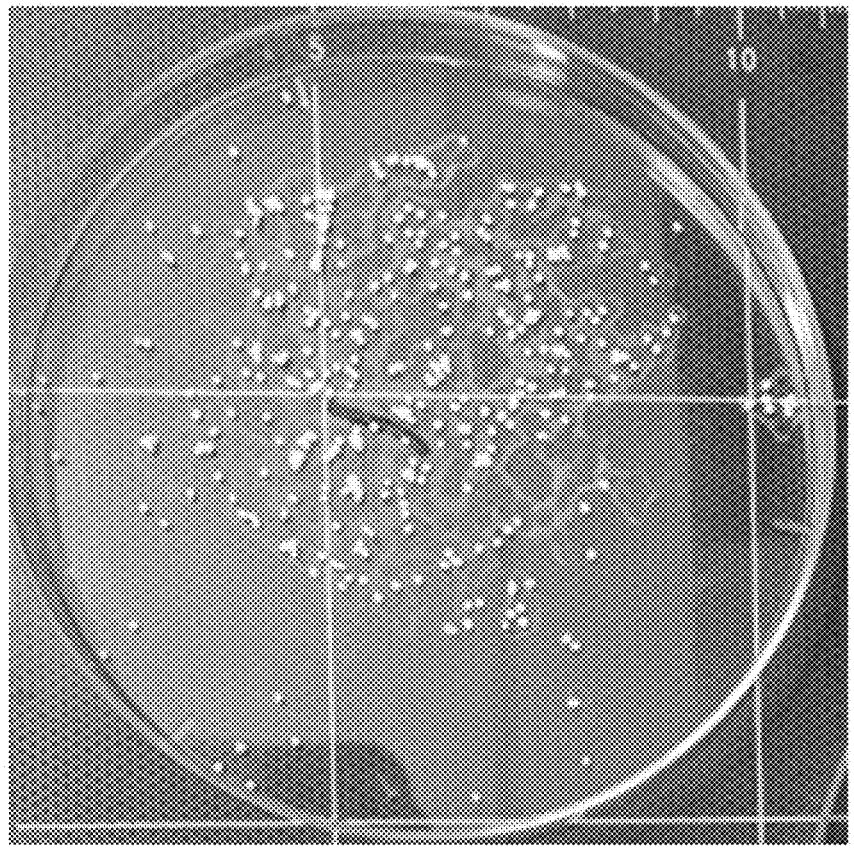
FIG. 20A shows when beads were located in NaCl, they were swollen back (0.6% Alg+35 mM P).
Figure 20C:
FIG. 20C shows same bead samples in 0.5 M NaCl (After ~24 hours).

Justification: Drying the beads makes transport easier and can also increase their flexibility potential future applications (e.g. agricultural runoff control). After drying, beads are not able to swell and have much slower kinetics for P removal in DI water. After 24 hours in simulated wastewater or DI water, no significant volume change is observed (FIG. 19). However, when beads were located in NaCl solution, they were swollen back (FIG. 20B-FIG. 20C).

Example 6: Testing in Complex Simulated Wastewater Solution

Testing solution: (see Table 2 for composition) Test solution volume=200 ml, ~0.014 mg beads added (dry weight).

Bead fabrication conditions: 0.6% w/v sodium alginate (F.C.C grade; Spectrum Chemicals)(NaAlg)+35 mM $Na_2HPO_4$ dripped with a syringe pump into 90 mM $CaCl_2$+ 20 mM NaOH solution, and pH≈12. Previous tests have shown little difference in bead performance when incubated in 90 mM $CaCl_2$ vs. 180 mM $CaCl_2$ (data not shown) Using a lower concentration $CaCl_2$ bath will lower the manufacture costs.

Figure 21:
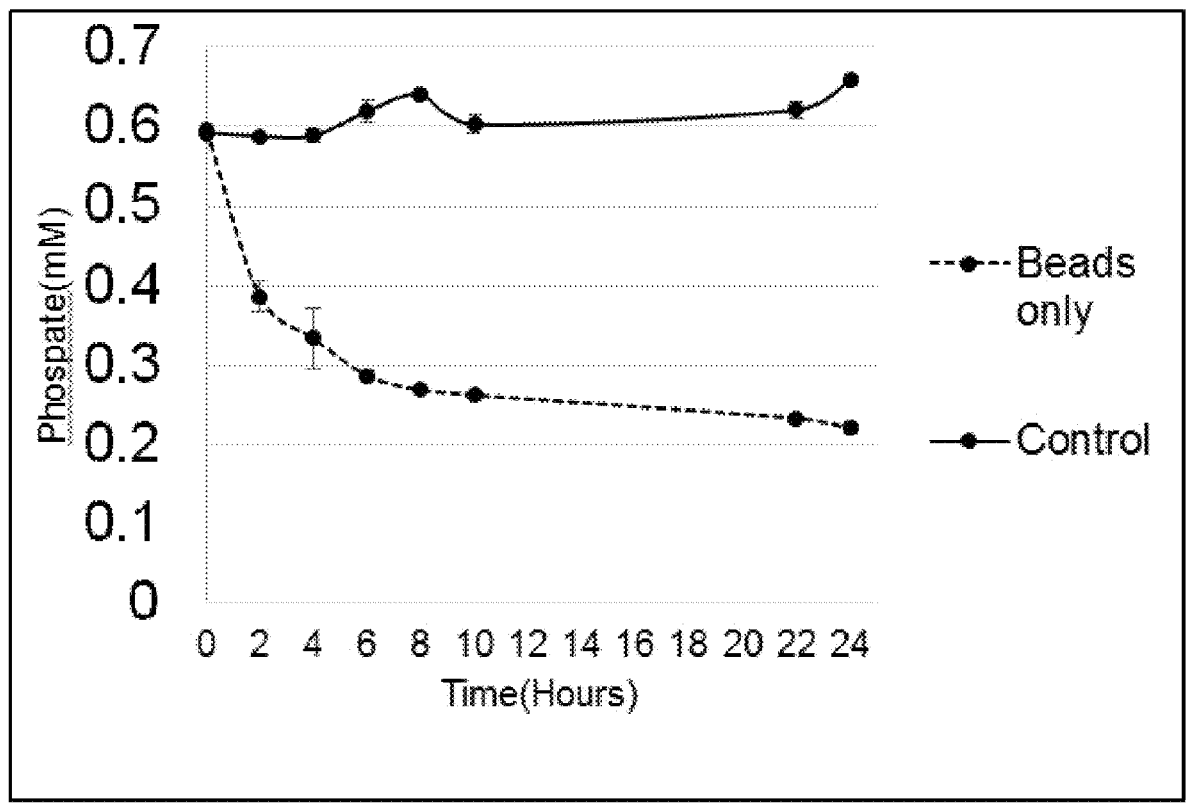
FIG. 21 shows beads were able to perform well in more complex matrix.

Justification: This test will assess the bead's function in more complex wastewater solutions with more phosphorus. Beads were able to perform well in more complex matrix. Final [P] is higher than previous tests (may be a limitation of calcium in original solution) (FIG. 21).

TABLE 2

| WW model solution (pH = 8.0) | | | | | |
|---|---|---|---|---|---|
| Salt | Concentration (g/L) | MW (g/mol) | Concentration (mM) | Element | mM |
| NaCl | 0.1519 | 58.44 | 2.60 | Na | 17.00 |
| $NaHCO_3$ | 0.9829 | 84.01 | 11.70 | NH4 | 9.20 |
| $NaH_2PO_4$ | 0.0840 | 119.98 | 0.70 | PO4 | 0.60 |
| $MgCl_2*6H_2O$ | 0.4473 | 203.31 | 2.20 | SO4 | 1.00 |
| $CaCl_2*2H_2O$ | 0.3528 | 147.02 | 2.40 | HCO3 | 20.90 |
| KCl | 0.1938 | 74.55 | 2.60 | Ca | 2.00 |
| $NH_4HCO_3$ | 0.7274 | 79.06 | 9.20 | Mg | 2.20 |
| HCl | 0.0584 | 36.50 | 1.60 | Cl | 16.00 |
| $Na_2SO_4$ | 0.1420 | 142.00 | 1.00 | K | 2.60 |

What is claimed is:

1. A method of recovering or removing a nutrient from an aqueous medium, the method comprising:

adding a sodium alginate solution comprising phosphate ions to a calcium bath with a base to form a plurality of spherical calcium alginate beads having embedded calcium phosphate seed minerals;

contacting the aqueous medium with the plurality of calcium alginate beads having embedded calcium phosphate seed minerals under conditions and for a time effective to immobilize the nutrient by calcium phosphate solid nucleation, wherein the nutrient is at least one of phosphorus and nitrogen.

2. The method of claim 1, wherein the aqueous medium is selected from the group consisting of surface water, ground water, an aquifer, well water, a eutrophic lake, municipal and industrial wastewater, agricultural runoff, effluent from water or sewer treatment plants, acid mine drainage, sludge, groundwater, a reservoir, well water, a marsh, swamp, a bay, an estuary, a river, a stream, a tidal or intertidal area, a sea or an ocean.

3. The method of claim 2, wherein the aqueous medium has a neutral pH.

4. The method of claim 1, wherein the plurality of calcium seeded calcium alginate beads are contacted with the aqueous medium for about 1 hour to about 24 hours.

5. The method of claim 1, wherein the plurality of calcium mineral-seeded calcium alginate beads are contacted with the aqueous medium for less than about 24 hours.

6. The method of claim 1, wherein the plurality of calcium mineral-seeded calcium alginate beads are disposed within a stationary treatment medium.

7. The method of claim 6, wherein the stationary treatment medium comprises a permeable reactive barrier, a slurry wall, a filtration bed, or a filter.

* * * * *